(12) United States Patent
Patt et al.

(10) Patent No.: US 11,948,201 B2
(45) Date of Patent: *Apr. 2, 2024

(54) INTERACTIVE PREPAREDNESS CONTENT FOR PREDICTED EVENTS

(71) Applicant: Assured Insurance Technologies, Inc., Stanford, CA (US)

(72) Inventors: Theo Patt, Stanford, CA (US); Justin Lewis-Weber, Stanford, CA (US)

(73) Assignee: Assured Insurance Technologies, Inc., Stanford, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/500,689

(22) Filed: Oct. 13, 2021

(65) Prior Publication Data

US 2023/0116513 A1    Apr. 13, 2023

(51) Int. Cl.
G06Q 40/00     (2023.01)
G06Q 30/0208   (2023.01)
G06Q 40/08     (2012.01)
H04L 51/046    (2022.01)

(52) U.S. Cl.
CPC ......... *G06Q 40/08* (2013.01); *G06Q 30/0208* (2013.01); *H04L 51/046* (2013.01)

(58) Field of Classification Search
CPC ... G06Q 40/08; G06Q 30/0208; H04L 51/046
See application file for complete search history.

(56) References Cited

U.S. PATENT DOCUMENTS

| 5,839,112 A | 11/1998 | Schreitmueller |
| 6,246,954 B1 | 6/2001 | Berstis |
| 6,969,809 B2 | 11/2005 | Rainey |
| 7,827,045 B2 | 11/2010 | Madill, Jr. |
| 9,824,453 B1 | 11/2017 | Collins |
| 9,870,609 B2 | 1/2018 | Kompalli |
| 9,898,619 B1 | 2/2018 | Hadsall |
| 10,217,169 B2 | 2/2019 | Schumann, Jr. |
| 10,387,962 B1 | 8/2019 | Potter |
| 10,679,296 B1 | 6/2020 | Devereaux |
| 10,885,587 B1 | 1/2021 | Mendoza |
| 10,997,663 B1 * | 5/2021 | Wyatt ................... G06Q 40/08 |

(Continued)

OTHER PUBLICATIONS

Peng Shi, "Assessing Hail Risk for Property Insurers with a Dependent Marked Point Process", Journal of the Royal Statistical Society Series A: Statistics in Society, vol. 185, Issue 1, Jan. 2022, pp. 302-328, Published Oct. 6, 2021.

*Primary Examiner* — Rajesh Khattar
(74) *Attorney, Agent, or Firm* — Mahamedi IP Law LLP

(57) ABSTRACT

A computing system can determine a subset of the users that are to be affected by a predicted event. For each respective user of the subset of users, the system performs a lookup that identifies unique property characteristics of the respective user. Based on the unique property characteristics of the respective user, the system transmits interactive content data to a computing device of the respective user, the interactive content data causing the computing device of the respective user to present interactive mitigation content comprising a customized set of tasks to perform, based on the unique property characteristics of the respective user, to mitigate or prevent loss resulting from the predicted event.

17 Claims, 27 Drawing Sheets

(56) References Cited

U.S. PATENT DOCUMENTS

| | | |
|---|---|---|
| 11,315,194 B2 | 4/2022 | Blessman |
| 11,514,526 B1 | 11/2022 | Kwartler |
| 2001/0041993 A1 | 11/2001 | Campbell |
| 2002/0007289 A1 | 1/2002 | Malin |
| 2003/0069820 A1 | 4/2003 | Hillmer |
| 2003/0154111 A1 | 8/2003 | Dutra |
| 2004/0054557 A1 | 3/2004 | Wahlbin |
| 2004/0113783 A1 | 6/2004 | Yagesh |
| 2004/0183673 A1 | 9/2004 | Nageli |
| 2005/0197866 A1 | 9/2005 | Salcedo |
| 2006/0103568 A1 | 5/2006 | Powell |
| 2006/0124377 A1 | 6/2006 | Lichtinger |
| 2006/0267799 A1 | 11/2006 | Mendelson |
| 2007/0164862 A1 | 7/2007 | Dhanjal |
| 2009/0033540 A1 | 2/2009 | Breed |
| 2009/0216772 A1 | 8/2009 | Goldfarb |
| 2009/0256736 A1 | 10/2009 | Orr |
| 2010/0067420 A1 | 3/2010 | Twitchell, Jr. |
| 2010/0073194 A1 | 3/2010 | Ghazarian |
| 2010/0100319 A1 | 4/2010 | Trinko |
| 2010/0106413 A1 | 4/2010 | Mudalige |
| 2010/0265104 A1 | 10/2010 | Zlojutro |
| 2010/0265325 A1 | 10/2010 | Lo |
| 2010/0271196 A1 | 10/2010 | Schmitt |
| 2011/0068954 A1 | 3/2011 | McQuade |
| 2011/0102232 A1 | 5/2011 | Orr |
| 2012/0029759 A1 | 2/2012 | Suh |
| 2012/0029764 A1 | 2/2012 | Payne |
| 2012/0062395 A1 | 3/2012 | Sonnabend |
| 2014/0058763 A1 | 2/2014 | Zizzamia |
| 2014/0132409 A1 | 5/2014 | Billman |
| 2014/0244317 A1 | 8/2014 | Roberts |
| 2014/0245165 A1* | 8/2014 | Battcher ............... G06Q 40/08 715/738 |
| 2015/0039352 A1* | 2/2015 | Rempp ................ G06Q 40/08 705/4 |
| 2015/0154712 A1 | 6/2015 | Cook |
| 2015/0187017 A1 | 7/2015 | Weiss |
| 2016/0284029 A1 | 9/2016 | Rhodes |
| 2016/0379309 A1 | 12/2016 | Shikhare |
| 2020/0143481 A1 | 5/2020 | Brown |
| 2020/0184591 A1* | 6/2020 | Balu ..................... G07C 5/006 |
| 2021/0004909 A1 | 1/2021 | Farmer |
| 2021/0049440 A1* | 2/2021 | Sim ................. G06Q 10/06313 |
| 2021/0082054 A1 | 3/2021 | Rodriguez Bravo |
| 2021/0127292 A1* | 4/2021 | Van Duren ....... H04W 28/0289 |
| 2021/0166197 A1 | 6/2021 | Baxter |
| 2021/0166323 A1 | 6/2021 | Fields |
| 2021/0192629 A1 | 6/2021 | Tofte |
| 2021/0264523 A1 | 8/2021 | Schuster |
| 2021/0264533 A1 | 8/2021 | Feit |
| 2022/0058747 A1 | 2/2022 | Crabtree |
| 2022/0300903 A1 | 9/2022 | Huang |
| 2023/0110710 A1 | 4/2023 | Patt |
| 2023/0113078 A1 | 4/2023 | Patt |
| 2023/0113765 A1 | 4/2023 | Patt |
| 2023/0113815 A1 | 4/2023 | Patt |
| 2023/0115771 A1 | 4/2023 | Patt |
| 2023/0116639 A1 | 4/2023 | Patt |
| 2023/0116840 A1 | 4/2023 | Patt |
| 2023/0116902 A1 | 4/2023 | Patt |

\* cited by examiner

INTERACTIVE PREPAREDNESS CONTENT FOR PREDICTED EVENTS

BACKGROUND

Catastrophic event preparedness is typically left to affected individuals within predicted or observed event areas. Generalities regarding the manner of preparedness continue to result in high damage costs, loss of life, and inadequate mitigation on a collective basis with little to no individualized preparedness guidance, and for certain catastrophic events, imprecise predictions regarding localized severity.

Additionally, the insurance industry is inherently reactive with regard to processing claims, with insurance companies typically awaiting claim events and resultant claim filings prior to performing investigative processes. Accordingly, the insurance industry is plagued by rampant fraud that effectively increases premium costs for all policy holders. The investigative processes themselves are also typically manual and inefficient, with investigators and even law enforcement being tasked with identifying fraudulent behavior long after a claim event, enabling perpetrators of insurance fraud to plan carefully and then cover their tracks prior to making a fraudulent claim.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
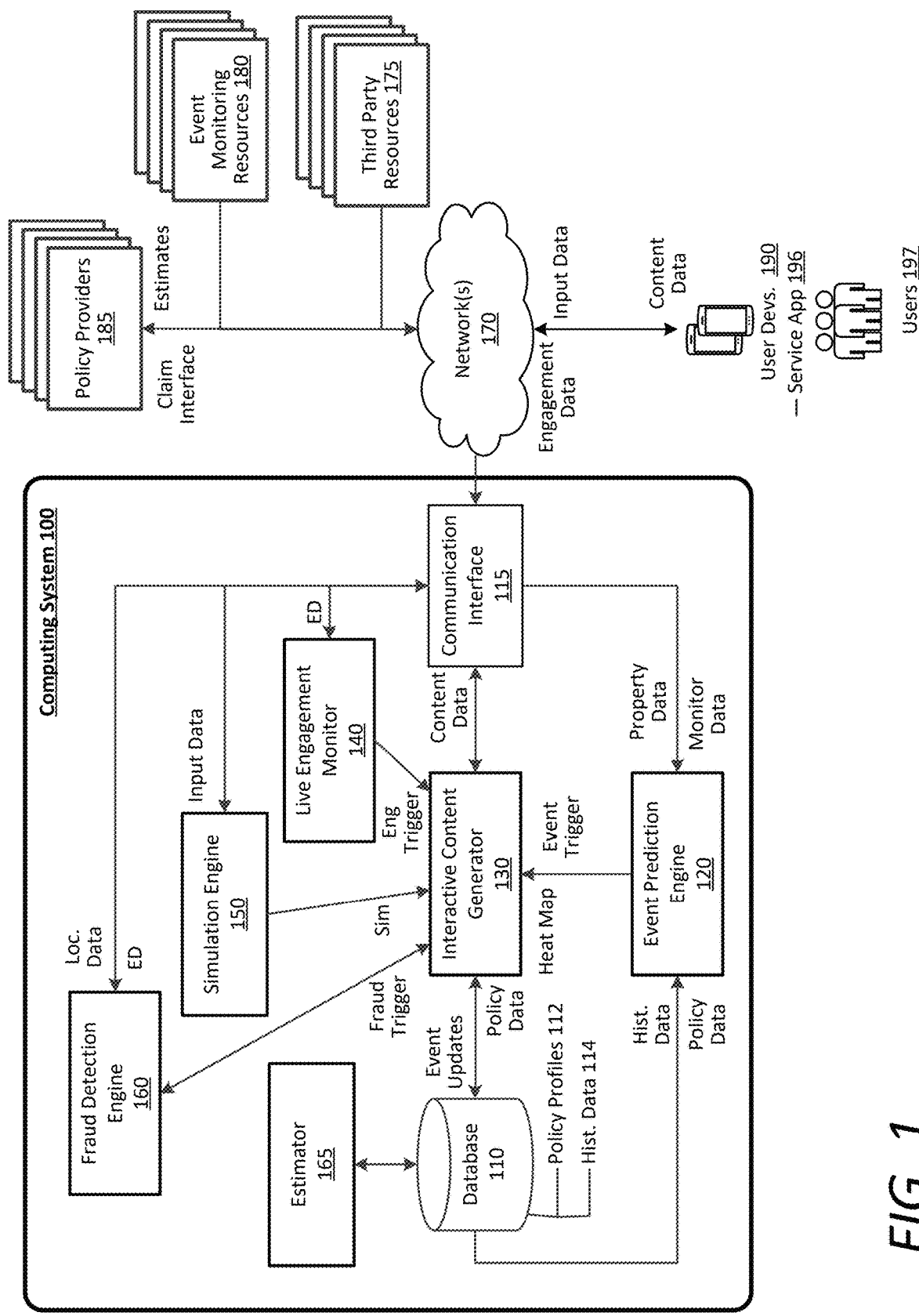
FIG. 1 is a block diagram illustrating an example computing system implementing targeted event monitoring, alert, loss mitigation, and fraud detection techniques, in accordance with examples described herein.

A computing system can provide an integrated claims intelligence platform for policy holders and policy providers that leverages various combinations of technologies in machine learning, artificial intelligence, data augmentation, convolutional neural networks, and/or recursive modeling to provide highly predictive and individualized loss prevention and mitigation services, as well as highly detailed and accurate contextual information gathering, corroboration, and claim processing for both policy holders and policy providers. In various implementations, the system can integrate with various third-party data sources to increase contextual awareness for potential claim events, such as catastrophic phenomena (e.g., weather events, natural disasters, etc.), dangerous travel routes or locations (e.g., hazardous road intersections, highway segments, etc.), individual risk behaviors and habits, and the like.

In further implementations, the system can provide an individually tailored loss or damage mitigation service prior to claim events, such as extreme weather events, by integrating with weather forecasting services, satellite services, policy provider computing systems, and various third-party databases to predict which users or policy holders will be affected by an event, predict damage severity for each affected user resulting from the event, and provide interactive and individualized loss prevention content to the users based on various factors, such as the predicted severity of the event, the locale of the user or user's property, the unique attributes of the user's property, and/or the policy information of the user.

Prior to a predicted event, the system can determine the unique characteristics or attributes of a user's property, such as the user's home and/or personal property (e.g., vehicle(s) and other insured assets). In certain implementations, the system predicts a localized severity of the event for the user's location, and generates individually tailored, loss mitigation content for the user, which can be comprised in an interactive user interface presented on a computing device of the user. The computing system can determine the unique characteristics of the user's property as well as the user by linking with various data sources, such as real-estate information sources, tax records, census data sources, satellite data sources, construction data sources, social media sources, etc. As provided herein, the unique characteristics of the user's property can include the square footage of the user's home, number of stories, number of bedrooms and bathrooms, the size of the garage (if applicable), heating source, water source, power source(s) (e.g., natural gas, solar, wind, etc.), the type of climate control system, home elevation, accessibility, and the like.

For each user predicted to be affected by an event (e.g., a catastrophic weather event), the system can generate loss mitigation content that can include a set of actions to be performed to mitigate or prevent loss or damage due to the upcoming event based on the unique characteristics of the user's property, as described in detail below. As the user performs the mitigative actions, the user can indicate so via the application interface displaying the mitigative content. For an entire affected area, the system can interact individually with users via the content interface to provide mitigative content data and receive responses from the users, which the system can utilize to generate a data set for policy providers. For example, the data set can comprise reserve estimates, adjusted loss predictions, and/or a predicted exposure risk for a given area that will be affected by the event. Additionally, the data set provided to policy providers may further be based on historical event damage information from similar events to the predicted event. As such, the system can execute machine learning techniques using the historical event damage information to calculate and refine reserve estimates, adjusted loss predictions, and/or predicted exposure risks for any given area and for any given claim event.

In various implementations, the system can dynamically update the loss mitigation content based on updates to the localized severity of the event at the location of the user or the user's property. For example, if the predicted localized severity increases substantially with respect to the user's location, the system can provide additional recommended actions to mitigate or prevent loss or damage, and can further include a recommendation or order to evacuate to a safer location. In further examples, the system can provide third-party resources, such as mapping, routing, and/or travel resources (e.g., hotel booking) when the user is recommended to evacuate.

During the event, the system can provide a real-time dashboard providing updates regarding the event and enable the user to provide updates regarding status (e.g., any medical emergencies or injuries) and damage updates (e.g., current flooding, property damage, etc.). In various examples, the system can further provide the user, at any time, with the policy coverage information of the user. Based on the dynamic updates with regard to the event, the system can further update the data set provided to the policy providers (e.g., to include an updated reserve estimate).

Following any given claim event—such as a catastrophic weather event (e.g., a hurricane or severe storm), a disaster event (e.g., a wildfire or flood), a vehicular accident, a personal injury event, and the like—the system may receive a claim trigger indicating that a claimant seeks to make an insurance claim due to damage, loss, or injury resulting from the claim event. The claim trigger may be initiated by the claimant independently or may be initiated in response to the system sending a message (e.g., via SMS or email) to the claimant following the claim event. In various implementations, the system can provide a first notice of loss (FNOL) interface that enables the claimant to provide contextual information corresponding to the claim event and the resultant damage, loss, or injury. Depending on the nature of the claim event, the system performs various corroborative functions to provide policy providers with a claim interface that provides a full picture of the claim event, claim estimations, any inconsistencies or fraud flags based on the corroborative process, and one or more recommendations (e.g., paying out the claim, paying out a portion of the claim, denying the claim, or performing additional investigation).

As an addition or alternative, the system can perform preemptive fraud detection through claimant monitoring prior to receiving a claim trigger. As provided herein, the services described throughout the present disclosure may be accessed via an executing service application on the computing devices of the users. The application may be executed in an active state allowing the users to engage and interact with the services provided by the disclosed computing system. The application may further be executed in a background state that enables certain permission-based monitoring of the user's interactions with the computing device, including receiving location data, monitoring whether the user views policy information prior to a claim event, and monitoring additional actions the user performs on one or more websites or application interfaces (e.g., clicks, typed words, page views, scrolling actions, searches, etc. performed on a policy provider's website). In doing so, the system can identify any inconsistencies or anomalies with regard to the user's behavior prior to or during a claim event and the subsequent contextual information provided by the user in making a claim. Accordingly, the system can preemptively determine whether a particular user is likely to make a fraudulent claim. In further implementations, the system can link with third-party resources to determine any historical information of the user that may be predictive of fraudulent behavior, such as criminal records, past insurance claim information, past home ownership and/or rental information, credit records, financial records, tax records, and the like.

Upon receiving a claim trigger from a claimant, the system can provide the FNOL interface (e.g., via the executing service application) to receive contextual information regarding the claim event from the claimant. For vehicle incidences, the system can include a three-dimensional vehicle damage assessment interface that enables the claimant to indicate vehicle damage. In one example, the system can perform a lookup or otherwise determine the claimant's vehicle, and the damage assessment interface can present a virtual representation of the claimant's vehicle, which can be rotated about multiple axes to allow the claimant to indicate all claimed damage. The damage assessment interface may also include an information gathering feature, which can comprise a set of selectable icons, queries, prompts, and/or text boxes that enable the claimant to describe the damage and provide content showing the damage (e.g., images and/or video).

In various implementations, the FNOL interface can further include camera and video functions that enable the claimant to take images and/or video of any damage or loss resulting from a claim event. For example, a catastrophic event may cause damage to a claimant's home (e.g., flood damage, fire damage, hail damage, etc.). The FNOL interface may prompt the claimant to record a video or images of the resultant damage due to the event. As another example, if the claimant was involved in a vehicular incident, the FNOL interface may prompt the claimant to record a video or images of the damage to the claimant's vehicle.

In various examples, the FNOL interface may further include a personal injury assessment interface that enables the claimant to indicate the nature and severity of any injuries resulting from a claim event. As an example, the injury assessment interface can comprise a virtual representation of a human in general, or more specifically, a twodimensional or three-dimensional avatar of the claimant. The virtual representation can be rotatable on one or more axes to allow the claimant to precisely indicate any injuries (e.g., via touch inputs that mark the injury locations on the virtual representation). The injury assessment interface can further include selectable icons, queries, prompts, and/or text boxes that enable the claimant to describe the injuries resulting from the claim event and upload images or a video recording of the injuries.

In further implementations, upon receiving a claim trigger, the system can implement an investigative and/or corroborative process to compile a complete contextual record of the claim event and the resultant loss, damage, and/or injury. In doing so, the system can determine other parties to the claim event or parties that may have relevant information related to the claimant (e.g., other victims, witnesses, passengers of a vehicle, neighbors, family members, coworkers, etc.). Upon identifying each of the relevant individuals, the system can utilize various contact methods to remotely engage with the individuals, including text messaging, email, social media messaging, snail mail, etc. In one aspect, the engagement method can include a link to a query interface corresponding to the claim event, which can enable the individual to interact with a question flow that provides a series of interactive questions that seek additional contextual information regarding the claim event.

Examples described herein can further implement engagement monitoring techniques corresponding to a user's engagement with the various user interfaces described herein. In such examples, the system can monitor various combinations of the user's inputs, view-time or display-time on any particular page or screen, the content presented on the display of the user's computing device at any given time, image data of the user's face (e.g., showing a lack of interest), and the like. Based on the engagement information of a particular user (e.g., a claimant or a corroborating party), the system dynamically adjusts the content flows presented to the user to maximize engagement and/or information gathering. In one example, the system may determine, based on the engagement data received from monitoring the user, that the user is losing interest in engaging with the user interface, and adjust the content presented on the service application in order to increase the user's engagement. The determination of engagement level of a user by the computing system may be based on a confidence threshold or probability of the user exiting the service application within a given time frame (e.g., the next five seconds).

As provided herein, the engagement monitoring and dynamic content flow adjustments may be performed for users, claimants, and corroborating parties at any phase of the service. For example, when the computing system predicts that a weather event will affect the home of a particular user and provides the user with an individualized checklist of mitigative tasks, the computing system can implement engagement monitoring and dynamic presentation adjustment techniques to compel or influence the user to interact with the individualized checklist so that the user performs the mitigative tasks. As another example, during an information gathering phase for a particular claim, a witness may be presented with a series of queries relating to the claim event. The system may implement engagement monitoring and dynamic presentation adjustment techniques to compel or influence the witness to complete the information gathering flow generated by the system.

Examples described herein achieve a technical effect of automating and individually tailoring content flows for policy holders to allow for event preparedness, event updates and alerts, intuitive FNOL information gathering, claim corroboration, vehicle incident simulation, and fraud detection. Based on the techniques described throughout the present disclosure, the computing system can generate a claim interface for policy providers for each claim, which can provide an overview of the claim event, the statements and evidence provided by the claimant and other relevant parties, an analytics summary of an internal claim analysis performed by the computing system, a cost estimate for the claim, fraud scores for each information item provided by the claimant, and/or one or more recommendations for the policy provider in treating the claim. Additionally or alternatively, the claim interface can indicate a calculated severity score and/or complexity score corresponding to the claim, which can provide the policy provider with additional context regarding the claim.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with a computing system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples include processors and various forms of memory for holding data and computer-executable instructions (including machine learning instructions and/or artificial intelligence instructions).

Examples of computer-readable mediums include permanent memory storage devices, such as hard drives on personal computers or servers. Other examples of computer storage mediums include portable storage units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example computing system 100 implementing targeted event monitoring, alert, loss mitigation, and fraud detection techniques, in accordance with examples described herein. The computing system 100 can include a communication interface 115 that enables communications, over one or more networks 170, with computing devices 190 of users 197 of the various services described throughout the present disclosure. The communication interface 115 further enables communications with computing systems of policy providers 185, event monitoring resources 180 (e.g., weather services, satellite imaging services, etc.) and other third-party resources 175 (e.g., census databases, real estate databases, tax record databases, insurance record databases, criminal records databases, medical record databases, etc.). In various implementations, the computing system 100 can receive historical data 114 from the computing systems of the policy providers 185, event monitoring resources 180, and third-party resources 175.

As provided herein, the historical data 114 can comprise historical information relevant to the users 197 and their properties, such as policy coverage information (e.g., previous and current insurance coverage and claim history), tax information, real estate property information, rental property information, criminal history, vehicle records (e.g., vehicular accident history, registered vehicles, etc.), medical records, and the like. The historical data 114 can further include historical event information relating to catastrophic events, such as severe weather events, natural disasters, wildfires, floods, power outages, damage and loss costs, insurance payout information, regulatory information, construction records, fraud history, and the like. In further examples, the historical data 114 can include vehicular accident information, such as accident-prone road segments and intersections, individual accident history of the users 197, vehicle makes and models, damage costs, insurance payout information, historical claim information, fraud history, etc. In still further examples, the historical data 114 can include personal injury information relating to each user's 197 injury history, insurance claims and payouts, medical fraud history, and medical cost information.

The computing system 100 can further receive real-time information from the policy providers 185, event monitoring resources 180, and third-party resources 175. In various examples, the computing system 100 can include an event prediction engine 120 that receives real-time monitoring data from computing systems of event monitoring resources 180, such as weather forecasting services, satellite imaging services, traffic services, public services indicating road construction or building construction, and the like. Based on the monitoring data, the event prediction engine 120 can predict that an event will affect a given area that includes the properties of a subset of the users 197. The predicted event can comprise a catastrophic event, such as a severe storm, a wildfire, extreme heat or cold, drought conditions, a water shortage, a flood, a power outage, a mudslide, and the like.

In certain implementations, the event prediction engine 120 can generate a severity heat map providing severity gradients in the given area detailing predicted locations or sub-areas that will be affected more severely and locations or sub-areas that will be affected more moderately or mildly. In certain implementations, the event prediction engine 120 can access the historical data 114 (e.g., stored in a local database 110 or accessed remotely from a third-party resource 175 via the one or more networks 170) to identify similar events, the characteristics of the predicted area to be affected (e.g., topography, flood plain information, drainage information, historical rainfall level versus current rainfall level, construction regulations, local construction norms, power grid information, etc.) in order to predict a set of risks for the given area and to those residing or owning homes or businesses in the given area.

In further examples, the event prediction engine 120 can further receive property data for the predicted area to be affected, and/or policy data from policy profiles 112 in a database 110, to determine the properties and people that are to be affected by the predicted event, and how severely they are likely to be affected. In various implementations, the event prediction engine 120 can provide the severity heat map and an event trigger indicating the properties and people (e.g., a subset of the users 197) predicted to be affected to an interactive content generator 130 of the computing system 100. The interactive content generator 130 can execute machine learning and/or artificial intelligence logic to communicate with users 197 through interactive content that provokes preventative or mitigative behavior to mitigate predicted loss of life and property damage prior to an event.

In examples described herein, the content generator 130 can provide individualized content flows to the users 197 based on the unique property characteristics of the users 197 and/or their policy information. Thus, the content generator 130 can transmit content data to the user devices 190 (e.g., via a service application 196) to cause the user devices 190 to generate the individualized content flows specific to the user 197. On the client side, the users 197 may engage with the content generator 130 via the service application 196 executing on their computing devices 190, which can present the interactive content flows generated by the content generator 130 and provide engagement data and input data to the computing system 100 based on the users' engagement and interactions with the content flows.

Prior to the predicted event, the content generator 130 can process the event trigger and/or severity heat map to determine the subset of the users 197 that are predicted to be affected by the event and how severely each user 197 is likely to be affected. In one example, the content generator 130 accesses the policy information of each of the users 197 in the subset, determines the unique property characteristics of each of the users 197, and generates a customized preparation content flow for the user 197. For a given user 197, the preparation content flow can comprise interactive content that identifies the user's property, the potential risks to the property due to the predicted event, and an itemized checklist of action items to perform in order to prevent or mitigate property loss, damage, and/or subsequent inconveniences arising from the event.

Each user 197 can interact with the user's customized content flow, view current policy data indicating the user's insurance policies, perform the suggested action items, and indicate whether a particular action item in the customized content flow has been performed. In various implementations, the computing system 100 can include a live engagement monitor 140 to process engagement data from the computing devices 190 of the users 197. The engagement data can include any information regarding the timing and manner in which a particular user engages (or does not engage) with the individualized content flows provided by the content generator 130.

As an example, a user 197 may be provided with an alert (e.g., a text message or push notification) from the content generator 130 that a catastrophic storm will directly impact the user's property within a future timeframe (e.g., a number of days). Selection of the alert can trigger the service application 196 to launch and provide the individualized checklist of action items based on the unique property characteristics and/or policy information of the user 197. In the example provided, the action items can include tasks such as shutting off a main water valve prior to the event, garaging vehicles, trimming surrounding trees and/or clearing brush, cleaning out gutters, covering a chimney flue, securing outdoor items (e.g., furniture, grill, play equipment, etc.), upgrading insurance coverage or purchasing additional coverage, covering solar panels, anchoring a shed, purchasing emergency supplies (e.g., lanterns, flashlights, batteries, water, food etc.), purchasing extra fuel for a generator, evacuating, and the like.

If the user 197 ignores the content, the live engagement monitor 140 can transmit an engagement trigger to the content generator 130 indicating so, and the content generator 130 can provide a reminder or subsequent notification at a later time. As the user 197 performs the action items and engages with the content, the engagement monitor 140 can provide engagement triggers indicating the user's progress to the content generator 130. In response, the content generator 130 can provide, for example, encouragement responses and store the information for subsequent damage estimate calculations to be provided to policy providers 185. In further implementations, the live engagement monitor 140 can execute machine learning techniques on a user-by-user basis to determine how each user 197 responds to the content flows, which the content generator 130 can utilize to dynamically adapt the content flows, such as the ordering of presented content, design and styling of the content, and timing of notification transmissions.

Furthermore, as more and more engagement data are received from the users 197, increased confidence regarding damage and loss estimates prior to the event can be realized. Prior to the event, the computing system 100 can receive valuable data regarding the preparedness of the users 197 that are to be affected by the event. In various implementations, the computing system 100 can include an estimator 165 that processes the data to generate damage and loss estimates prior to the event for the policy providers with increasing accuracy. For example, the engagement monitor 140 can determine that feedback from the users 197 indicates that 90% of predicted affected users 197 have performed all action items provided in the individualized checklists, 5% have performed more than half of the action items, 3% have performed less than half of the action items, and 2% have ignored the action items entirely. Based on this information, the historical data 114 corresponding to similar events, and the policy information in the policy profiles 112 of the users 197, the estimator 165 can calculate a reserve estimate of total payout for the event for each policy provider 185 with a corresponding confidence interval or range (e.g., a total insurance reserve amount with an attached probability range for each policy provider 185).

As the event approaches or worsens, the content generator 130 can provide updates corresponding to a live map of the event in a highly localized manner to each user 197. In certain examples, the content generator 130 can center the live map of the event on the user's property or location and indicate current risks or highest probabilistic risks to the user's property. These determined risks may be based on updated information of the event and the user's previous engagement with the individualized mitigation content—indicating whether or not the user 197 performed the mitigative tasks. The content generator 130 can provide each affected user 197 with a live event dashboard, described in detail below, which can enable the user 197 to interact with the computing system 100 to provide personal updates, view any event updates specific to the user's location or property location, request emergency services, and the like.

Subsequent to the event, the content generator 130 can provide a first notice of loss (FNOL) interface for each affected user 197, comprising a set of customized content flows specific to the user's personal property characteristics, previously determined risks, and the user's previous interactions with the mitigative content. As described above, the content generator 130 can create a customized presentation for the user 197 that seeks to maximize user engagement with the FNOL interface based, at least in part, on the previous interactions with the user 197. The FNOL interface can enable each user 197 to submit insurance claims for damaged or lost property and/or personal injuries. As described in further detail below, the FNOL interface includes content recording functions that enable the user 197 to record images, video, and/or audio to provide added contextual information regarding an insurance claim.

In some examples, the FNOL interface can prioritize contextual information gathering for damage experienced by a given user 197. Accordingly, the user 197 can provide text or audio descriptions of damage, loss, or injury and upload content and records (e.g., medical records, images, video, receipts, etc.) to provide additional context and evidence. In further examples, the FNOL interface can include a damage assessment tool that provides a three-dimensional, virtual representation of a property (e.g., a home or vehicle) that enables the user 197 to indicate the location and severity of the damage. In still further examples, the FNOL interface can include an injury assessment tool comprising a three-dimensional, virtual representation of a human to enable the user 197 to indicate the locations of any personal injuries and describe the severity of each injury, as described in further detail below.

Based on the contextual information gathered via the FNOL interface, the content generator 130 can look up policy information in the user's policy profile 112 and make insurance claim recommendations for the user 197. Additionally or alternatively, the content generator 130 can trigger a fraud detection engine 160 of the computing system 100 to initiate additional contextual information gathering to corroborate the contextual assertions made by the user 197. According to examples described herein, the fraud detection engine 160 can identify individuals that may be able to provide additional contextual information, such as family members, neighbors, friends, the health care services of the user 197 (e.g., to corroborate medical expenses), repair services of the user 197 (e.g., to corroborate repair expenses), and the like. Once identified, the content generator 130 can provide contextual content flows to each of the relevant individuals, such as a set of queries regarding the user's statements and assertions (e.g., a statement of fault), personal experiences with the user 197, etc.

As described herein, the engagement monitor 140 can receive engagement data from each of these individuals corresponding to their interactions with the contextual content flows, and provide the content generator 130 with engagement triggers in the same or similar manner as described in examples above. Accordingly, the content flows provided to these additional individuals may be adaptive over a single session or over multiple sessions to ultimately gather as much contextual information from the individuals as necessary to provide a policy provider with a robust claim and recommendation. In further examples, the fraud detection engine 160 can further perform lookups of the user's personal history, such as criminal records and/or previous insurance claim history, in order to determine, for example, the user's character for truth-telling and accuracy reliability in making an insurance claim.

In various implementations, based on the contextual information received from corroborating individuals, third-party resources 175, and the claimant user 197, the estimator 165 can provide a claim estimate for the policy provider 185. Furthermore, the content generator 130 can provide a claim interface for a policy provider 185 of the claimant user 197. The claim interface can provide a description of the claim, flag any potentially fraudulent statements or evidence, and include a recommendation for the policy provider 185 (e.g., to pay the claim or investigate further). Thus, the computing system 100 comprises a claim verification layer to the insurance claim process that is performed automatically to expedite or even eliminate the manual investigative processes currently performed by policy providers 185.

According to examples described herein, a claim may be initiated by a user 197 for insured events, such as property damage, property theft, vehicle incidences, personal injuries, and any other claimable event (e.g., worker's compensation claims, health insurance claims, reputational claims, marine insurance claims, social insurance claims, general insurance claims, etc.). In such examples, the claimant user 197 can launch the service application 196 and initiate the FNOL interface to provide contextual information corresponding to the claim. In the manner described above, the content generator 130 can provide a set of queries and/or content flows to determine, for example, the vehicles involved in a vehicle accident, the parties or other victims of the claim event, the nature of the damage or loss, the property affected, any injury suffered from the claim event, and the like.

The content generator 130 can further generate a customized content flow for the claimant user 197 based on the initial contextual information provided by the claimant user 197. For example, if the claimant user 197 initiates a claim involving a personal injury, the content generator 130 can provide the three-dimensional virtual human in the content flow to enable the claimant user 197 to indicate the location of any injuries and the severity of such injuries (e.g., mild, moderate, or severe). As another example, if the claimant user 197 initiates a claim involving a damaged vehicle, the content generator 130 can provide the three-dimensional vehicle in the content flow to enable the user 197 to indicate vehicle damage and severity. In the latter example, the content generator 130 can further provide a map interface to enable the user 197 to indicate where the vehicle accident occurred and further details regarding the vehicle incident.

The claimant user 197 can indicate the location of the vehicle incident on the map interface. In certain examples, the content generator 130 can further prompt the claimant user 197 to indicate on the map interface a direction of travel, right-of-way, a route, and/or trajectory and speed of the claimant user's vehicle and any other involved vehicles. The content generator 130 can further query the claimant user 197 for additional information, such as photographs of the damaged vehicle(s) and/or accident scene, a video recording of the damage and/or accident scene, vehicle information (e.g., VID number(s), license plate number(s), vehicle description(s), model year, make and model, etc.), photographs of any injuries suffered from the claim event, and the like.

The content generator 130 can further transmit content flows to any witnesses or other relevant parties to the incident to receive additional contextual information regarding the claim event, such as statements (e.g., statements of fault), photographs, video, etc. In one example, the content generator 130 can provide the map interface to the witnesses and/or parties and prompt them to indicate an estimated speed, direction of travel, and/or right-of-way of each involved vehicle or person to corroborate and/or dispute the claimant's statements and/or evidence.

In various implementations, the content generator 130 initiates a corroborative process triggered by an input about a claim event from a first party (e.g., the claimant user 197). The corroborative process can be based on claim information corresponding to the claim event obtained from the first party. For example, the content generator 130 can provide a series of prompts to the first party to obtain the claim information and identify at least one second party to provide additional information about the claim event based on the claim information provided by the first party. The content generator 130 may then provide a series of prompts to the second party to obtain the additional information about the claim event and corroborate or dispute each item of claim information provided by the first party.

The content generator 130 may then determine one or more actions for completing a claim process by a policy provider 185 based on the information provided by the first party and the second party. The fraud detection engine 160 can compare the initial claim information obtained from the first party with the additional information obtained from the second party and, for example, identify a discrepancy between the two sets of information. and wherein the one or more processors determine the one or more actions by providing at least one of the first party or the second party with at least one follow-up prompt to obtain information to attempt to resolve the discrepancy. In various examples, the fraud detection engine 160 can trigger the content generator 130 to transmit additional content flows to other parties to the claim event (e.g., a vehicle accident) to resolve the discrepancy.

Thus, each item of the initial claim information provided by the first party may be either corroborated or disputed in the corroborative process, and assigned a fraud score for consideration by a policy provider 185 of the first party. As described herein the fraud scores may be presented to the policy provider 185 via a claim view interface that provides a graphic representation corresponding to the claim event, a visual marker to indicate the discrepancy. The claim interface can suggest one or more actions for the policy provider to take to resolve the discrepancy, such as a follow-up investigation with the first party and/or second party.

According to examples described herein, the computing system 100 can include a simulation engine 150 that receives the input data from the claimant user 197 and the additional individuals (e.g., map interface inputs and statements) to generate a simulation of a vehicle incident. In some examples, the simulation engine 150 can generate multiple simulations of the incident, such as one based solely on the claimant's statements and evidence, and another based on only corroborated information in the scenario which the claimant's statements and map inputs are inconsistent with those of the other individuals. Accordingly, in certain implementations, the simulation engine 150 can reject inconsistent inputs, statements and evidence or ignore certain information that is uncorroborated by other parties or witnesses. In some examples, the simulation engine 150 can prioritized corroborated information in generating the simulation, and in some examples, deprioritize unreliable information from interested parties (e.g., the owner(s) of the vehicle(s) involved in the incident).

In certain implementations, the detection of unreliable information can trigger automatic actions by the fraud detection engine 160. For example, a fraud trigger can cause the content generator 130 to automatically transmit a set of follow-up content flows that request or query for more information. Additionally or alternatively, the fraud trigger can cause the computing system 100 to automatically route the claim to a particular department of the claimant's policy provider 185, or automatically deny the claim.

In generating the simulation, the simulation engine 150 can initiate a physics engine that takes into account the relative velocities and directions or travel of the involved vehicle(s), the mass of the vehicles involved (e.g., via a lookup in a vehicle database), the traffic laws (e.g., speed limits, rights-of-way, etc.), the characteristics of the accident scene (e.g., traffic signals, crosswalks, obstacles, pedestrians, bicyclists, school zone, road configuration, and the like), the weather and road conditions at the time of the incident, other vehicles involved but not damaged (e.g., a vehicle that induced a swerving maneuver), and the like. Based on the information provided by all parties, the simulation can also be embedded with a confidence score regarding the accuracy of the simulation, with an output that can either corroborate or disprove the inputs, statements, and/or evidence provided by the claimant user 197

For example, the claimant user 197 may assert that the left rear quarter panel was severely damaged in the collision. Based on the contextual information provided by all parties, the simulation engine 150 can output a simulation with a relatively high confidence that the left rear quarter panel was not damaged in the incident, and therefore the claimant user 197 may be providing inconsistent or misrepresentative information. As described herein, computing system 100 can concurrently initiate the fraud detection engine 160 to identify any inconsistencies in the contextual information provided by the claimant user 197 based on the information provided by the other individuals (e.g., witnesses and the simulation outputted by the simulation engine 150). If fraud is detected, the fraud detection engine 160 can transmit a fraud trigger to the content generator 130 which can indicate each instance of fraud on the claimant's part in the claim interface provided to the claimant's policy provider 185, as described in further detail below. Additionally or alternatively, one or more detected instances of fraud can trigger the content generator 130 to communicate with additional parties associated with the claimant's policy provider 185.

As described herein, the fraud detection engine 160 can further access any records and contact any third-parties relevant to the vehicle incident and/or personal injury event. Such records may include medical records corresponding to treatment of the claimant's injuries and the injuries to any other parties to the incident, any prior criminal records of any party involved, prior instances of insurance fraud, vehicle valuation records (e.g., current value estimates for the model year, make and model or the damaged vehicle(s), repair records from a body shop or garage that worked on the damaged vehicle(s), and the like), and any repair records for damage that has already been repaired. In further examples, the fraud detection engine 160 can parse through other third-party resources 175, such as social media posts by the claimant and other parties, and can further parse through historical input data of the claimant on the service application 196 or other applications to determine whether any indication of fraudulent behavior has occurred (e.g., whether the claimant user 197 viewed policy information prior to the claim event).

As another example, the claimant user 197 may claim that a knee injury resulted from a claim event (e.g., a vehicle collision) and indicate so on the personal injury assessment tool of the FNOL interface. The fraud detection engine 160 may perform a lookup of the claimant user's 197 medical history and identify that the claimant user 197 has been treated for a knee injury in the past on the same leg. Furthermore, the content generator 130 may query witnesses of the claim event with regard to the claimant user's 197 behavior subsequent to the claim event, and receive corroborated statements that the claimant user 197 was walking around the location of the claim event location without trouble and did not appear to be limping. Furthermore, the fraud detection engine 160 can perform a lookup of the claimant user's recent medical treatment subsequent to the claim event and identify that the claimant user 197 was not treated for a knee injury arising from the claim event. Based on this information, the fraud detection engine 160 can transmit a fraud trigger flagging the knee injury as a potentially fraudulent claim, and the interactive content generator 130 can include information flagging the claimed knee injury as potentially fraudulent in a claim interface generated for the claimant's policy provider 185.

In further implementations, the fraud detection engine 160 can receive historical user data from the computing device 190 of a claimant user 197, which can comprise sensor data (e.g., from an accelerometer of the computing device 190), and/or location data indicating where the user 197 was located during a claim event. Additionally or alternatively, telematic information received from sensors of the user's vehicle can indicate a claim event, such as a vehicle collision. In some aspects, the telematics information can trigger the system 100 to proactively transmit content data to the computing device 190 of the user 197. If an incident has occurred, the content generator 130 can automatically initiate content flows corresponding to the FNOL interface. As an example, the sensor data or telematics information may indicate a large acceleration in accelerometer data at the moment of the claim event, indicating that the user 197 experienced a car accident. The accelerometer data and location data can be utilized by the fraud detection engine 160 to corroborate the user's location at the claim event and even the severity of the claim event itself.

During any interactive session described herein, the live engagement monitor 140 can execute machine learning and/or artificial intelligence techniques to determine responsiveness factors for each individual to which a content flow is provided. The responsiveness factors may be generalized for users based on effective engagement techniques performed for a population of users 197, or may be individually determined based on the individual engagement of the users 197 and other parties relevant to a claim event. As such, the live engagement monitor 140 can determine the various methods of content presentation that provoke response and engagement with the content flows, and create a response profile of each individual or like subsets of individuals that the content generator 130 can utilize to tailor content flows to each individual.

Furthermore, the interactive content generator 130 can leverage the various engagement triggers—corresponding to response factors indicating whether individuals engaged with the content flows and the extent of engagement with the content flows—to alter presentations, the timing of notifications, the types of notifications (e.g., text reminders, app notifications, emails, etc.) in order to maximize contextual information received from the individuals with regard to a particular claim event. Accordingly, given a particular claim, the various techniques implemented by the computing system 100 provides an intelligent means for users 197 to mitigate or prevent loss in the case of catastrophic events, convenience and ease for the users 197 in making claims, and added clarity for policy providers 185 via the claim simulation and fraud detection techniques described herein. Further still, the computing system 100 performs investigative processes for each claim automatically for policy providers 185, and presents a claim interface for each insurance claim that provides the policy provider 185 a detailed account of the claim event, the various analytics performed in investigating the claim, and any fraudulent claims, statements, or evidence arising from a given claim event.

User Computing Device

Figure 2:
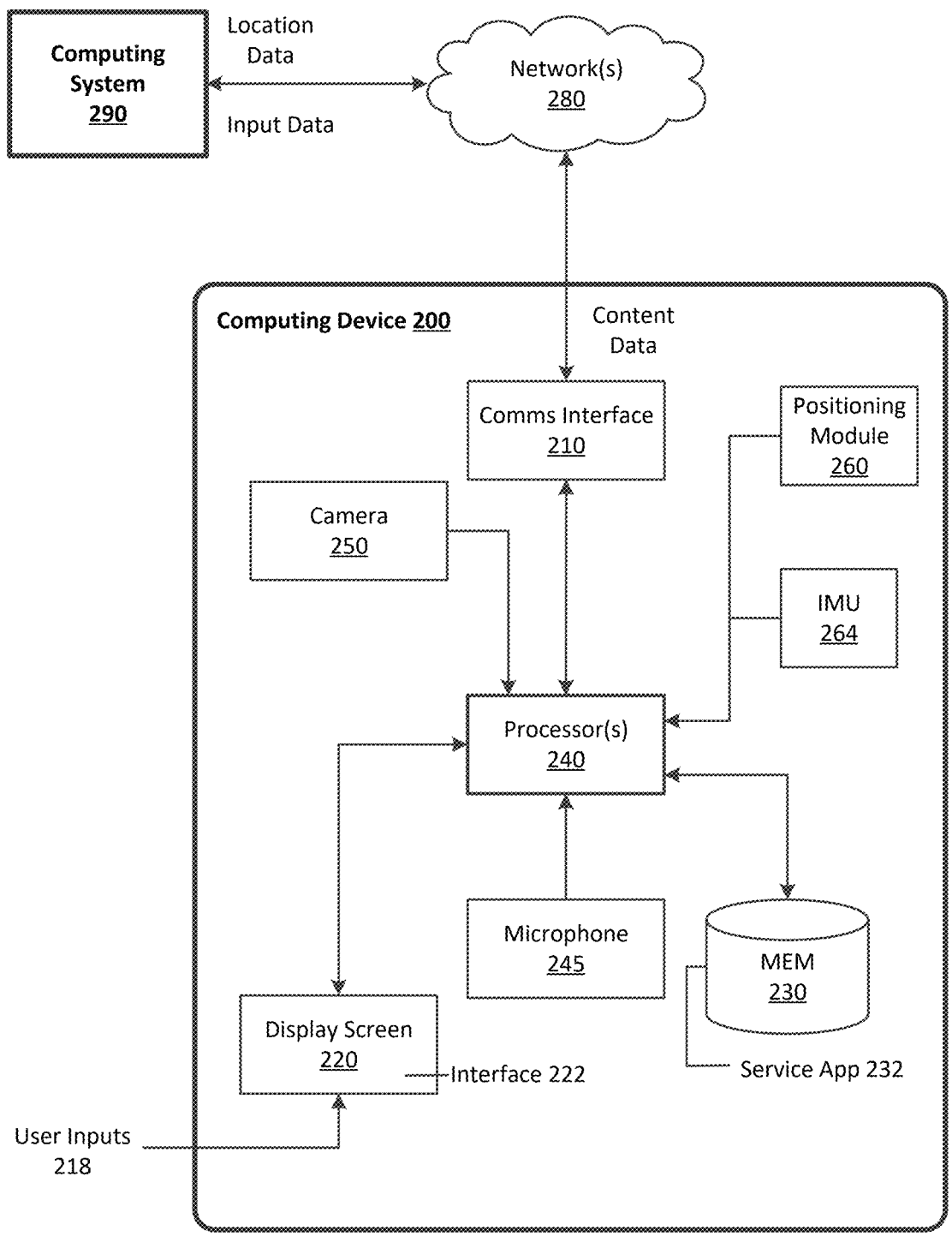
FIG. 2 is a block diagram illustrating an example computing device executing one or more service applications for communicating with a computing system, according to examples described herein.

FIG. 2 is a block diagram illustrating an example computing device executing a service application for communicating with a computing system, according to examples described herein. In many implementations, the computing device 200 can comprise a mobile computing device, such as a smartphone, tablet computer, laptop computer, VR or AR headset device, and the like. As such, the computing device 200 can include telephony features such as a microphone 245, a camera 250, and a communication interface 210 to communicate with external entities using any number of wireless communication protocols. In variations, the computing device 200 can comprise a personal computer or desktop computer that a user can engage with to access the services implemented by the computing system 100 of FIG. 1. The computing device 200 can further include a positioning module 260 (e.g., GPS receiver) and an inertial measurement unit 264 that includes one or more accelerometers, gyroscopes, or magnetometers. In certain aspects, the computing device 200 can store a designated service application 232 in a memory 230 of the computing device 200. In variations, the memory 230 can store additional applications executable by one or more processors 240 of the computing device 200, enabling access and interaction with one or more host servers over one or more networks 280.

The computing device 200 can be operated by a user 197 through execution of the service application 232, which can enable communications with the computing system 290 to access the various services described herein. As such, a user can launch the service application 232 to receive content data that causes a user interface 222 to be presented on the display screen 220. The user interface 222 can present the alerts, severity maps for a catastrophic event, mitigative content flows, the map interface described herein, the live event dashboard, and the FNOL interface described herein.

As provided herein, the application 232 can enable a communication link with the computing system 290 over one or more networks 280, such as the computing system 100 as shown and described with respect to FIG. 1. The processor 240 can generate user interface features using content data received from the computing system 290 over the network 280. Furthermore, as discussed herein, the application 232 can enable the computing system 290 to cause the generated user interface 222 to be displayed on the display screen 220 and enable the user to interact with the content flows, as further described herein.

In various examples, the positioning module 260 can provide location data indicating the current location of the user to the computing system 290. In further examples, the IMU 264 can provide IMU data, such as accelerometer data, magnetometer data, and/or gyroscopic data to the computing system 290 to, for example, enable the computing system 290 to corroborate contextual information provided in connection with a claim event. In examples described herein, the computing system 290 can transmit content data to the communication interface 210 of the computing device 200 over the network(s) 280. The content data can cause the executing service application 232 to display the user interface 222 for the executing application 232.

When a particular content flow is presented on the user interface 222, the user can provide user inputs 218 to interact with the content flows. For example, when preparedness content is presented, the user can make selections on the user interface 222 to indicate that the action items on a mitigative checklist have been performed. In another example, the user can interact with the FNOL interface to provide contextual information corresponding to a claim event, utilize the camera 250 and/or microphone 245 to record images or video for added contextual awareness, provide inputs on a presented damage assessment tool (e.g., to indicate vehicle damage or personal injury), and the like.

Example Preparedness Content

Figure 3A:
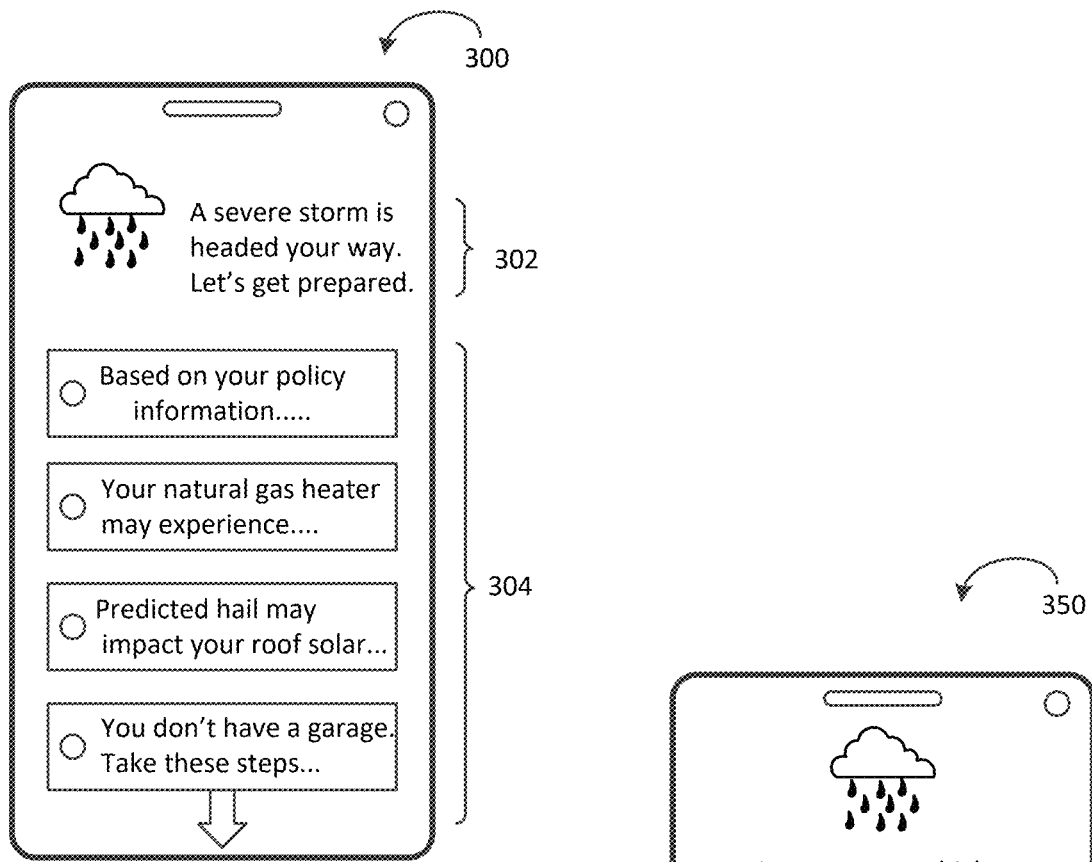
FIGS. 3A and 3B are example graphical user interfaces (GUIs) showing targeted content being presented to a user, according to various examples.
Figure 3B:
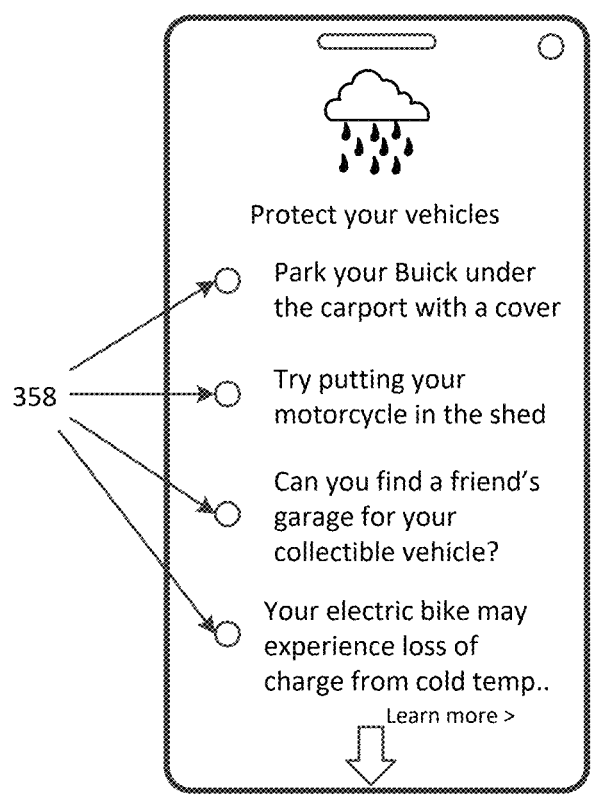

FIGS. 3A and 3B are example graphical user interfaces (GUIs) showing targeted preparedness content being presented to a user, according to various examples. Referring to FIG. 3A, the user's computing device can present an individualized preparedness content flow 300 that provides the user with an alert 302 corresponding to a catastrophic event that is predicted to affect the user and/or the user's property. The preparedness content 300 can be based on the policy information of the user and/or information obtained from third-party resources 175 that identify the unique characteristics of the user's property. Accordingly, the computing device 300 can display a customized set of items 304 for the user to consider or perform in order to mitigate or prevent loss or damage from the predicted event. As shown in FIG. 3A, each action item in the set 304 may be selectable to provide the user with additional information regarding each determined risk to the user's property and suggested actions to perform to address each risk.

In some examples, the set of items 304 may be presented in a prioritized manner, for example, based on value, potential damage cost, and/or items that correspond to higher risk of loss or damage. In such examples, higher priority action items may be presented at the top of a scrollable list or more prominently on the display screen of the user's computing device.

FIG. 3B shows a set of mitigative action items 350 in a sub-category based on a selection from the content flow shown in FIG. 3A. In various examples, each action item can include a selectable feature 358 that enables the user to indicate whether the action item has been performed. In the example shown in FIG. 3B, the user is provided with a checklist of action items to protect the user's vehicles from the severe storm that is predicted to affect the user. As provided herein, the computing system 100 can provide reminders to the user prior to the event to provoke the user into performing the action items. As the user engages with the content flows 300, 350, input data is provided to the computing system 100, which can dynamically adapt the flows accordingly, as described herein.

Methodology

In the various methods described in connection with flow charts throughout the present disclosure, reference may be made to reference characters representing like features as shown and described with respect to FIGS. 1 and 2. Furthermore, each process or step described in connection with any flow chart of the present disclosure need not be performed in any particular order, and may be combined with, precede, or follow any other process or step in any other flow chart presented in the figures. As provided herein, the computing system 100 of FIG. 1 can implement the steps described in the flow charts presented in the figures and described below.

Figure 4A:
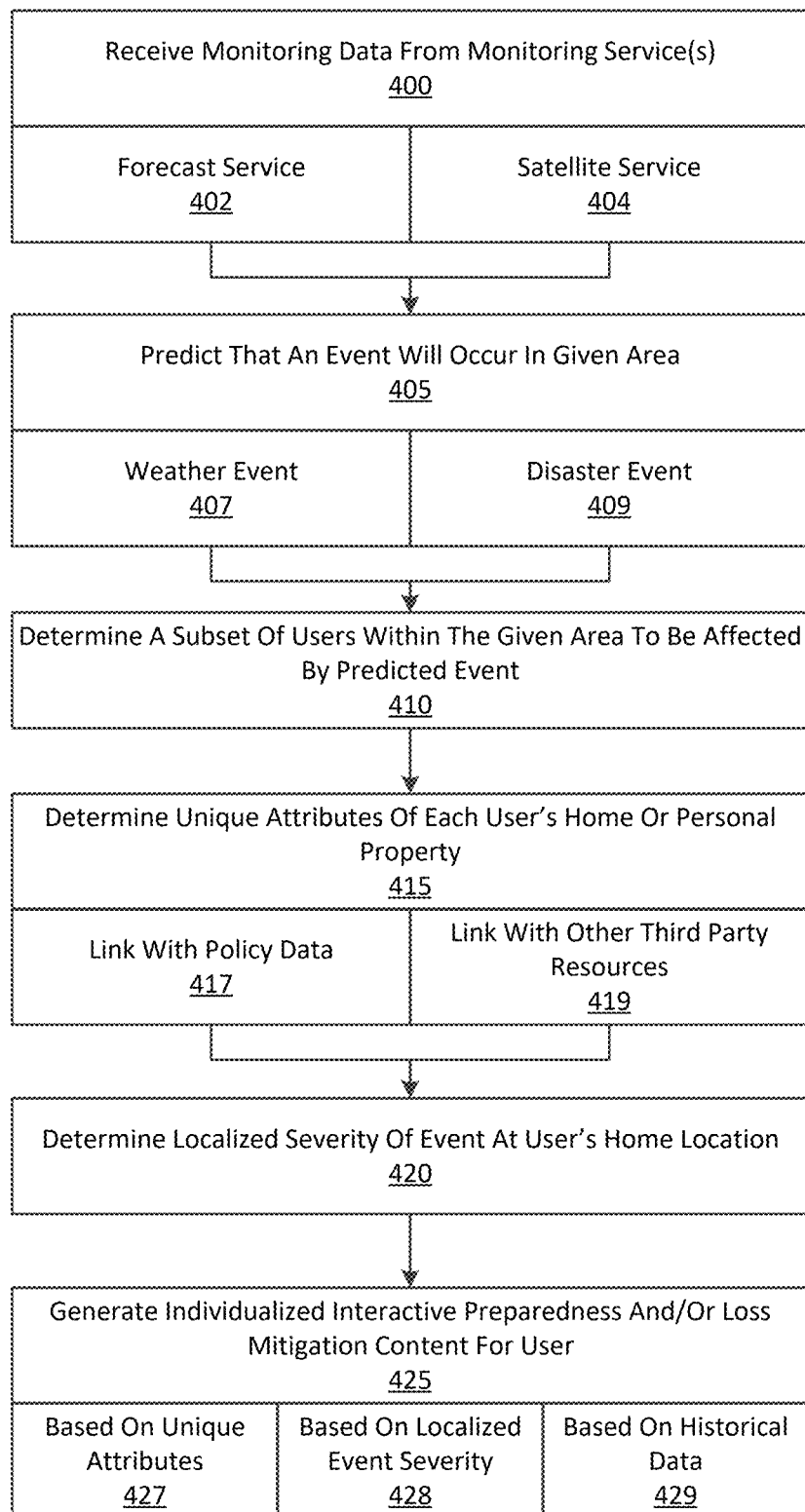
FIG. 4A is a flow chart describing an example method of predicting a claim event affecting a set of users, according to various examples.

FIG. 4A is a flow chart describing an example method of predicting a claim event affecting a set of users, according to various examples Referring to FIG. 4A, the computing system 100 can receive monitoring data from the computing systems of one or more event monitoring services (400). As provided herein, the monitoring services can comprise a weather forecasting service (402) and/or a satellite service (404). Additionally, the computing system 100 can receive additional monitoring data from additional monitoring resources 180, as described above. The computing system 100 then predicts that an event will occur in a given geographic area (405). The event can comprise a catastrophic weather event (407), such as a hurricane, severe rainstorm or snowstorm, a tornado, a hailstorm, high wind conditions, extreme cold, extreme heat, and the like. Alternatively, the event can comprise a predicted disaster event, such as a wildfire, earthquake, volcanic eruption, drought, power outage, flood, chemical spill, mudslide, avalanche, and the like.

According to examples provided herein, the computing system 100 can determine a subset of users 197 within the given area that are predicted to be affected by the event (410). Prior to the event, the computing system 100 can determine the unique attributes of each user's home and/or personal property (415). For example, the computing system 100 can link with or perform a lookup of the user's policy data to determine which items of property are covered by insurance (417). Additionally or alternatively, the computing system 100 can link with or otherwise access third-party resources 175 to determine the unique characteristics of the user's property, such as how many bedrooms and bathrooms, the current value of the user's home, construction techniques in building the user's home, the power source(s) for the user's home, the vehicles owned by the user, the water source(s) for the user's home (e.g., provided by a well or a utility), any risks from proximate trees or power lines, the size of the user's garage (if any), the roof type, whether the home has solar panels, whether the home is in a flood plain or fire area, and the like (419).

In various implementations, the computing system 100 can determine a localized severity of the event at the user's home location (420). For example, the computing system 100 can generate a severity heat map or risk heat map for the predicted area, and determine the location of the user's home within the map. When the damage and/or loss risks associated with the user's property are determined, the computing system 100 can generate individualized, interactive preparedness content—or loss mitigation content— for the user 197 (425). In various examples, the individualized content can be based on the unique attributes or characteristics of the user's property, as described herein (427). Additionally, the individualized content can further be based on the predicted localized severity of the event at the user's property location (e.g., the user's home) (428). The individualized content may further be based on historical data for similar events at similar locations (e.g., indicating which property features are likely to suffer damage, failure, or loss) (429). As described herein, the individualized content can comprise an interactive checklist of action items for the user 197 to perform prior to the event in order to prevent or mitigate damage or loss to the user's property.

Figure 4B:
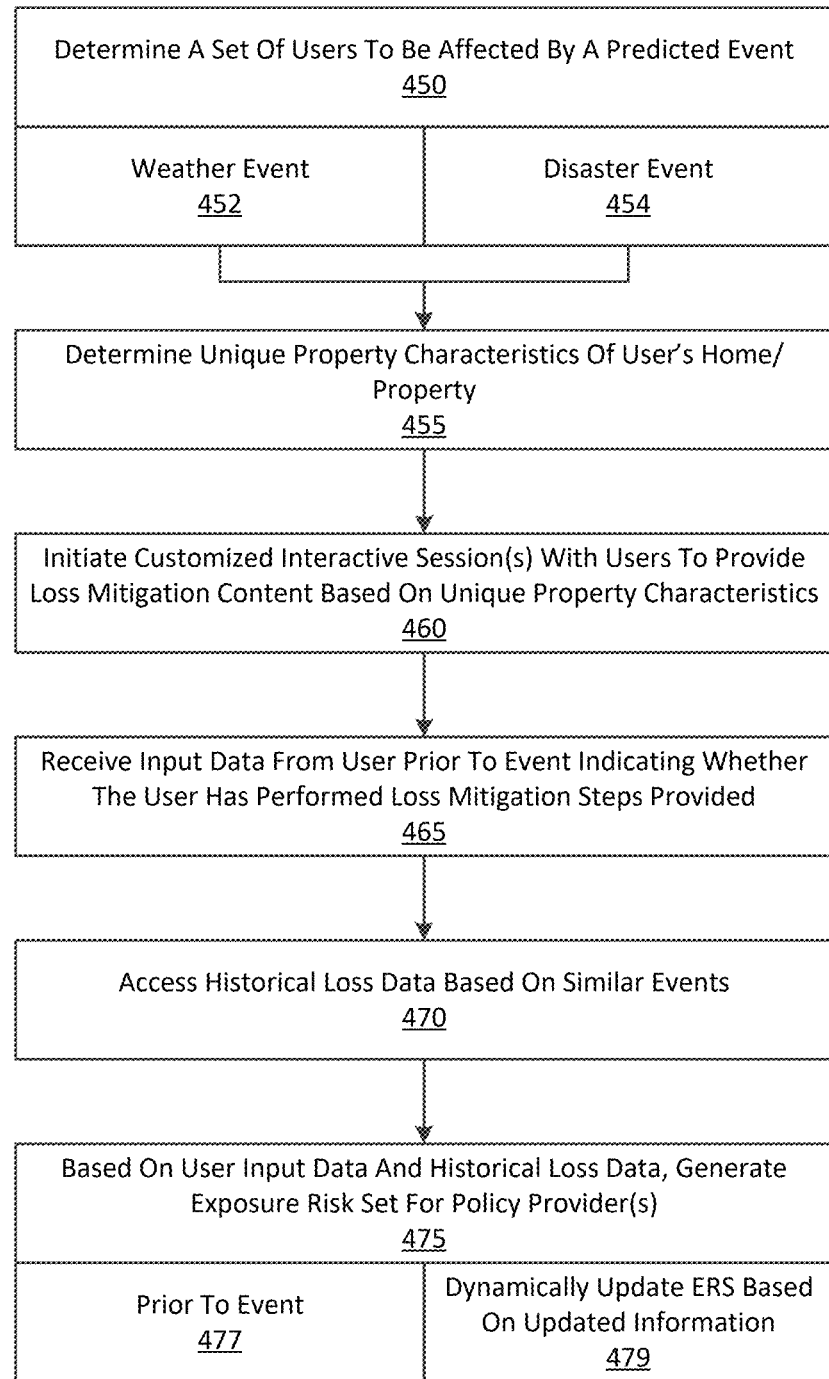
FIG. 4B is a flow chart describing an example method of providing individualized loss mitigation content to users that are predicted to be affected by an event, according to examples described herein.

FIG. 4B is a flow chart describing an example method of predicting exposure risk for policy providers 185, according to examples provided herein. Referring to FIG. 4B, the computing system 100 can determine a set of users that are predicted to be affected by an event (450). The event can comprise a weather event, such as a severe storm (452). Additionally, the event can comprise a disaster event, such as a flood, drought, or wildfire (454). In various implementations, the computing system 100 can determine the unique property characteristics of the users' homes and/or property (455).

The system 100 may then initiate customized, interactive sessions with the users 197 to provide loss mitigation content based on each user's unique property characteristics (460). The system 100 may then receive input data from each user 197 indicating whether the user 197 has performed the loss mitigation steps provided (465). As stated herein, the system 100 can further determine the policy provider 185 of each user 197 to enable the system 100 to calculate risk exposure for each policy provider 185. In various examples, the system 100 can access historical loss data for similar areas and or events to, for example, determine previous insurance payout totals and damage information from such events (470). Based on the user input data and the historical loss data, the system 100 can generate an exposure risk set for each policy provider 185 (475).

In various implementations, the exposure risk set can be generated based on predicted information corresponding to the event, and can therefore be provided to the policy providers 185 prior to the event (477). Additionally, as certainty increases with regard to the users' mitigative actions and the event itself (e.g., localized severity, path, etc.), the system 100 can dynamically update the exposure risk set for each policy provider 185 based on updated information with regard to the event (479). Accordingly, the computing system 100 provides increased certainty for insurance policy providers 185 to prepare reserves for actual claims following the event.

Example Event Dashboard

Figure 5A:
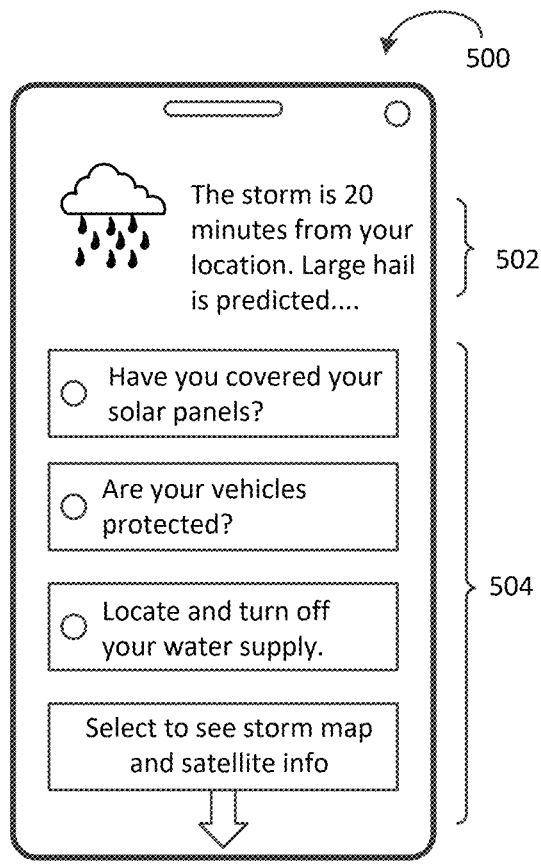
FIGS. 5A and 5B are GUIs presenting an individualized dashboard of an event, according to various examples.
Figure 5B:
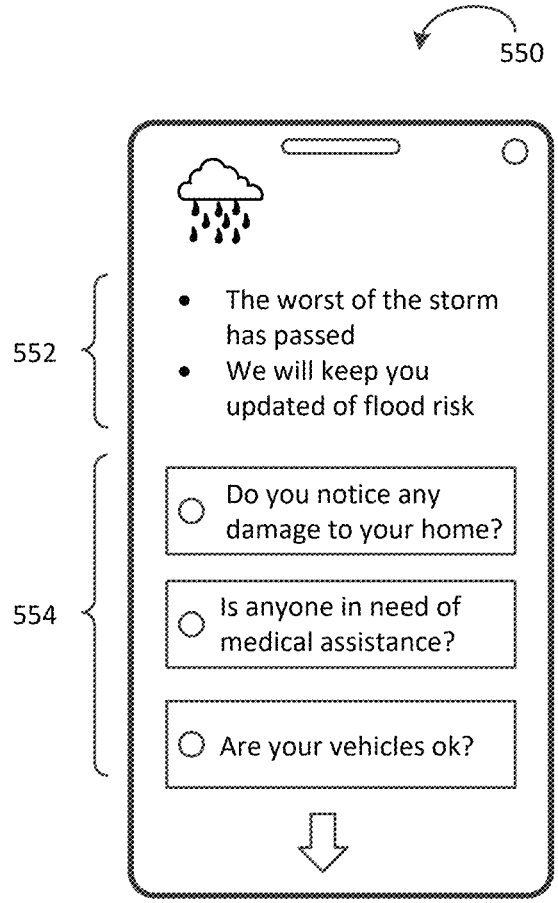

FIGS. 5A and 5B are GUIs presenting an individualized dashboard or an event, according to various examples. The GUIs shown in FIGS. 5A and 5B may be presented to users 197 as an event approaches or those who are currently experiencing an event to provide event updates and increase event awareness. It is contemplated that individually tailored content providing dynamic, highly localized event updates and mitigation content for users 197 can further increase safety and loss prevention. Referring to FIG. 5A, the event dashboard 500 can be presented on a user's computing device 190 (e.g., through execution of a designated service application 196). In further examples, when updates are detected, the system 100 can provide notifications to each affected user 197 (e.g., text updates with a link that launches the service application 196, push notifications, etc.). In certain examples, the event dashboard 500 can include an event update 502 that provides localized updates for the user 197 or the user's home. In further examples, the event dashboard 500 can also provide the user 197 with a set of interactive reminders, updated mitigative tasks, and/or added event information 504.

Referring to FIG. 5B, an updated event dashboard 550 is presented to the user 197 during the event, which can include an event update 552 providing the user 197 with current updates of the event at the user's location or home. The updated event dashboard 550 can further present a set of selectable queries 554, each of which the user 197 can select to answer the query, request assistance, and/or provide updated damage or loss information to the computing system 100. In one example, the computing system 100 can serve as an access point to various third-party services, such as emergency services, repair services, and insurance claim services. Furthermore, the additional data provided by the users 197 via the event dashboards 500, 550 can make exposure risk calculations for insurance policy providers more robust and certain.

Methodology

Figure 6:
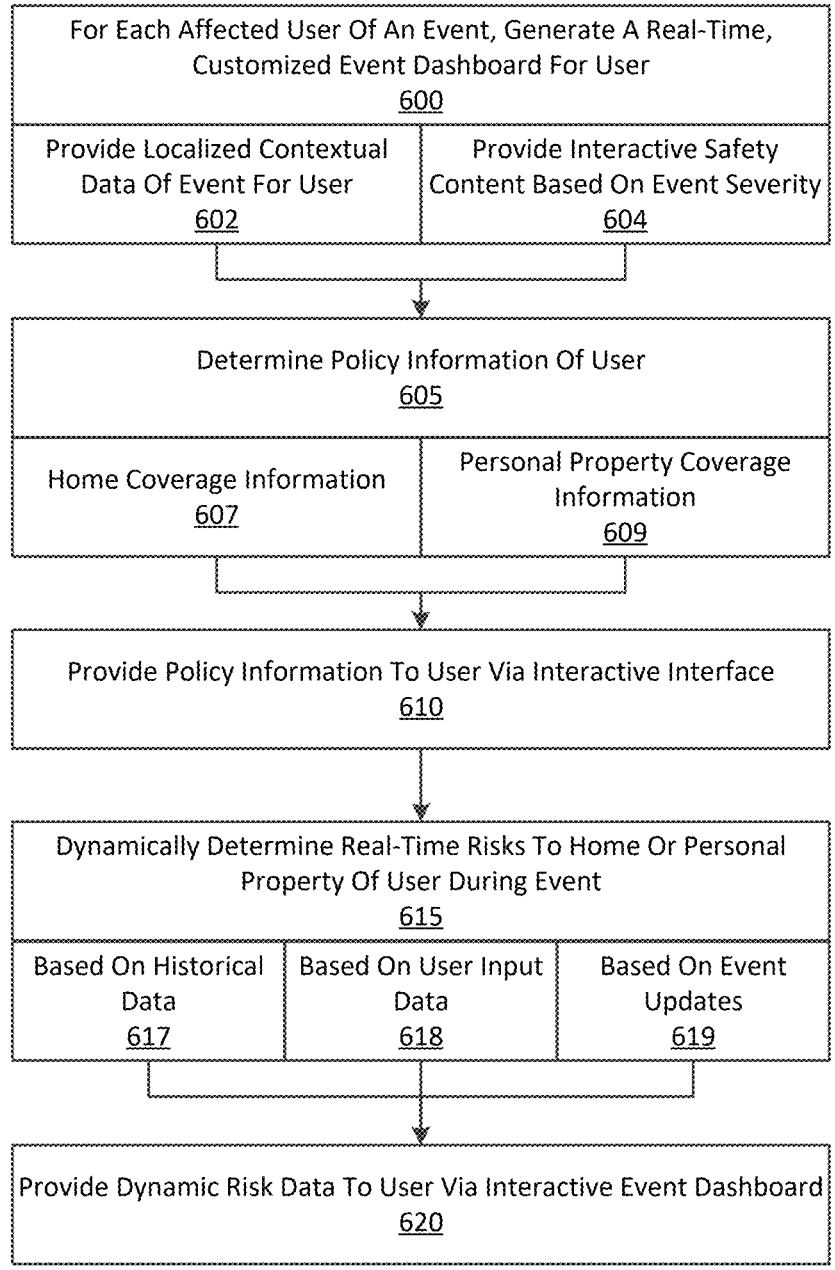
FIG. 6 is a flow chart describing an example method of dynamically interacting with a user during an event, according to various examples.

FIG. 6 is a flow chart describing an example method of dynamically interacting with a user during an event, according to various examples. Referring to FIG. 6, the computing system 100 can generate a real-time, customized event dashboard for each user 197 affected by an event (600). As provided herein, the event dashboard can provide localized contextual data corresponding to the event for the user 197, such as updates corresponding to the user's home location (602). In further implementations, the event dashboard can provide the user 197 with interactive safety content specifically tailored to the user 197 and the user's property based on the event severity at the user's location or home location (604). In certain examples, the computing system 100 can determine policy information of a particular user 197 (605). For example, the computing system 100 can determine home insurance coverage information to determine whether the user's home has insurance coverage for any effects arising from the event (e.g., flood insurance, fire insurance, etc.) (607). Additionally, the computing system 100 can determine personal property coverage information of the user 197, such as insurance coverage for any valuables or vehicles (609).

It is contemplated that users 197 typically wish to know the scope and/or extent of their insurance coverage prior to, during, or subsequent to an event. Thus, at any given time, the computing system 100 can provide the policy coverage information to the user 197 via an interactive interface (e.g., a user interface of the service application 196 (610). In such examples, the computing system 100 can compile the user's insurance policies from one or multiple policy providers 185, and generate an application user interface that enables the user 197 to view, alter, cancel, or purchase additional insurance coverage. In further implementations, the computing system 100 may provide insurance coverage recommendations to the user 197 based on the determined risks to the user's property.

In various implementations, the computing system 100 can dynamically determine real-time risks to the home or personal property of the user 197 during the event (615). As provided herein, the determination of real-time risks may be based on historical data of the user's home and/or similar homes or areas that have experienced similar events (617). Additionally, the determination of real-time risks may be based on user input data indicating whether the user 197 performed the mitigative tasks provided prior to the event (618). In further examples, the determination of real-time risks may be based on event updates localized to the user's home and/or personal property (619). The computing system 100 may then provide the dynamic risk data to the user 197 via the interactive event dashboard (620).

FNOL Interface

Figure 7A:
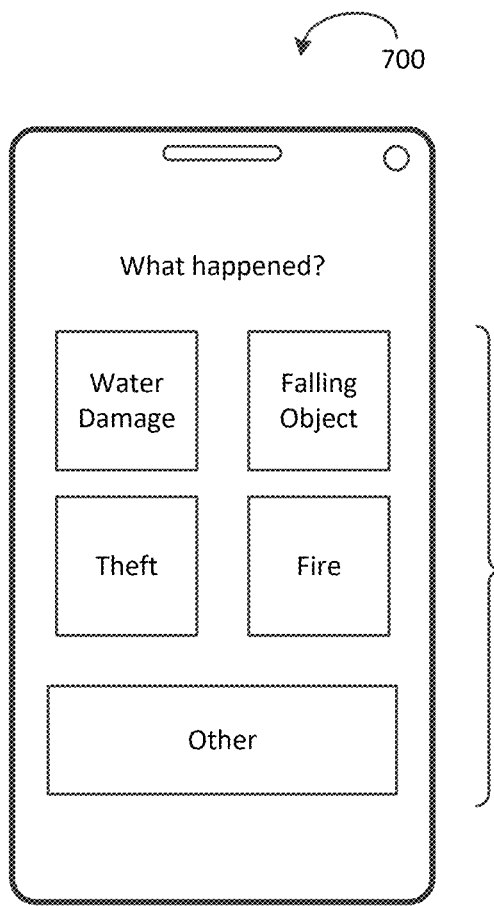
FIGS. 7A and 7B are example GUIs presenting interactive content for a user subsequent to an event, according to various examples.
Figure 7B:
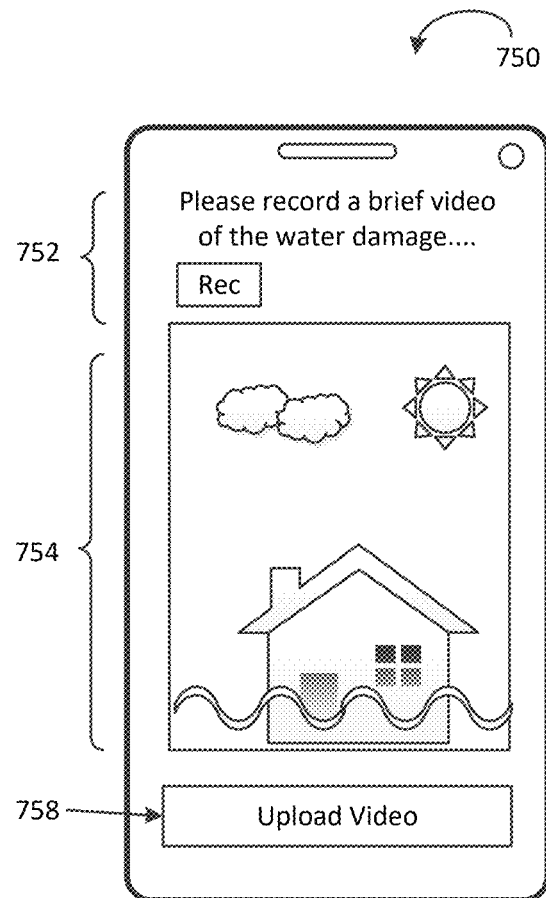

FIGS. 7A and 7B are example GUIs presenting interactive content for a user subsequent to a claim event, according to various examples. In various applications, the GUIs shown in FIGS. 7A and 7B may be comprised in a first notice of loss (FNOL) interface 700 of the service application 196 or website, and provides an intuitive and interactive gateway to configuring and sending insurance claims following claim events. Referring to FIG. 7A, an FNOL interface 700 can be accessed by the user 197 following a claim event, such as a catastrophic storm, flood, wildfire, vehicle incident, personal injury, etc. In various implementations, the computing system 100 can determine the type of event that has occurred in the user's location or home location and configure the FNOL interface presentation based on the event. For example, if a large rainstorm has just passed the user's home location, the initial screen of the FNOL interface can present selectable items that enable the user 197 to provide contextual information with regard to water damage, roof damage, damage from a falling object, vehicle damage, and the like.

According to examples described herein, the FNOL interface can present the initial screen to enable the user 197 to select from a plurality of common types of insurance claims. In the example shown in FIG. 7A, the user 197 is provided with a plurality selectable features 704 that, when selected, enable the user 197 to provide contextual information for water damage, damage from a falling object, theft of personal property, fire damage, and an "other" icon for additional types of insurance claims. Selection of the "other" icon can result in a secondary screen that presents a second tier of common types of insurance claims, such as personal injury, vehicle damage, etc.

In the example shown in FIG. 7B, the user 197 has selected the water damage feature of the FNOL interface 700 of FIG. 7A, which enables the user 197 to provide contextual information regarding water damage to the user's home resulting from the claim event. In certain examples, the FNOL interface 750 can comprise multiple screens that enable the user 197 to provide text or audio description of the damage, record images and/or video of the damage, and provide estimates or receipts for repair or current repair costs. In the example of FIG. 7B, the FNOL interface 750 can include a prompt 752 that requests that the user 197 record a video that shows the damage. Accordingly, the FNOL interface 750 can include recording functions that access the computing device's 190 camera and/or microphone, enabling the user 197 to record a video 754 or images of the claimed water damage, and an upload feature 758 that enables the user 197 to transmit the recorded video 754 to the computing system 100 for further analysis and claim processing.

Methodology

Figure 8A:
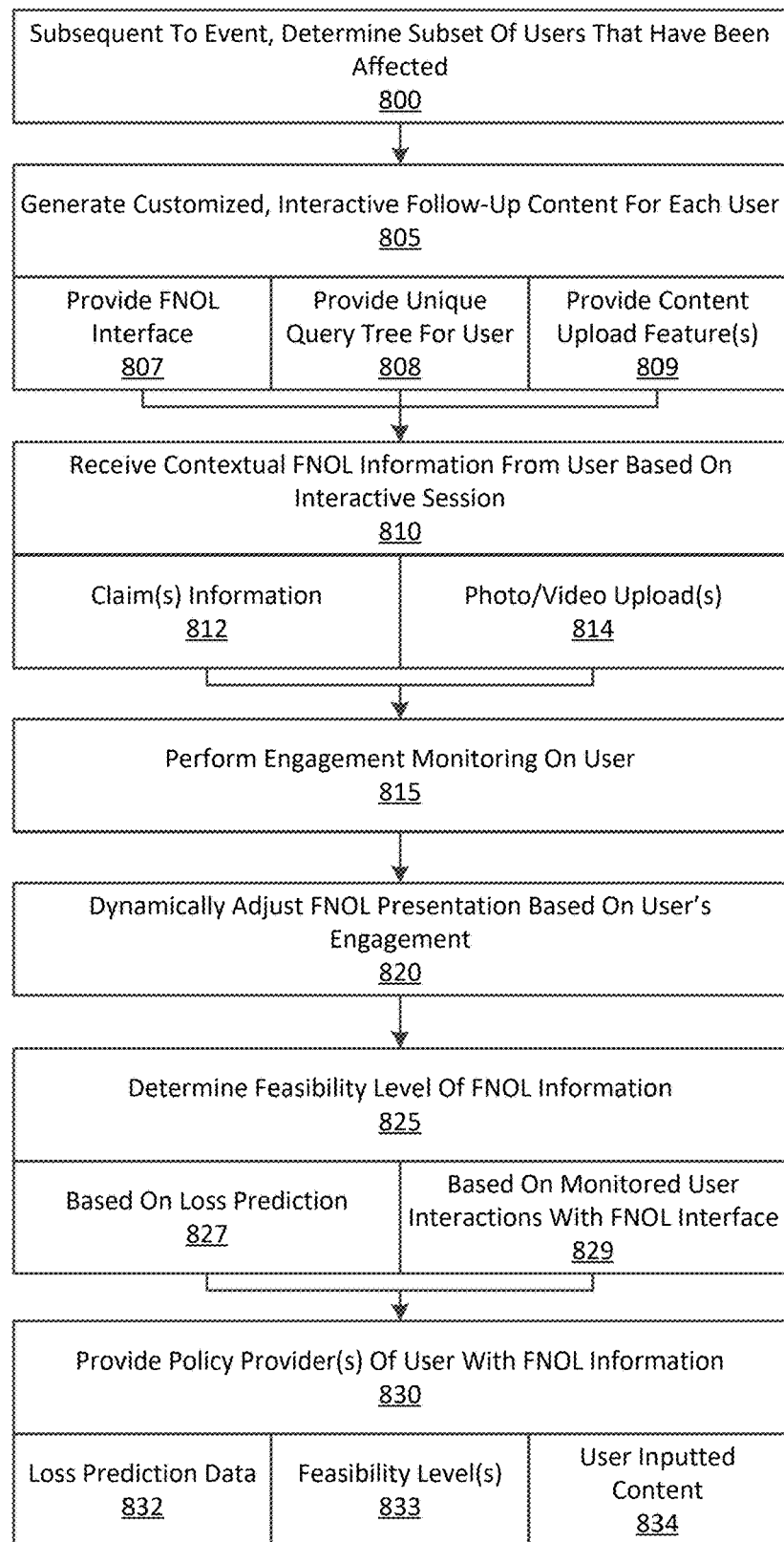
FIG. 8A is a flow chart describing an example method of dynamic interaction with a user subsequent to an event, according to various examples.

FIG. 8A is a flow chart describing an example method of dynamic interaction with a user subsequent to an event, according to various examples. Referring to FIG. 8A, the computing system 100 can determine a subset of users 197 that have been affected by an event, such as a catastrophic storm, flood, drought, wildfire, etc. (800). The computing system 100 can generate customized, interactive follow-up content for the affected user 197 (805). As described herein, the interactive follow-up content can be included in an FNOL interface that enables the user 197 to configure and transmit one or more insurance claims 807). In further examples, the follow-up content can include a unique content flow that is specific to the user's unique property characteristics (808). For example, the content flow can include a series of questions based on a lookup of the user's policy information and ask specifically about the user's make and model vehicles, the user's heating, cooling, or energy supply, damage to the user's roof or solar panels, whether the user's pet dog is okay, and the like. As further described herein, the computing system 100 can also enable content upload functions on the FNOL interface to enable the user 197 record images and/or video of any damaged sustained during the event (809).

In various implementations, the computing system 100 can receive contextual FNOL information from the user 197 based on an interactive session with the user 197 via the FNOL interface (810). The FNOL information can comprise claim information in which the user 197 identifies damaged or lost property following the claim event (812), and uploads photographs or video of the damage (814). It is contemplated that configuring insurance claims for various policy providers 185 has typically resulted in a poor user experience with the requirement of filling out various boilerplate forms and other tedious activities (e.g., calling an insurance adjuster, setting multiple phone meetings, meeting with insurance investigators, and other forms of bureaucracy). The FNOL interface and interactive session with the computing system 100 is designed to reduce tediousness commonly experienced by claimants by providing a single gateway for providing contextual information regarding damaged property or injury to any number of policy providers 185.

According to many examples, the computing system 100 can execute engagement monitoring techniques via the FNOL interface to provoke or otherwise influence the user 197 into providing as much contextual information as needed for a robust insurance claim 815). For example, the computing system 100 can monitor the user's inputs on the FNOL interface, timing information on various screens (e.g., how long the user 197 views a particular screen without providing input), which screens the user 197 chooses to ignore (e.g., if the user 197 refuses to record video of damage), whether the user 197 uploads a previously recorded image or a currently recorded image, etc.

As described above, the computing system 100 can further dynamically adjust the FNOL presentation based at least in part on the user's engagement with the FNOL interface (820). For example, if the video quality of an uploaded video is poor or does not adequately show claimed damage, the computing system 100 can prompt the user 197 to record additional content that clearly shows the claimed damage. As another example, if the user 197 does not complete a damage assessment content flow provided via the FNOL interface, the computing system 100 can transmit a subsequent notification prompting the user 197 to complete the content flow in order to configure as robust of an insurance claim as possible.

When a final interactive session with the user 197 via the FNOL interface is complete (e.g., when the user 197 completes the damage assessment content flow(s) or when the user 197 chooses not to proceed further into the content flow), the computing system 100 can determine a feasibility of one or more aspects of the FNOL information provided by the user 197 (825). In various examples, the computing system 100 can do so based partially on a loss prediction for the user 197 prior to the claim event (827). For example, prior to the event, the user 197 will have been provided with a customized loss mitigation content flow comprising a set of mitigative tasks that the user 197 may or may not have performed. Based on the performance or non-performance of the mitigative tasks, the computing system 100 can predict an estimated loss or damage amount and the specific property characteristics that were predicted to sustain loss or damage. If the claims configured by the user 197 are wildly different from the predictions by the computing system 100, then the computing system 100 may flag one or more suspect claims, statements, or pieces of evidence provided by the user 197 for further investigation, which can be automatically performed by the computing system 100.

As such, the feasibility determination may further be based on monitored user interactions with the FNOL interface or the service application 196 (829). For example, the computing system 100 can monitor inputs made via the service application 196 to determine whether the user 197 performed actions which could be deemed suspicious by the user's policy provider 185, such as viewing policy information prior to configuring each claim (e.g., a possible indicator that the user 197 may be making a fraudulent claim). The computing system 100 can further perform analytics on images and video recordings, such as parsing through metadata to determine timestamps of the images and/or video, cross-referencing image and/or video data to determine consistency (e.g., whether an item is undamaged in one image and subsequently damaged in another image in which a claim is filed for the item), and the like. As described in further detail below, the computing system 100 may further perform corroboration techniques to acquire additional contextual information regarding the claimant user 197 and the user's property by contacting known associates of the user 197, neighbors, family members, coworkers, etc.

The computing system 100 may then provide the policy provider(s) 185 of the user 197 with a data set comprising the FNOL information of the user 197 (830). The data set can include loss or damage prediction data determined prior to, during, or after the claim event (832). The data set can further indicate feasibility levels with regard to the FNOL information provided by the user 197. For example, if the computing system 100 receives FNOL information from the user 197 that substantially aligns with the predicted loss and/or damage, and does not detect any fraudulent activity on the part of the user 197, then the feasibility levels may indicate a high level of feasibility that the claims made by the user 197 are accurate and truthful. However, if the computing system 100 detects fraudulent activity on the part of the user 197 in configuring an insurance claim, the computing system 100 can indicate low feasibility with respect to one or more claims, flag the statement(s), image(s), and/or video(s) that are deemed to be suspicious, and provide a description of the low feasibility in a claim interface provided to the policy provider 185, as described in further detail below.

The FNOL information provided to the policy provider(s) 185 of the user 197 may further include the user-submitted contextual information based on the user's interactions with the FNOL interface (834). This information can include all statements, descriptions, identifiers of lost or damaged items and property, recorded content of damaged property, injury descriptions and images and/or recordings of injuries, and the like. Accordingly, the policy provider 185 is provided with a complete data set for each insurance claim made by the user 197, with a claim that indicates the computing system's analytics with regard to the contextual information provided by the user 197, and any flagged information that may indicate fraudulent activity.

Figure 8B:
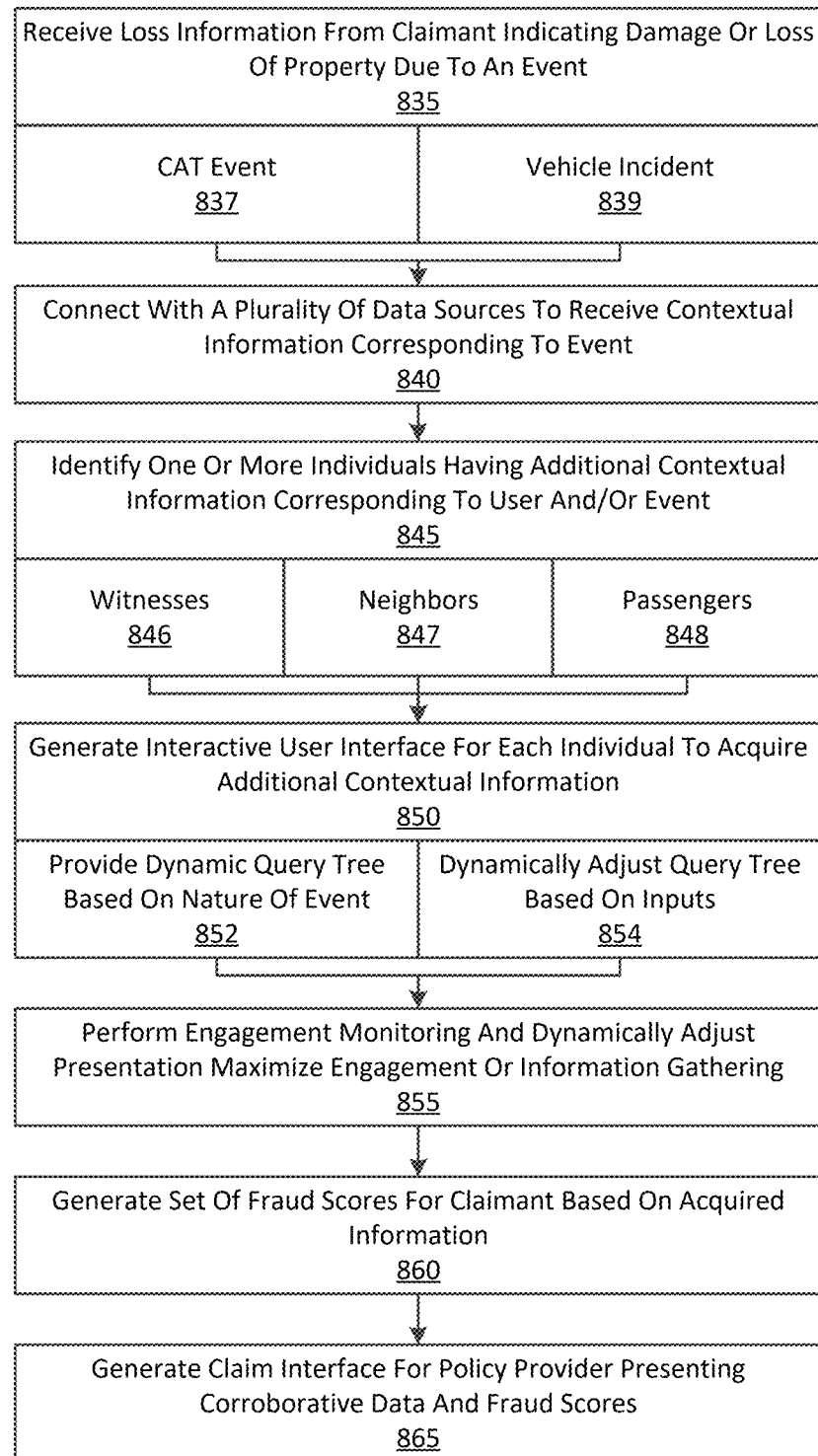
FIG. 8B is a flow chart describing an example method corroborating first notice of loss (FNOL) information from a claimant subsequent to an event, according to various examples.

FIG. 8B is a flow chart describing an example method corroborating FNOL information from a claimant user 197 subsequent to an event, according to various examples. Referring to FIG. 8B, the computing system 100 may receive loss, damage, and/or injury information from a claimant user 197 indicating property damage or loss of property due to a claim event (835). As described herein, the claim event can comprise a catastrophic event, such as a severe storm (e.g., snowstorm, hailstorm, rainstorm, hurricane, tornado, etc.), a flood, a wildfire, a drought, an earthquake, a mudslide, an avalanche, and the like (837). The claim event may also comprise a vehicle incident, such as a collision with another vehicle, a single vehicle collision, a collision with a pedestrian or bicyclist, a stolen vehicle, a damaged vehicle by way of vandalism, and the like (839). In further implementations, the loss or damage information can include personal injury information when the claimant user 197 is injured by a claim event.

In various implementations, the computing system 100 can perform corroboration techniques for insurance claims automatically. In doing so, the computing system 100 can connect with a plurality of data sources 175 to receive additional contextual information corresponding to the claim event (840). For catastrophic events, the computing system 100 can perform lookups of severity heat maps and internal or third-party weather resources to cross-reference with the claimant user's home location for feasibility determinations and loss estimates regarding property damage. The computing system 100 can further access construction information corresponding to the construction of the user's home and the contractor that performed the construction (e.g., to determine whether the contractor has a history of shoddy work), and building code data for the user's home location (e.g., to determine whether the user's home was built to code).

For vehicle incidences and/or personal injuries, the computing system 100 can access motor vehicle records to receive vehicle information of the claimant user's vehicle (e.g., current value, previous damage information, previous insurance claims, etc.) and any other vehicles involved in the claim event. The computing system 100 can further access body shop records for cost information of damage that has already been repaired, health care databases to look up injuries that have been treated and treatment costs, and any other database that may store relevant information regarding the claimant user 197 (e.g., criminal records, previous insurance claim data, job history records, social media records, etc.). In further implementations, the computing system 100 can identify one or more individuals that have additional contextual information corresponding to the claimant user 197 and/or the claim event (845). Such individuals may comprise witnesses to the claim event or witnesses to the damage to the user's home (846), neighbors of the user 197 that may have relevant knowledge of the user's character or who may have witnessed the damage to the user's property (847), or passengers or other victims in a vehicle incident (848).

In various implementations, the computing system 100 can generate an interactive user interface for each of the identified individuals to acquire the additional contextual information (850). As provided herein, the interactive user interface presented to the individuals may be similar to the information gathering features described with respect to the FNOL interface above, and may include a content flow based on the nature of the event and damage claimed by the claimant user 197 (852). The content flow can include a question flow that may ask the individual a series of questions regarding the claimant user 197 and/or the damage to the user's property or injuries sustained by the claimant user 197. For example, the question flow may ask whether the individual witnessed a vehicle incident involving the claimant user 197, and if so, may ask further questions regarding the nature of the incident and seek to corroborate, validate, or invalidate certain claims made by the claimant user 197. As such, the computing system 100 can dynamically adjust the content flow based on the information provided by the individual and/or the engagement of the individual with the content flow (854).

As additional contextual information is gathered, one or more issues may arise regarding contextual information initially provided by the claimant user 197, such as an inconsistency with regard to vehicle damage, property damage, lost property, or injury. In such a scenario, the computing system 100 may perform follow-up operations with the identified individuals to parse out the inconsistency, and either flag the inconsistency as potentially fraudulent or resolve the inconsistency through further investigation. In various implementations, the computing system 100 can further perform engagement monitoring techniques on the additional individuals to dynamically adjust the content flow presentations to either maximize engagement or maximize information gathering until the individual completes the content flow(s) (855). For example, the individual may be busy or disinterested in getting involved in the claim. In such an example, the individual may be provided with reminder notifications to complete the content flow(s) and/or incentives for completing a content flow (e.g., discounted insurance offers).

Based on the corpus of contextual information gathered in connection with a claim event or insurance claim, the computing system 100 can perform internal analytics on the information (e.g., corroborative analytics, image/video analysis, records processing, etc.) and generate a set of fraud scores for the claimant user 197 (860). As described herein, the set of fraud scores can indicate the information items of the contextual information provided by the claimant user 197 that are robust and/or the information items that are potentially fraudulent. The computing system 100 may then generate a claim interface for the user's policy provider(s) 185 presenting the corroborative data and set of fraud scores to complement the claimant user's insurance claim(s) (865).

Figure 8C:
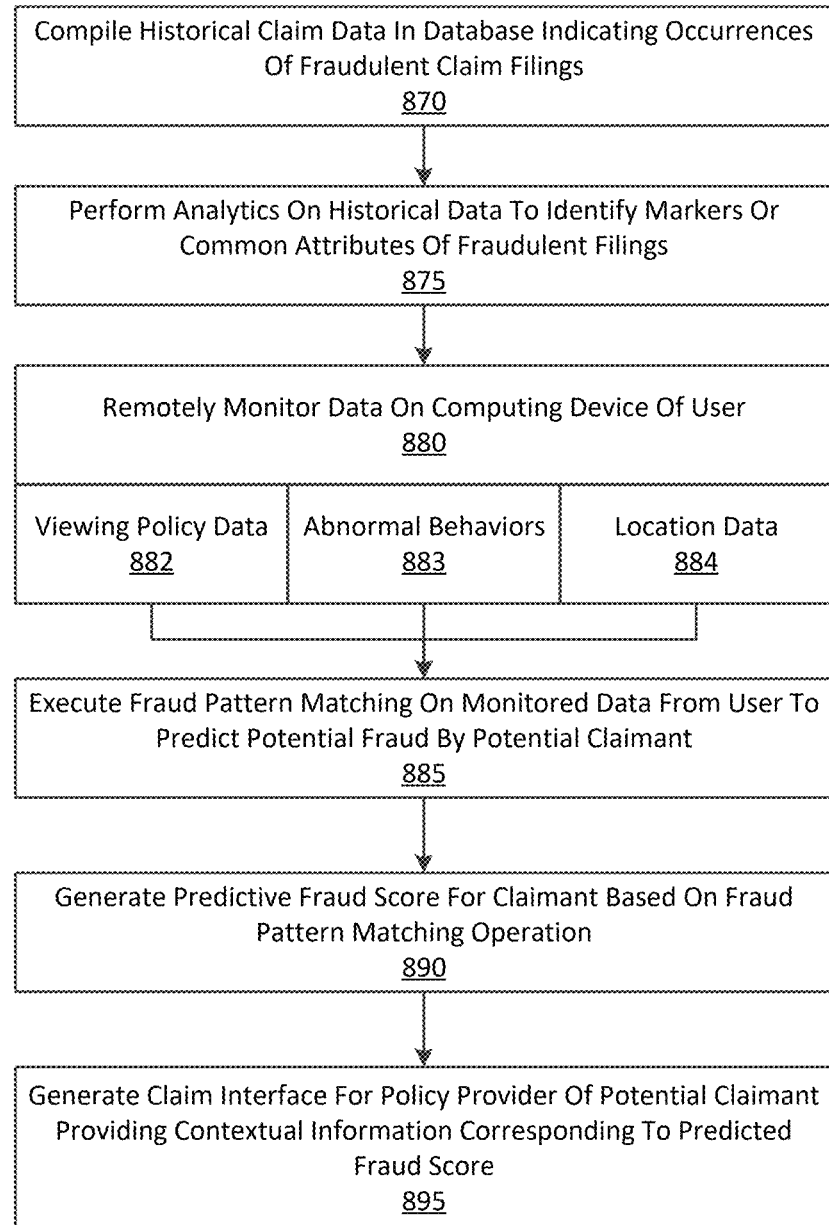
FIG. 8C is a flow chart describing an example method of executing fraud pattern matching utilizing historical data, according to various examples.

FIG. 8C is a flow chart describing an example method of executing fraud pattern matching utilizing historical data, according to various examples. Referring to FIG. 8C, the computing system 100 can compile historical claim data in a database 110 that indicates various aspects of fraudulent claim filings (870). The computing system 100 may perform an analysis of the historical claim data to identify any markers or common attributes of the fraudulent claim filings (875). For example, the computing system 100 may identify that when claimants file insurance claims for items that are unrelated to the primary claim (e.g., a valuable item lost in a vehicle accident) there is a high likelihood of fraud. In various examples, the computing system 100 can remotely monitor data on the computing device 190 of the user 197 (880). For example, the computing system 100 can determine whether the user 197 viewed policy information prior to a claim event or prior to making an insurance claim 882), which may trigger a fraud flag for further investigation.

The computing system 100 may further monitor the user's computing device 190 for abnormal behaviors (883), such as parsing search engine history indicating that the user 197 has looked up websites providing information about fooling the insurance industry or teaching the user 197 how to make fraudulent claims. The computing system 100 may further monitor location data from the user's computing device 190 (884), which may indicate whether the user 197 frequently visited the site of a subsequent claim event (e.g., indicating planning by the user 197), or if the user 197 did not evacuate a home when an evacuation order was given.

Based on the fraud analysis of the historical claim data and the monitored user data, the computing system 100 can execute one or more fraud pattern matching techniques to predict whether the user 197 will file a fraudulent claim (885). As provided herein, the fraud pattern matching may be preemptive and in certain scenarios, the computing system 100 may detect a fraud pattern prior to an insurance claim filing. In variations, the computing system 100 may perform the fraud pattern matching subsequent to the user 197 initiating a claim filing (e.g., the user 197 opening the FNOL interface). In further examples, the computing system 100 can independently initiate fraud pattern matching on all users 197 that are predicted to be affected by an event.

The computing system 100 may then generate a predictive fraud score for the claimant user 197 based on the fraud pattern matching operation (890). The predictive fraud score may be transmitted to the policy provider(s) 185 of the claimant user 197, or subsequently included in a claim interface for the policy provider(s) 185 after the claimant user 197 files an insurance claim. Thus, the computing system 100 can generate a claim interface for the policy provider(s) 185 of the claimant user 197 that provides contextual information corresponding to the predicted fraud score (895). The predictive fraud score can accompany a data set that indicates the user activity that prompted the computing system 100 and flag potential fraud on the user's part.

As an example, an owner of a deteriorating restaurant may view policy information several times before a fire destroys the restaurant. The viewing of policy information by the restaurant owner may trigger the computing system 100 to access tax information of the restaurant and/or the owner, which may identify operational losses and large debts. Based on this information, the computing system 100 can generate a predictive fraud score for the restaurant owner prior to the fire, which can be referenced subsequently when the restaurant owner files an insurance claim for the loss of the restaurant due to fire.

Damage and Injury Assessment Interfaces

Figure 9A:
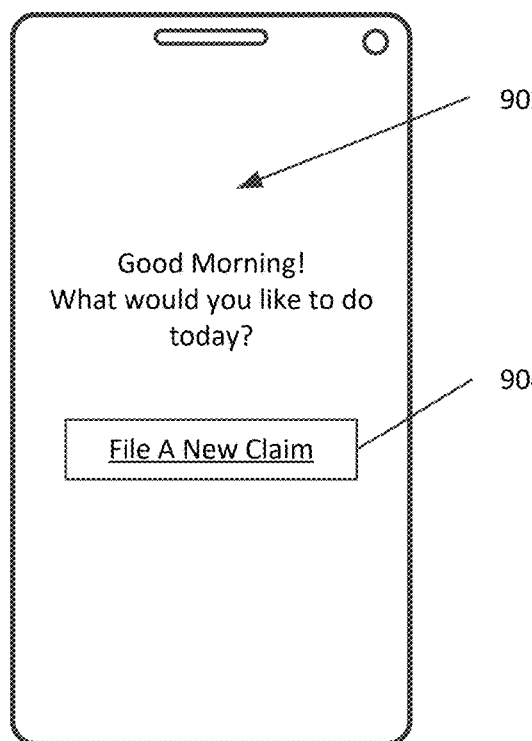
FIGS. 9A-9X illustrate a series of interactive GUIs that enable a claimant to initiate a claim, according to examples.
Figure 9C:
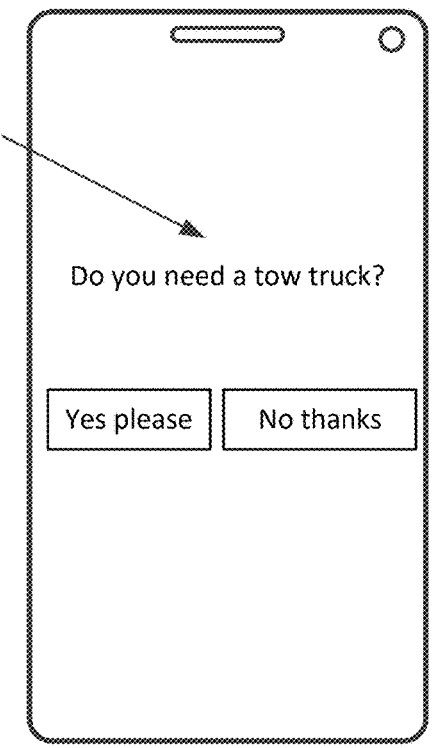
Figure 9B:
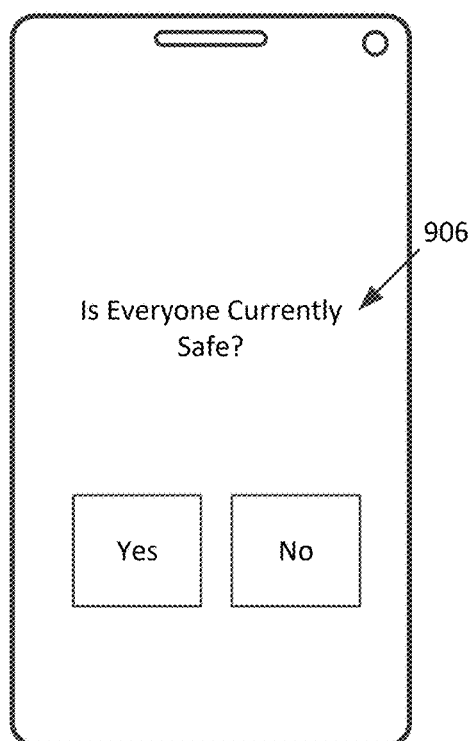
Figure 9D:
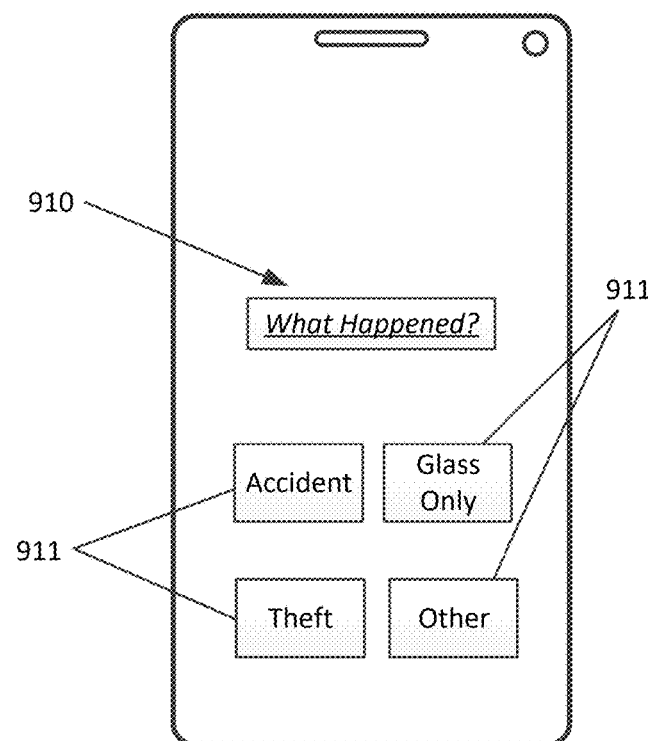
Figure 9E:
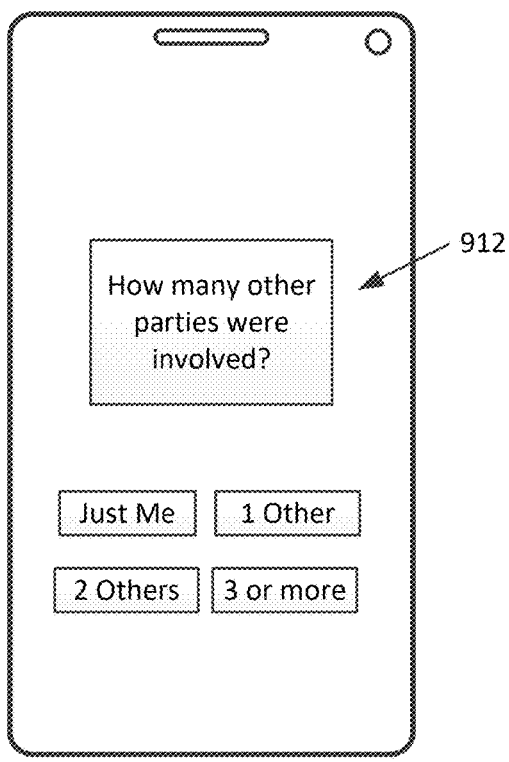
Figure 9G:
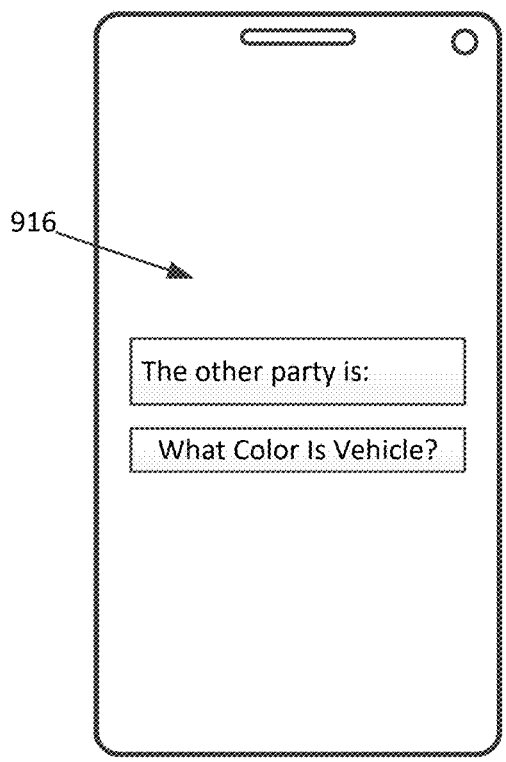
Figure 9F:
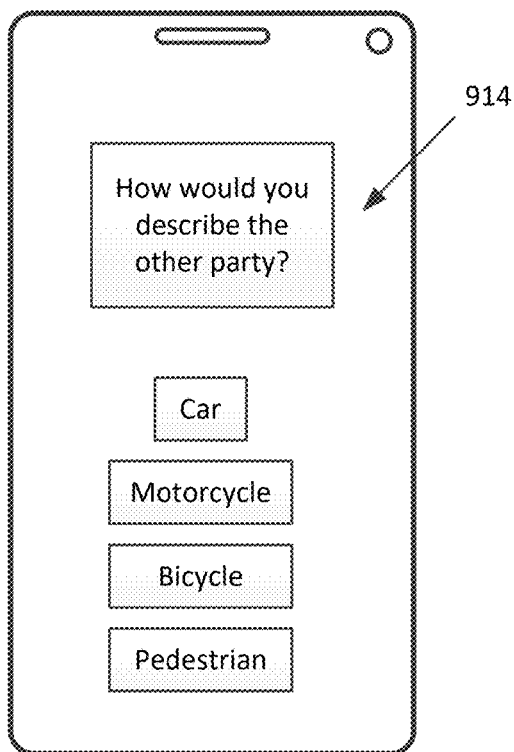
Figure 9H:
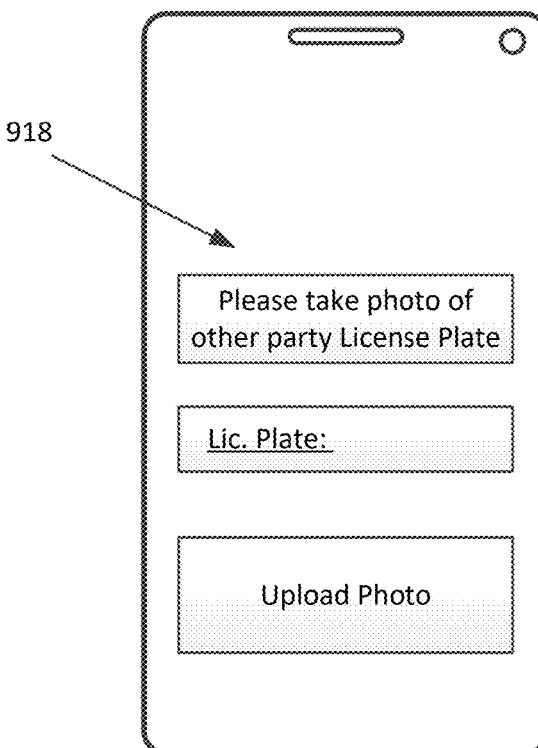
Figure 9I:
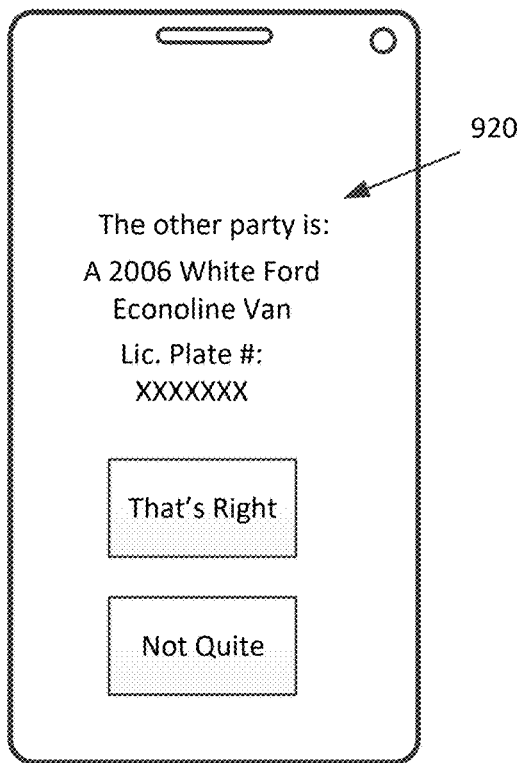
Figure 9K:
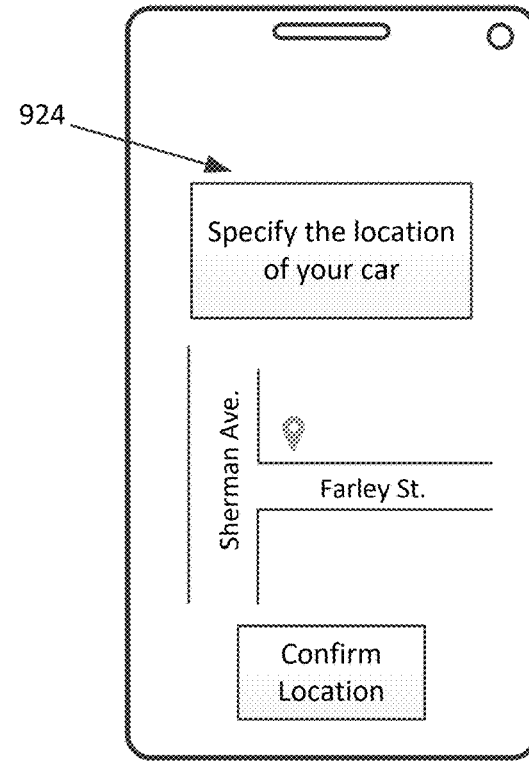
Figure 9J:
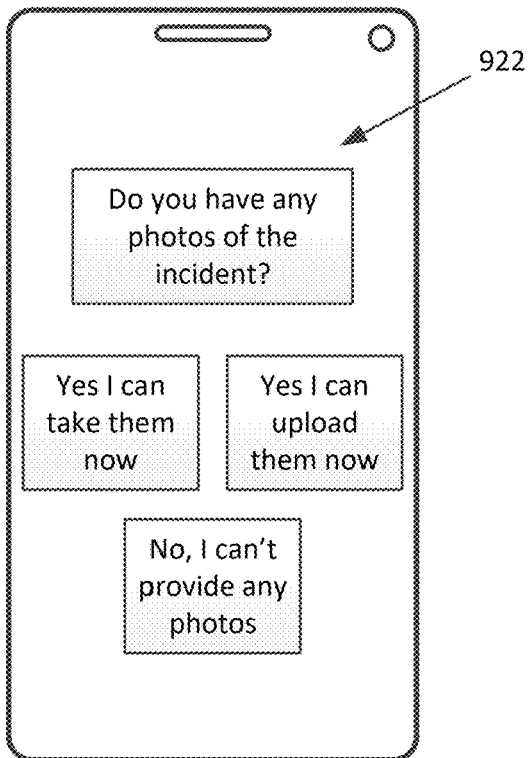
Figure 9L:
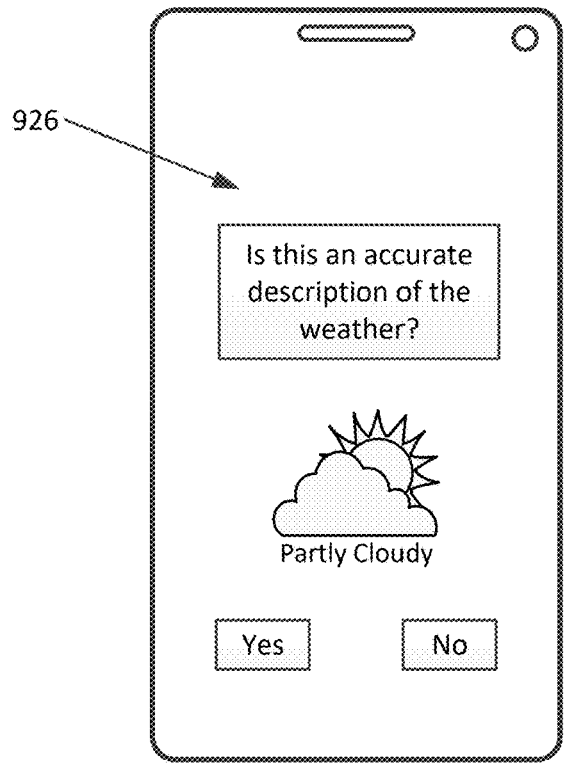
Figure 9M:
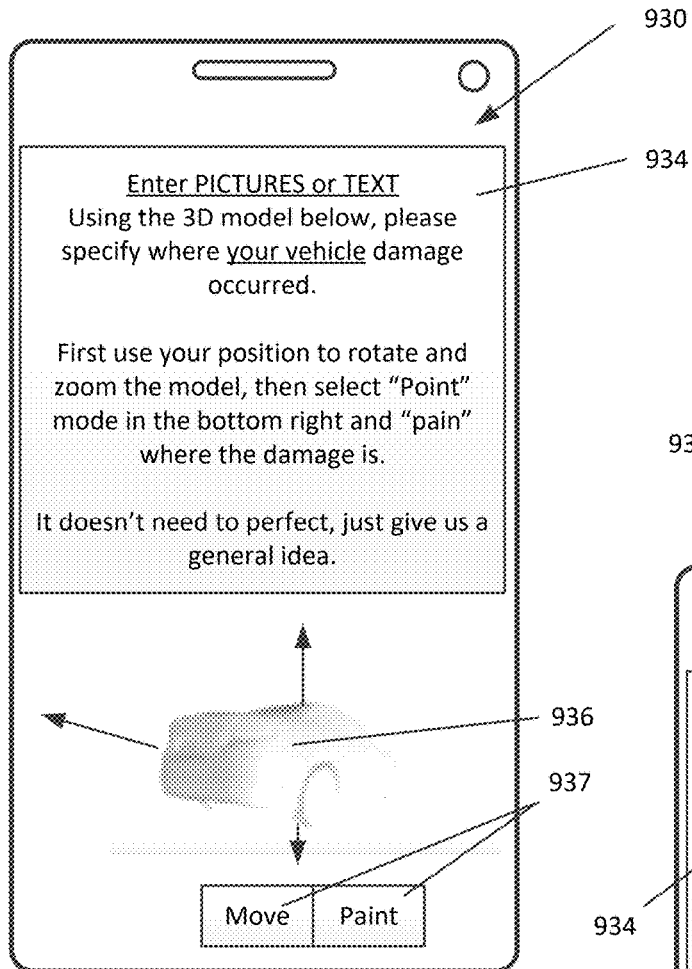
Figure 9N:
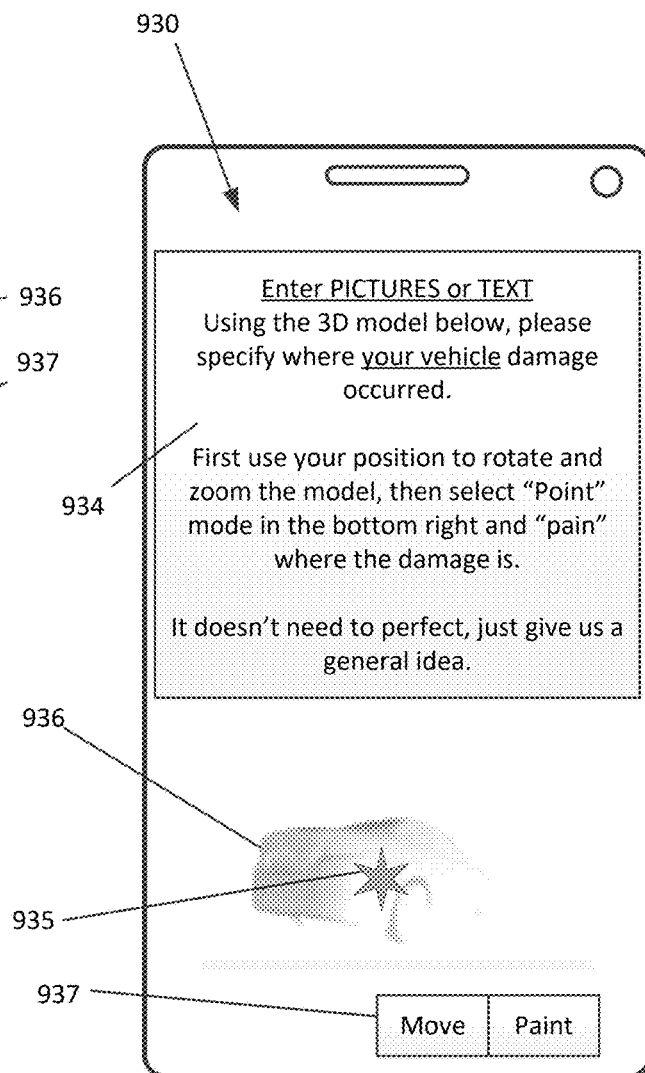
Figure 9O:
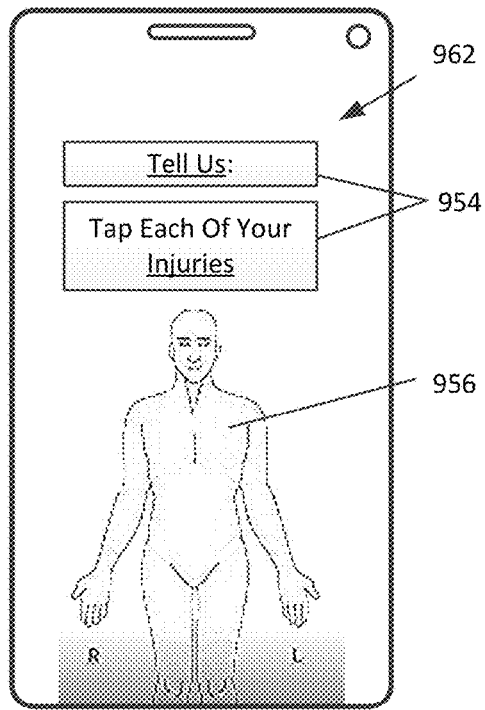
Figure 9Q:
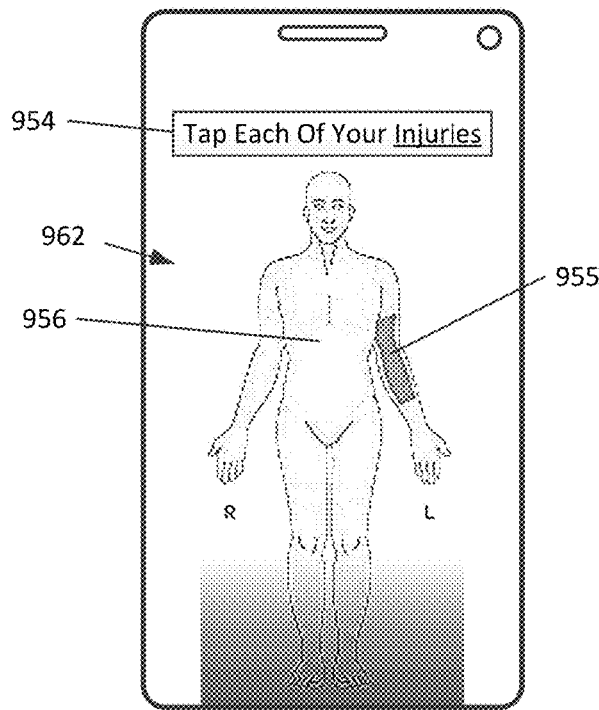
Figure 9P:
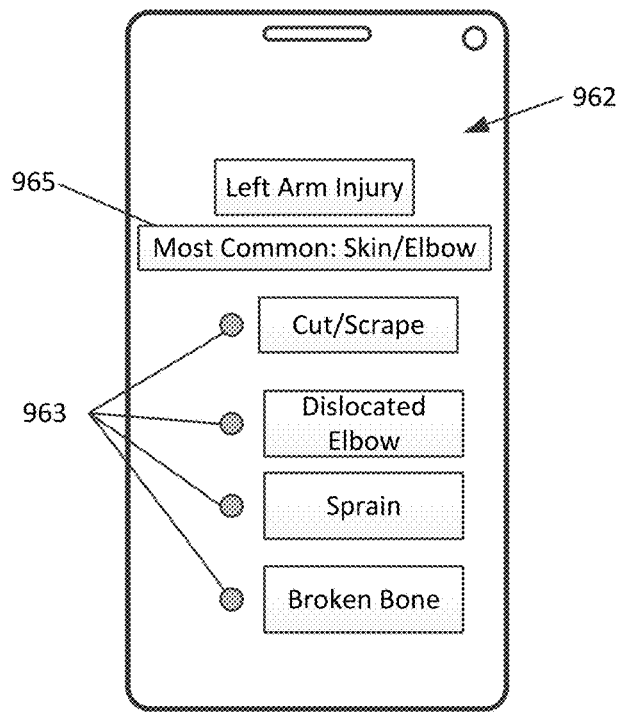
Figure 9R:
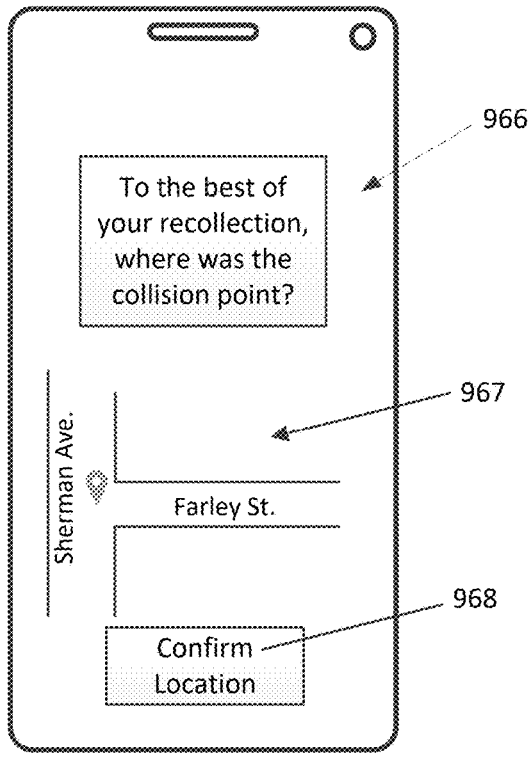
Figure 9T:
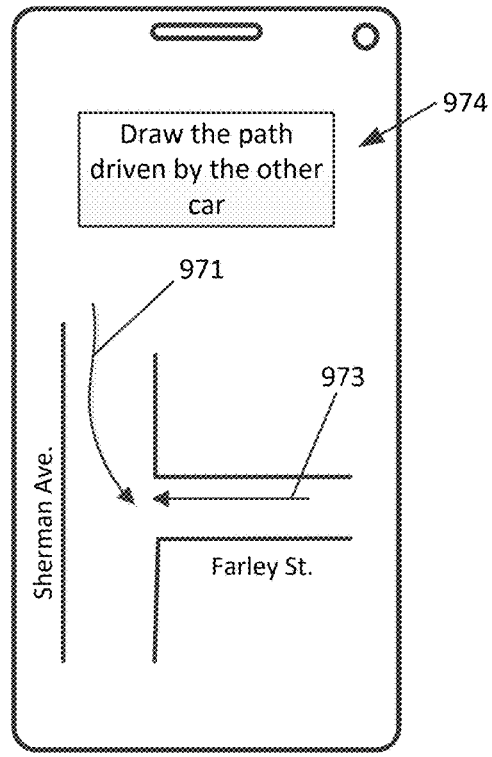
Figure 9S:
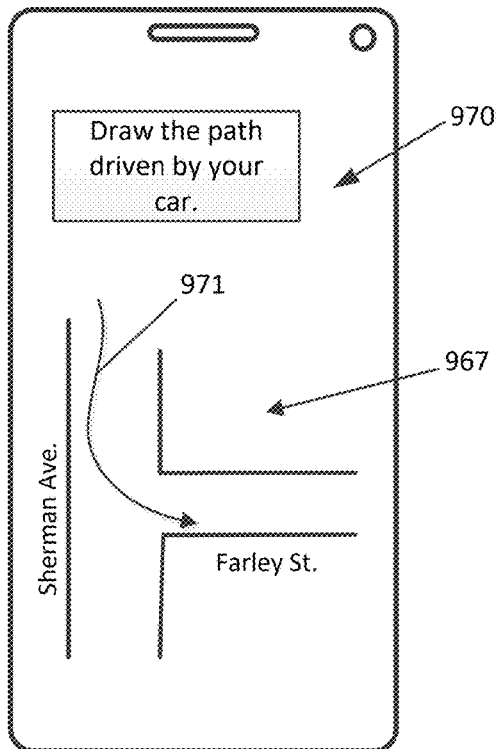
Figure 9U:
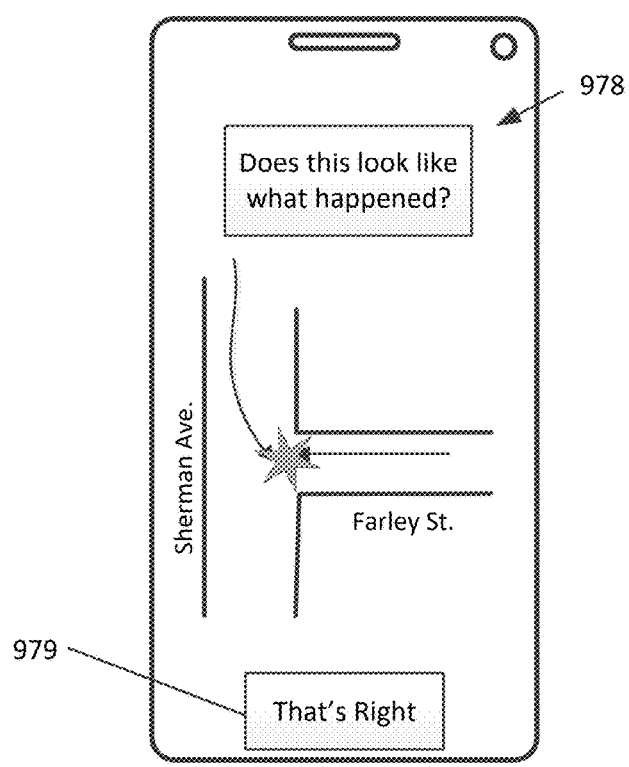
Figure 9V:
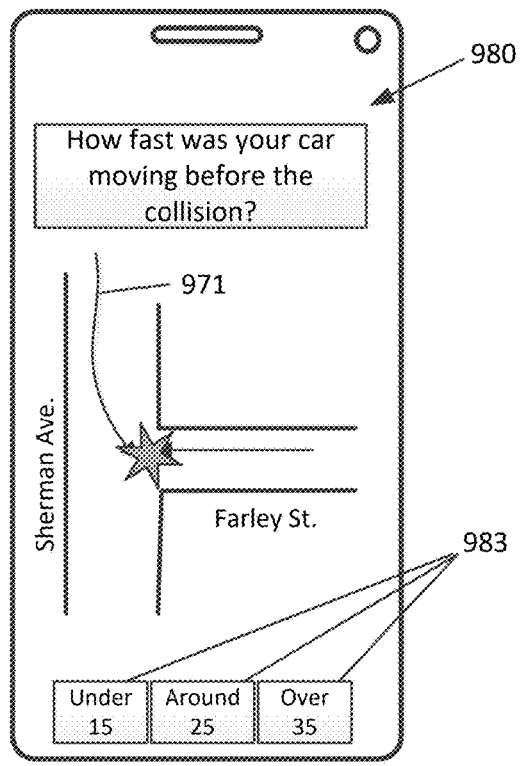
Figure 9X:
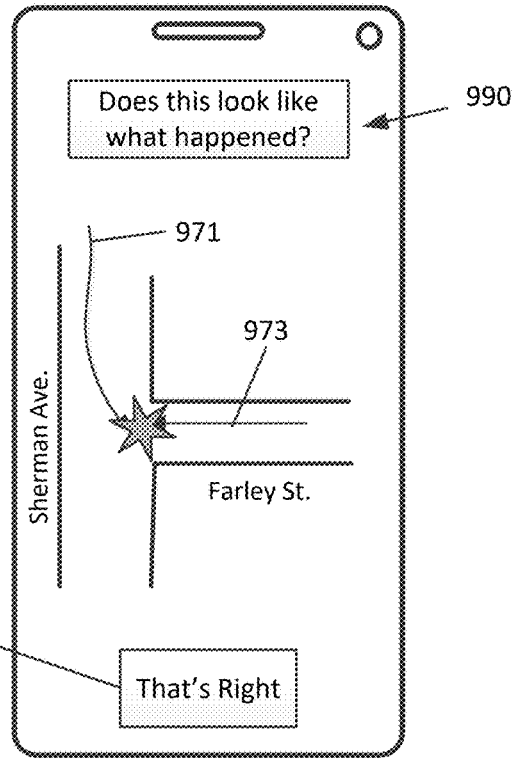

FIG. 9A through FIG. 9X illustrate a series of interactive GUIs that enable a claimant to initiate a claim, according to examples. In examples of FIG. 9A through FIG. 9X, a claimant is prompted/guided to provide information for a vehicular incident. The series of interactive GUIs can form one or more content flows that can be implemented by the computing system 100 using, for example, a service application executing on the mobile device of the user (e.g., as a subpage of the FNOL interface).

In FIG. 9A, the claimant user can launch a service application on a mobile device. A selectable feature 904 may be provided to the claimant user on an initial interface 902 to enable the user to initiate the content flow for filing a new claim. The claimant user can initiate the content flow immediately after an incident. FIG. 9B and FIG. 9C illustrate example GUIs which provide for the possibility that the claimant user operates the service application immediately after a vehicle accident. In FIG. 9B, an example GUI 906 prompts the claimant user to indicate whether those involved in the accident are safe, with different content flows being triggerable based on the users' response (e.g., content flow to initiate emergency response). Likewise, FIG. 9C illustrates an example GUI 908 that facilitates actions which the claimant user can take immediately following an accident. For example, the example GUI 908 prompts the claimant user as to whether a tow truck is needed. If the user provides input indicating a tow truck is needed, one or more additional GUIs may be provided to facilitate the user in providing location information and other inputs to receive service from appropriate providers.

In examples, the service application further executes to provide example GUIs for prompting the user to provide information about the incident. In the example GUI 910 of FIG. 9D, the claimant user is provided options 911 for selecting the type of incident. In the example of FIG. 9E, the GUI 912 enables the user to specify the number of parties involved in the incident. In the example GUI 914 of FIG. 9F, the claimant user is prompted to provide information that identifies a category (e.g., vehicle, motorcycle, bicycle, pedestrian, etc.) of the other party or parties. The example GUI 916 of FIG. 9G illustrates a prompt to enable the user to specify, for example, the color (as well as model, vehicle type, etc.) of the other vehicle.

In FIG. 9H, the example GUI 918 enables the claimant user to upload a picture of the license plate of the other car, or alternatively, to manually enter the information. As described with other examples, the computer system 100 can include a process to retrieve a vehicle identification number (VIN) for the car specified by GUI 918, so that the make, model, and year of the other car can be independently determined.

In FIG. 9I, the example GUI 920 provides a visual or iconic summary of the information determined through at least a portion of the content flow, to enable the claimant user to provide confirmation input. In examples, interfaces and/or features to enable the user to confirm input can be provided throughout a given content flow.

FIG. 9J illustrates an example GUI 922 that enables the user to upload pictures relevant to the incident, including pictures of their damaged vehicle, pictures of the other vehicle, pictures of damaged property, pictures to provide context (e.g., road construction, etc.).

FIG. 9K illustrates an example GUI 924 that enables the user to specify their location. In an implementation, the service application can execute to automatically identify the user's current location as a point that is at or near the accident, and can enable the user to drag and drop a pin at a more exact location. Alternatively, the user can manually enter the address information (e.g., cross section) where the accident took place.

FIG. 9L illustrates an example GUI 926 to prompt the user to confirm contextual information that is programmatically determined, independent of user input, regarding the incident. For example, as shown with GUI 926, the user can be prompted to confirm the weather. The computer system 100 can, for example, determine the weather by entering a date and location (e.g., as determined from the example GUI 922) to a weather service.

FIG. 9M and FIG. 9N are example GUIs providing interactive damage assessment interfaces for a claimant, in accordance with examples provided herein. Referring to FIG. 9M, a vehicle damage assessment interface 930 is generated (e.g., as a subpage of the FNOL interface) when a claimant user 197 initiates an insurance claim for vehicle damage. The vehicle damage assessment interface 930 can include a number of selectable features 934 that enable the claimant user 197 to provide a text and/or voice description of the damage, as well as record images and/or video of the damage, provide receipts for repairs, etc. The selectable features 934 can further include one or more queries that prompts the user 197 to provide additional contextual information for the subsequent claim filing.

The vehicle damage assessment interface 930 can further include a virtual representation of a vehicle (e.g., vehicle representation 936) that enables the claimant user 197 to indicate the damage to the vehicle with direct inputs on the virtual representation. In some examples, the computing system 100 can store several virtual representations of different vehicles of different makes, models, and model years. The vehicle representation 936 can be based on a type of vehicle (e.g., sedan, truck, etc.) that the user drives. In such examples, the computing system 100 may perform a lookup of the claimant user's vehicle (e.g., in the policy information of the user 197) or can receive data indicating the make, model, and model year of the vehicle from the claimant user 197 in a previous screen. In variations, the computing system 100 can cause the virtual representation 936 of the user's vehicle to have the same, make, model, model year, and/or color—to be generated on the damage assessment interface.

As provided herein, the virtual representation 936 of the claimant user's vehicle may be three-dimensional and rotatable on multiple axes to enable the user 197 to indicate all damage to the vehicle. For example, the vehicle damage assessment interface 930 can include controls 937 that enable the user to rotate and/or move the vehicle representation 936 about multiple axes. In one example such as shown by FIG. 9N, the user 197 may provide input (e.g., through interaction with a touchscreen of a mobile device) to indicate or otherwise color in the location(s) of the damage. The input provided by the user can be rendered as damage markings 935 on the vehicle representation 936. The damage markings 935 can provide a course estimate as to the actual damage to the vehicle (based on the input of the claimant user 197). In some examples, the computing system 100 can include a process that maps the areas indicated by the damage markings 935 to vehicle parts which will likely need replacement or repair. The mapping of damage markings 935 to vehicular parts can be based on user-specific information, including the make, model, year of the user's vehicle, as well as the geographic location of the user.

FIG. 9O through FIG. 9Q are example GUIs providing injury assessment interfaces for a claimant, in accordance with examples provided herein. Referring to FIG. 9O, a GUI 962 for an injury assessment interface is presented when a claimant user 197 initiates a personal injury claim (e.g., as a subpage of the FNOL interface). The GUI 962 can include a number of selectable features 954 that enable the user 197 to provide contextual information regarding the injury suffered by the claimant user 197 (e.g., images of the injury, text description, etc.). The selectable features 954 may further include one or more queries that prompt the user 197 to provide additional contextual information regarding the injury. In various examples, the injury assessment interface can further include a virtual representation of a human 956 that enables the claimant user 197 to input the location and indicate a severity of the injury. In one example, the computing system 100 can customize the virtual representation 956 based on the unique attributes of the user 197, such as the user's gender, body type, hair color, skin color, height, weight, eye color, etc. Accordingly, in such examples, the computing system 100 can perform a lookup of personal information of the user 197 (e.g., in social media, driver's license records, and other public records) to generate a virtual avatar of the user 197.

In various implementations, the virtual representation 956 can comprise a three-dimensional representation and can be rotatable about a single or multiple axes to enable the user 197 to precisely indicate the location and severity of the injury. In some examples, the user 197 can use a finger to tap the location of the display screen, representing the region on the user's body where the injury occurred. In some variations, the user can also utilize gestures (e.g., pinch gestures or tap-hold and scroll gestures) to rotate the virtual representation 956.

With reference to FIG. 9P, the GUI 962 generated through the service application can prompt the user for more information that is specific to the portion of the body that the user indicates as being injured. For example, the computer system 100 can determine typical categories of injuries for limbs, torso, appendages, neck, head, etc. In the example shown, the GUI 962 include selectable features 963, from which the user can make selection to indicate the category or type of injury (or injuries) the user sustained to the given region. Thus, if the user indicates an injury to the left arm, the GUI 962 includes selectable features 963, 965 to enable the user to select the type of injuries sustained for the left arm (e.g., cut/scrape, dislocated elbow, sprain/strain, broken bone, etc.). If the claimant user 197 selects the head, the GUI 962 displays different selectable features 963, 965 that enable the user to select injuries specific to the head region (e.g., lacerations, concussion, etc.). The specificity of the information that the injury interfaces prompt the user for can vary based on implementation.

With reference to FIG. 9Q, the GUI 962 shows the marked region(s) 955 of the human representation 956 where the user has indicated injury. In some implementations, coloring and/or shading can be used to indicate presence and/or severity of the injury. By displaying the marked regions 955 where the user has indicated injury, the user can verify the injuries received from the personal injury incident.

According to examples, a content flow implemented through a series of GUIs can also provide incident simulation interfaces. The incident simulation interfaces can prompt and guide the user to provide information about what transpired with respect to the collision. For example, for a claimant user, the incident simulation interface can be implemented as part of a content workflow where information about a vehicular incident is obtained (e.g., see FIG. 9A through FIG. 9L), damage assessment is estimated based on user input (e.g., see FIG. 9M and FIG. 9N) and an injury assessment is made (e.g., see FIG. 9O through FIG. 9Q).

With reference to FIG. 9R, the GUI 966 can prompt the user to provide specific information as to where an incident occurred at a geographic location identified by the user. In examples, the input can be in the form of a pin drop, with respect to highly specific geographic imagery such as provided through a satellite view of the incident location. Using the GUI 966, the user can be prompted to specify whether the incident occurred within an intersection, and if so, a particular portion or spot within the intersection where the incident occurred. As another example, the GUI 966 can prompt the user to specify a street corner or particular side of the roadway were an incident occurred. Once the user pinpoints the location on a geographic view 967, the user can confirm the location through a selectable feature 968. In this way, the GUI 966 enables the user to provide input that more specifically pinpoints a location where a collision or other type of incident occurred, as compared to, for example, a simple street address.

In FIG. 9S, the GUI 970 enables the user to indicate a finger path 971 that represents a trajectory driven by the user's vehicle (or alternatively, a vehicle in which the user was riding, or a vehicle the user may have witnessed being driven, etc.). For example, the claimant user 197 can indicate the path 971 by drawing their finger over the geographic view 967.

In FIG. 9T, the GUI 974 enables the user to indicate a finger path 973 that represents a trajectory driven by the other vehicle in the incident. If more than two vehicles are involved in a collision, additional interfaces can be provided to the user to enable the user to draw a path representing the user's recollection of the trajectory driven by the respective vehicle. Likewise, if the collision involved a pedestrian, bicyclist, skateboarder, etc., the interfaces enable the user to mark the location where a collision may have occurred, as well as possible trajectories (or directions of travel) which the respective pedestrian, bicyclist, skateboarder, etc. was following. To enable the user to differentiate, the different trajectories of each party to a given vehicle incident can be represented by different colors or visual indicators of the respective paths 971, 973.

Once the user completes the paths 971, 973, the computing system 100 can implement a dynamic simulation that illustrates the collision as represented by the paths 971, 973 drawn by the user. FIG. 9U illustrates a GUI 978 presenting, for example, a simulation of the vehicles involved in a collision at the intersection specified by the user—following paths 971, 973 as indicated by the user. The simulation may be generated by the computing system 100 based on all information provided by the user, such as estimated speeds, trajectories, collision location, vehicle masses, and the like. The user may be provided with a selectable confirmation feature 979 to indicate that the simulated collision appears accurate to the user.

Figure 9W:
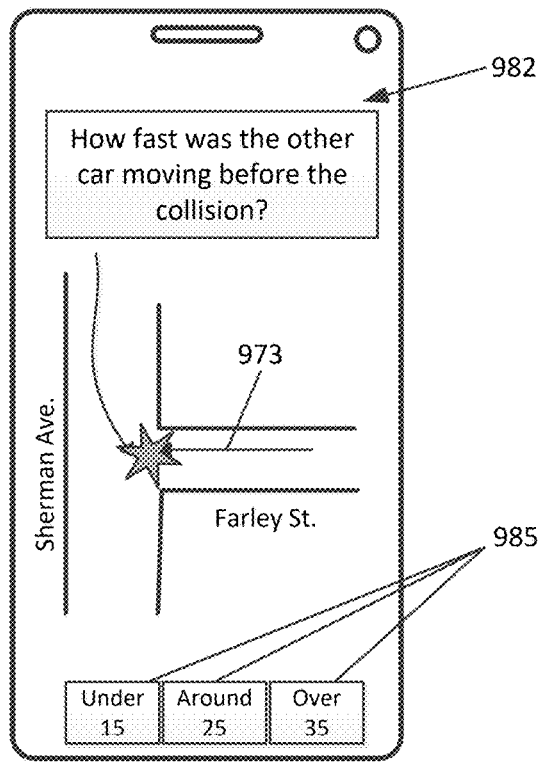

FIG. 9V and FIG. 9W illustrate GUIs 980, 982 for prompting the user to provide input that indicates the respective speed of each vehicle involved in the collision. In FIG. 9V, the GUI 980 enables the user to specify the speed of the vehicle driven by the claimant user 197, following the trajectory indicated by the path 971. In an implementation as shown, the user can be provided with selectable features 983 which enable the user to indicate an approximation of the vehicle speed. Likewise, in FIG. 9W, the GUI 982 enables the user to specify the speed of the other vehicle, following the trajectory indicated by path 973. Selectable features 985 can be provided to enable the user to indicate the approximation of the other vehicle's speed.

In examples, the GUIs 980, 982 can be dynamic, to show vehicles moving along their respective trajectories 971, 973 at a simulated speed that correlates to the approximate speed inputted by the user. Once the user provides inputs for each vehicle, the GUI 990 of FIG. 9X can simulate the collision of each vehicle, along the respective trajectories 971, 973, at the indicated speeds. The GUIs 980, 982, 990 can also render a simulation of the collision (as indicated by trajectories 971, 973 and user input) in alternative views, such as top view, side view, street-level view etc. to facilitate the user's recollection or understanding of how the collision occurred. The GUI 990 can also include a selectable feature 988 to enable the user to confirm that the dynamic simulation of the collision conforms to the user's understanding of how the collision occurred.

In examples, the content flow described with FIG. 9R through FI. 9X can be generated through execution of the simulation engine 150, which implements a physics engine to render simulations of a vehicular incident based on user inputs. The simulation engine 150 may also make parametric determinations about an incident, such as determinations regarding the impulse of the accident, the speeds of the involved vehicles along their respective trajectories, and/or angle of incident of the collision or incident amongst the vehicles. The parametric determinations can be used to determine information that is consistent or inconsistent. For example, information regarding vehicular damage as determined from user input with FIG. 9M and FIG. 9N can be compared to information relating to impulse to determine if the amount of energy involved in the incident is consistent or supportive of the amount of damage indicated by the user, or actual damage as assessed by a garage.

Likewise, information regarding injury assessment as determined from user input with FIG. 9O through FIG. 9Q can be compared against the impulse and/or angle of incident of the simulated collision for consistency. Determinations made through the simulation engine 150 which are deemed inconsistent with information obtained from a given user (e.g., claimant user 197) can be flagged for review or follow-up. For example, if the information provided by the claimant user 197 interacting with content flows of FIG. 9M and FIG. 9N, and of FIG. 9O through FIG. 9Q is deemed inconsistent with the results of the simulation engine 150, the computing system 100 can (i) flag the inconsistencies in a claim interface (e.g., see FIG. 11A through FIG. 11E) used by a policy provider, (ii) generate additional content flows, prompts or questions from the claimant user 197, and/or (iii) seek additional information from third-parties (e.g., witness, other driver, police, etc.) to corroborate the information provided by the claimant.

Methodology

Figure 10A:
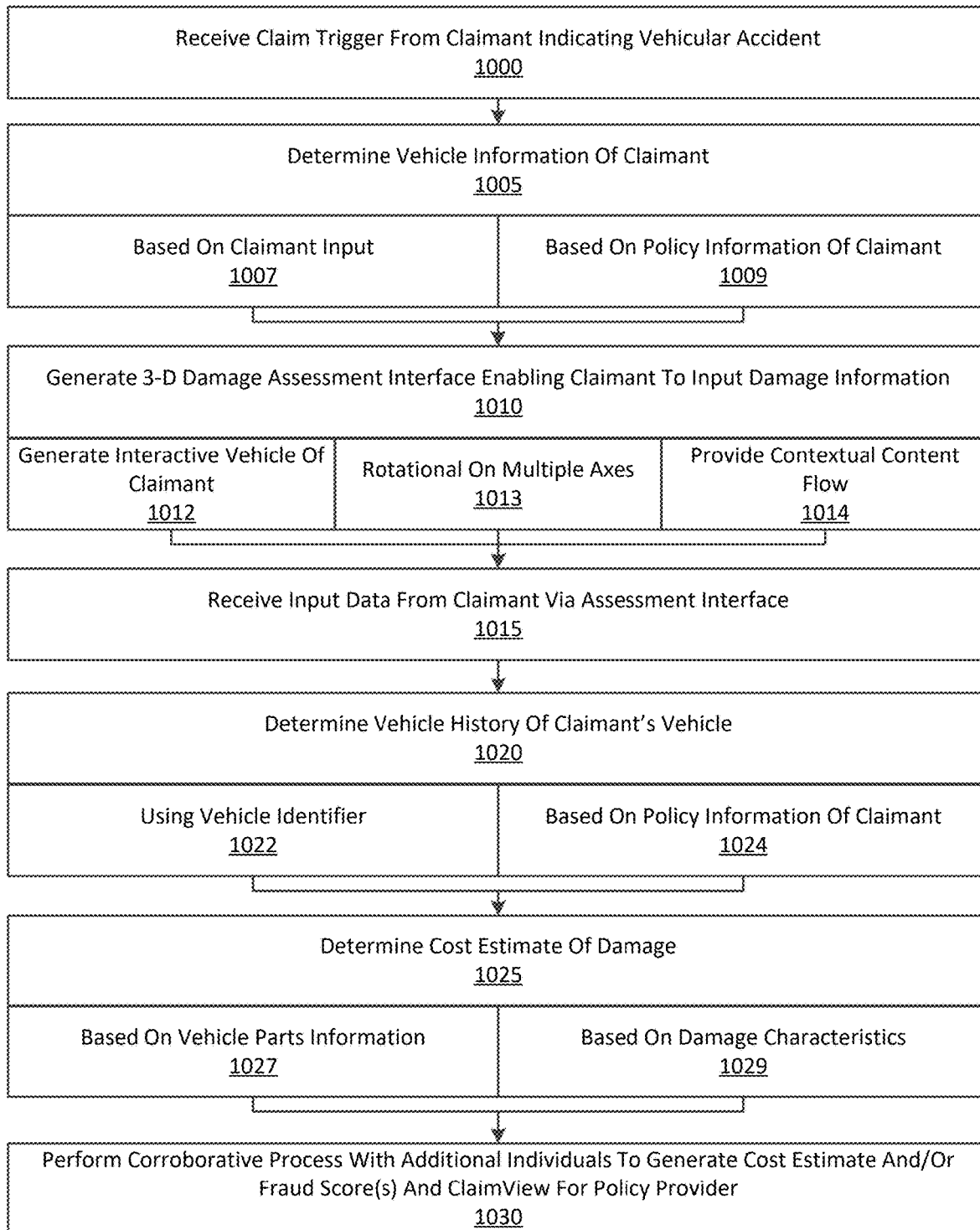
FIG. 10A is a flow chart describing an example method of contextual information gathering and corroboration following a vehicle incident, according to various examples.

FIG. 10A is a flow chart describing an example method of claim information gathering and corroboration following a vehicle incident, according to various examples. Referring to FIG. 10A, the computing system 100 can receive a claim trigger from a claimant user 197 indicating a vehicle accident (1000). In many examples, the computing system 100 determine vehicle information of the claimant user 197 (1005). For example, the computing system 100 can receive the vehicle information based on user inputs via the FNOL interface (1007). Additionally or alternatively, the computing system 100 can receive an identifier of the claimant user 197, and perform a lookup in a policy database to determine the vehicle information of the claimant user's vehicle (1009). The computing system 100 may then cause the computing device 190 of the claimant user 197 to generate a three-dimensional, vehicle damage assessment interface that enables the claimant user 197 to input damage information (1010). As described above with respect to FIG. 9M and FIG. 9N, the vehicle damage assessment interface can present an interactive, virtual representation of the vehicle of the claimant user 197 (1012). As further describe above, the virtual representation of the vehicle can be rotatable on multiple axes to enable the claimant user 197 to accurately mark the location and severity of the damage (1013).

The damage assessment interface can further present the claimant user 197 with a contextual content flow based on the claimant user's vehicle and initial inputs regarding the vehicle incident (1014). For example, the content flow (e.g., see FIG. 9A through FIG. 9L, and FIG. 9M and FIG. 9N) can ask the claimant user 197 a series of questions regarding the vehicle (e.g., whether the vehicle still runs), whether any injuries occurred in the incident (FIG. 9O through FIG. 9Q), and more specific information based on the damage inputs the claimant user 197 provides on the virtual representation of the vehicle. As a further example, if the claimant user 197 indicates damage to the front of the vehicle, the content flow can present one or more queries relevant to the front of the vehicle, such as whether the radiator is leaking, whether the headlight lenses are cracked or destroyed, whether the hood of the vehicle is still intact, whether the windshield is cracked, and the like.

In various implementations, the computing system 100 can receive input data from the claimant user 197 via the damage assessment interface (1015). The input data can include the claimant user's inputs on the virtual vehicle representation as well as input responses to the contextual content flow provided to the claimant user 197 via the FNOL interface, and can include details regarding the damage (e.g., affected parts, repair receipts, images, etc.). The computing system 100 can further determine the vehicle history of the claimant user's vehicle (1020), such as whether the vehicle has been involved in previous incidences, has gone through previous repairs, or whether the claimant user 197 has filed a previous insurance claim for the vehicle. The computing system 100 can further access a third-party resource 175 (e.g., a dealership database) to determine whether the vehicle has received regular services, such as oil changes, filter replacements, brake component checks and replacements, and the like. The computing system 100 can access vehicle history information by using a vehicle identifier, such as a license number or vehicle identification number (1022) and/or using the policy information of the claimant user 197 (e.g., to determine any previously accidents involving the vehicle or any previously filed claims for the vehicle) (1024).

In certain implementations, the computing system 100 can determine an estimated cost for repairing any damage to the vehicle (1025). As described herein, the computing system 100 can link with a vehicle parts database that lists typical part costs, replacement costs, and/or repair costs for specific vehicle makes and models to determine the estimated cost (1027). In further examples, the computing system 100 can automatically determine the cost estimate based on the damage characteristics of the vehicle, as determined based on the claimant user's inputs via the damage assessment interface (1029).

In certain implementations, the computing system 100 can further determine any additional individuals relevant to the claim initiated by the user 197, and perform a corroborative process to further refine the cost estimate, generate fraud score(s) for the user's claim, and generate a claim interface for the policy provider 185 of the claimant user 197 (1030). These relevant individuals may include other parties to the vehicle incident, witnesses, and/or repair shop owners or employees, which the computing system 100 can contact with contextual content flows to either corroborate or dispute the user's claims, as described herein. A common form of insurance fraud involves claiming damage to a vehicle that had already existed prior to a vehicle incident. The corroborative process described herein can identify whether the claimant user 197 is including this damage to a current insurance claim. For example, image processing performed by the computing system 100 can identify rust in a damaged area of the vehicle, which could indicate that the damage had existed for a time period prior to the vehicle incident. As another example, a witness to the incident may provide a statement indicating that significant damage already existed on a specified portion of the vehicle prior to the vehicle incident.

The claim interface generated by the computing system 100 for the policy provider 185 can provide an overview of the vehicle incident (e.g., accident location, parties to the incident, damage sustained, etc.), estimated cost of repair or replacement, and a fraud score assessment of the claimant user's inputs based on the corroborative process. The claim interface can further include a recommendation, such as to pay out a specified portion of the claim, conduct further investigation, deny the claim, or pay the claim in full. Accordingly, the policy provider 185 is given a full analysis of the claim, including an indication of trustworthiness of the claimant user 197 based on the automated corroborative process executed by the computing system 100.

Figure 10B:
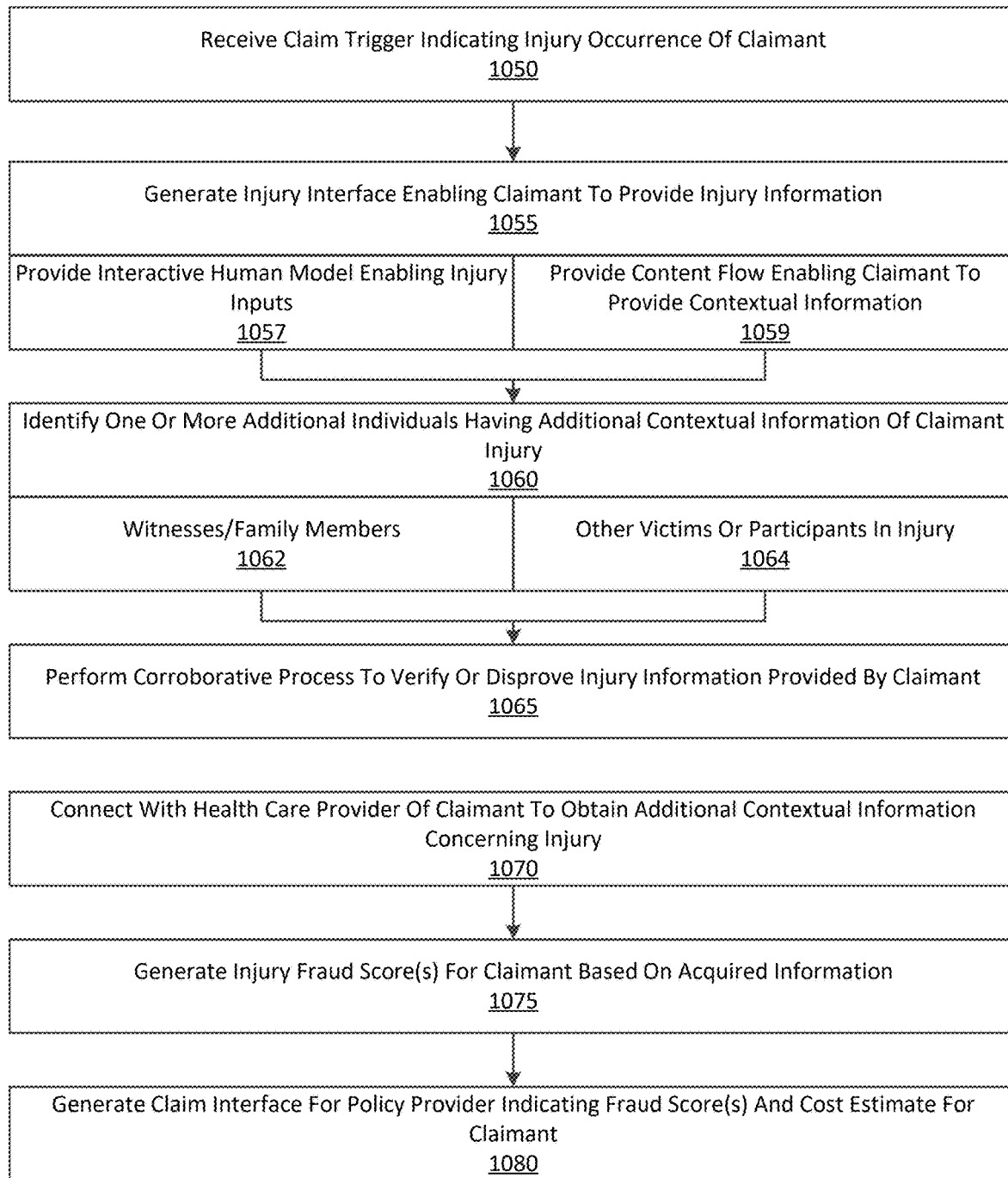
FIG. 10B is a flow chart describing an example method of contextual information gathering and corroboration following a personal injury event, according to various examples.

FIG. 10B is a flow chart describing an example method of contextual information gathering and corroboration following a personal injury event, according to various examples. Referring to FIG. 10B, the computing system 100 can receive a claim trigger indicating that a claimant user 197 has initiated a personal injury claim 1050). The computing system 100 can cause the injury assessment interface (e.g., see FIG. 9O through FIG. 9Q) to be presented on the computing device 190 of the claimant user 197 to provide injury information (1055). As provided herein, the injury assessment interface can provide an interactive virtual human representation that enables the claimant user 197 to specify the location and severity of the injury (1057). In further implementations, the injury assessment interface can include a content flow that enables the claimant user 197 to provide additional details regarding the injury, such as text descriptions, images, hospital records, and the like.

The computing system 100 can identify one or more individuals having additional contextual information of the claimant user's injury (1060), such as one or more witnesses to the injury or family members of the claimant user 197 (1062), or a victim or other party to the injury (1064). As provided herein, the computing system 100 can perform a corroborative process to verify or disprove injury information provided by the claimant user 197 (1065). In further examples, the computing system 100 can connect with a health care provider of the claimant user 197 to obtain additional contextual information regarding the claimant user's injury (1070). For example, the computing system 100 can access hospital records to determine which injuries were treated and/or identified by the treating hospital.

In various implementations, the computing system 100 can generate injury fraud scores for the claimant user 197 based on the acquired information (1075). For example, if the claimant user 197 inputted an injury that the claimant user 197 did not actually suffer (e.g., using cosmetics to fake an injury and record an image of the fake injury), the computing system 100 can determine that a claim for this inputted injury is fraudulent through analytics (e.g., image analysis) and/or the corroborative process, and flag the claimed injury as fraudulent or potentially fraudulent. The computing system 100 may then generate a claim interface for a policy provider 185 of the claimant user 197 indicating an overview of the injury, any fraud scores applicable to the claim, and a cost estimate for the claim 1080).

Claim Interface

FIG. 11A through FIG. 11E are examples claim interfaces generated for policy providers based on claim, according to various examples provided herein. The claim interfaces can be presented to a policy provider 185 for any claim made by any user 197 for any reason, such as for catastrophic event damage, property theft, vehicle incidences, and personal injuries. The claim interfaces shown by examples of FIG. 11A through FIG. 11E can be displayed on, for example, a computing device of a user, such as though a website or service application executing on a mobile device of the policy holder. The claim interfaces can be generated subsequent to one or more interactive sessions with the claimant user 197 (e.g., via the FNOL interface), any relevant third parties (e.g., family members, acquaintances of the claimant user 197, witnesses, etc.), and upon performing corroborative and fraud detection processes, as described herein.

Figure 11A:
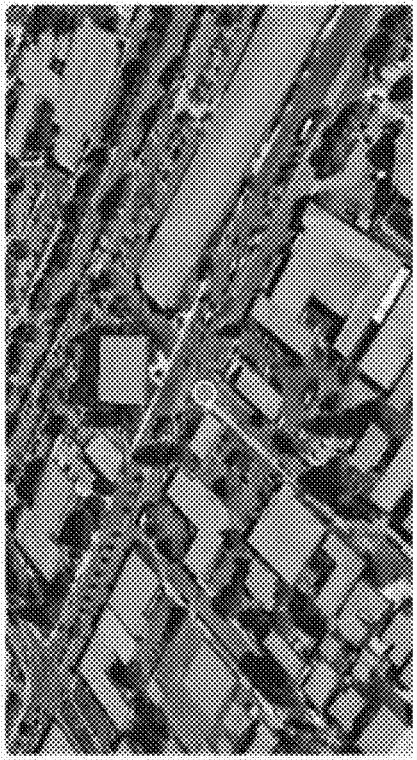
FIGS. 11A-E illustrate example claim interfaces generated for policy providers based on claim, according to various examples provided herein.

In an example shown by FIG. 11A, the claim interface 1100 is generated for an insurance claim filed by a claimant user 197 for a vehicle incident. The computing system 100 has performed one or more information gathering processes (e.g., such as shown by FIG. 9A through FIG. 9L, FIG. 9M and FIG. 9N, FIG. 9O through FIG. 9Q, and FIG. 9R through FIG. 9W) with the claimant user 197 and internal analytics on the claimant user's evidence (e.g., image processing), statements, and description of the vehicle incident through the content flow and engagement monitoring techniques described throughout the present disclosure. The computing system 100 may have also performed a corroborative process with additional individuals (e.g., witnesses, passengers, and other parties to the vehicle incident) that have provided additional contextual information concerning the vehicle incident, as well as lookups at third-party resources 175 to determine the claimant user's history (e.g., insurance claim history, criminal history, general character, etc.). For example, one or more third parties may have completed a content flow similar to those shown by FIG. 9A through FIG. 9L, FIG. 9M and FIG. 9N, FIG. 9O through FIG. 9Q, and FIG. 9R through FIG. 9W. In doing so, the computing system 100 has also performed fraud detection techniques described herein to generate the claim interface 1100 for a policy provider 185 of the claimant user 197.

The claim interface 1100 includes a claim overview that provides a brief description of the vehicle incident, which can indicate the location of the incident, a description of the damage to the claimant user's vehicle, and any injuries to specified individuals. The claim interface 1100 can further include an analytics graphic providing the policy provider 185 with a graphical summary of the internal analytics process performed by the computing system 100. In the example shown in FIG. 11A, the graphical summary can indicate categories for the vehicle incident and the claim process, and can further provide the policy provider 185 with a graphical representation indicating normal and/or abnormal evaluation conclusions of the claim for each category.

For example, the computing system 100 may have performed a location analysis for the vehicle incident based on historical data and can conclude that similar incidences have occurred at the location. The computing system 100 may have cross-referenced the traffic situation at the time of the vehicle incident with historical traffic situations at the incident location when other similar vehicle incidences have occurred to determine whether the vehicle incident has any anomalous characteristics (e.g., any indications that the incident was not an accident). Furthermore, the computing system 100 may have further performed a historical analysis of the claimant user 197—such as background checks and a claim history analysis—to determine whether the claimant user 197 is honest or trustworthy in making the present claim.

Further still, the computing system 100 may have performed engagement monitoring techniques corresponding to the claimant user's engagement with the contextual content flows provided to the claimant user 197 (e.g., via the FNOL interface) to flag any potential abnormalities. Still further, the computing system 100 may have performed metadata analytics and/or image processing on the claimant user's uploaded content (e.g., images of the accident damage and/or accident location), cross-referencing the content metadata with the claimant user's statements and the additional individuals' statements and/or evidence (e.g., timestamp comparisons, simulation analysis, etc.). As further described herein, the computing system 100 may have prompted the claimant user 197 and the other individuals to provide map interface inputs in order to generate a simulation of the vehicle incident and determine a feasibility of the accident damage and any injuries based on the simulation.

The claim interface 1100 can further provide a listing of statements and/or evidence provided by the claimant user 197 and other individuals relevant to the vehicle incident, and generate fraud scores for each of the claimant user's statements, descriptions, and evidence. For example, the computing system 100 can flag the claimant user's description and evidence of vehicle damage as potentially fraudulent based on statements from witnesses of the vehicle incident, and provides a summary of the image and/or simulation analysis that has caused the fraud trigger. In examples, the policy provider 185 can be presented with a recommendation to perform further investigation into the vehicle damage claimed by the claimant user 197 that may not have occurred in the vehicle incident.

In an example of FIG. 11A, claim interface 1100 includes an injury assessment section 1110 which identifies injuries to those involved in an accident (or those seeking claims). The injury assessment section 1110 can render information obtained through, for example, implementation of an injury assessment interface, as described with an example of FIG. 9O through FIG. 9Q.

Additionally, the claim interface 1110 can include an collision simulation section 1120 which can identify parameters involving a vehicle incident. Additionally, in examples, the information for the simulation section 1120 can be obtained through simulation interfaces, such as described with examples of FIG. 9R through FIG. 9X. Thus, for example, the trajectories of the vehicles involved in the incident may be rendered, based on user input. Additionally, the velocity of each vehicle, as well as the pinpoint geographic location of the incident can be shown on a geographic view (e.g., satellite view). Based on the information provided by the user, parametric information 1112 for the vehicle can be determined through the simulation engine 150 and the respective physics engine. The determinations 1112 can include, for example, a first parametric determination for the impulse of the collision between the two vehicles, a second parametric determination for the relative speed of the vehicles at the time of collision, and a third parametric determination for the angle of incident of the collision.

If the information gathering processes reveals material information about the incident, the information may be displayed in prominence for the policy holder. For example, in an example of FIG. 11A, the nature of the incident is labeled as a hit and run, based on input that is received from the other. However, the information may be disputed by the claimant user 197, based on, for example, the claimant user providing information through a process described with FIG. 9A through FIG. 9L.

Figure 11B:
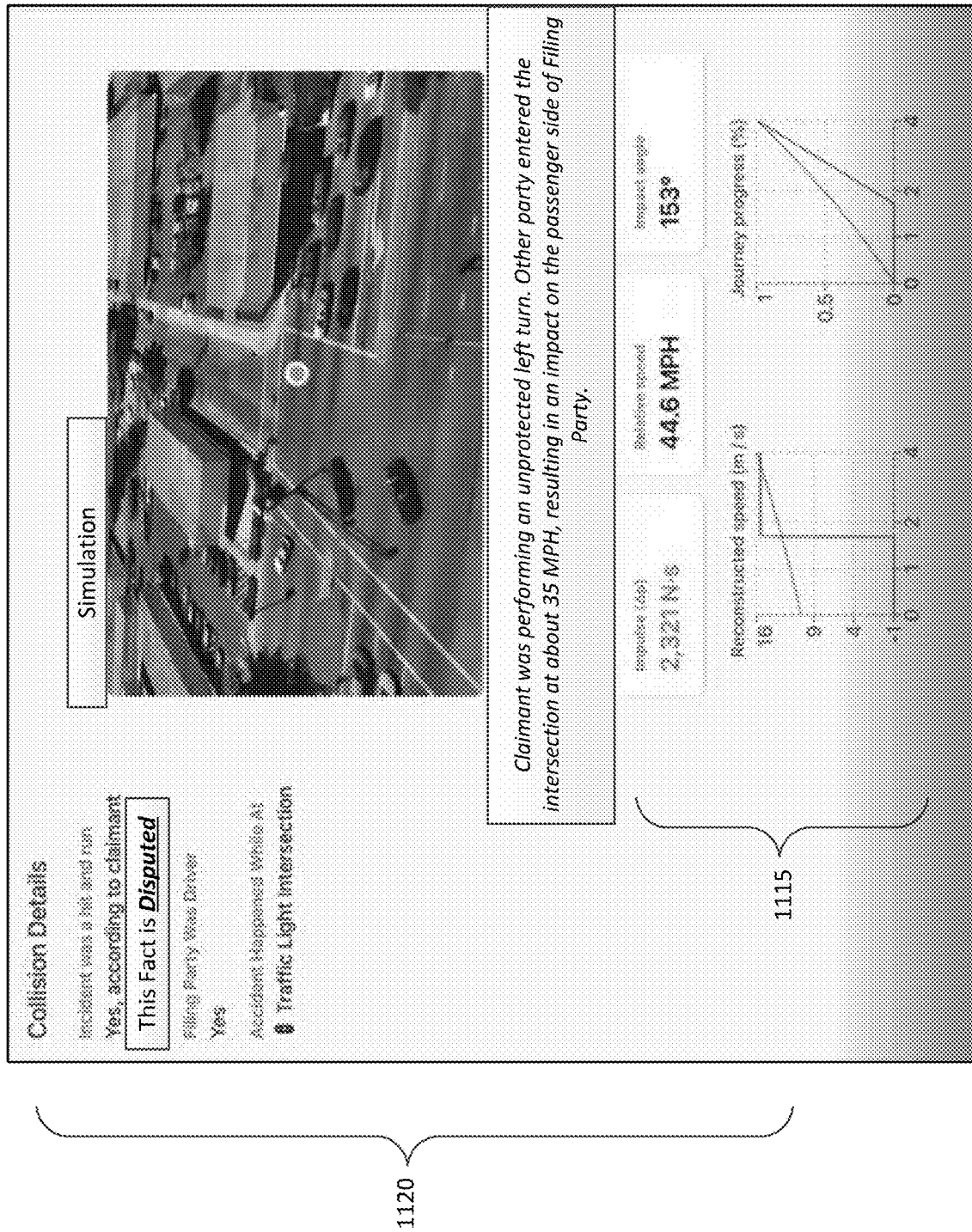

With reference to an example of FIG. 11B, section 1120 of the claim view 1100 can include a dynamic simulation of the incident, based on information obtained from the claimant user 197 (or other user, such as the other vehicle operator or a witness), interacting with the incident simulation interface (e.g., see FIG. 9R through FIG. 9X). For example, the simulation engine 150 can utilize the physics engine to, for example, utilize the claimant user's input, provided through the simulation interfaces, to provide dynamic, multi-view simulations of the incident for the policy holder, along with additional parametric determinations 1115 (e.g., live parameters of the vehicles as the simulation runs).

Figure 11C:
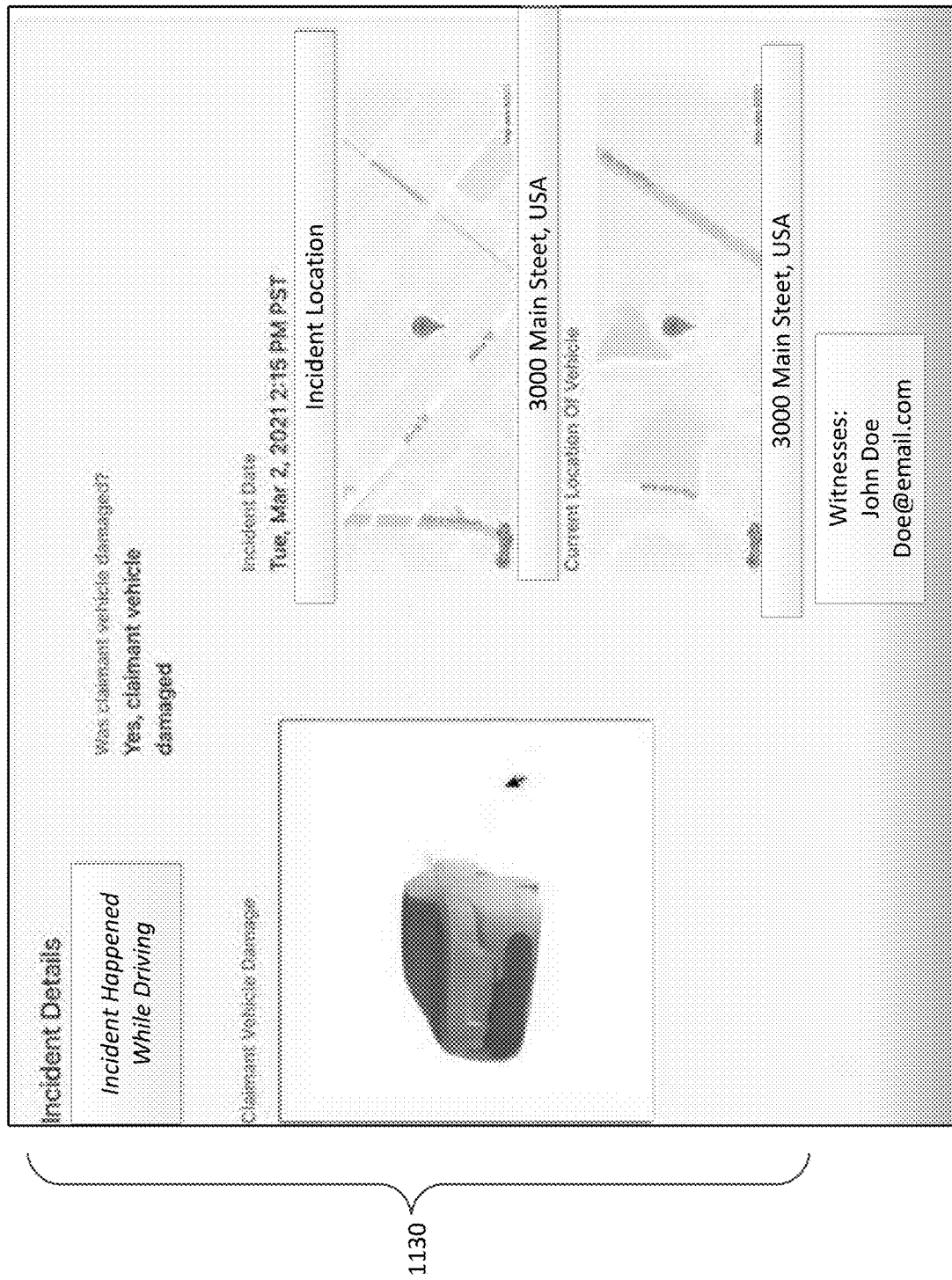

With reference to FIG. 11C, the claim interface can provide a section 1130 that includes a damage assessment summary. The damage assessment summary can be generated based on, for example, the claimant user's interaction with the damage assessment interfaces, as shown with examples of FIG. 9M and FIG. 9N.

Figure 11D:
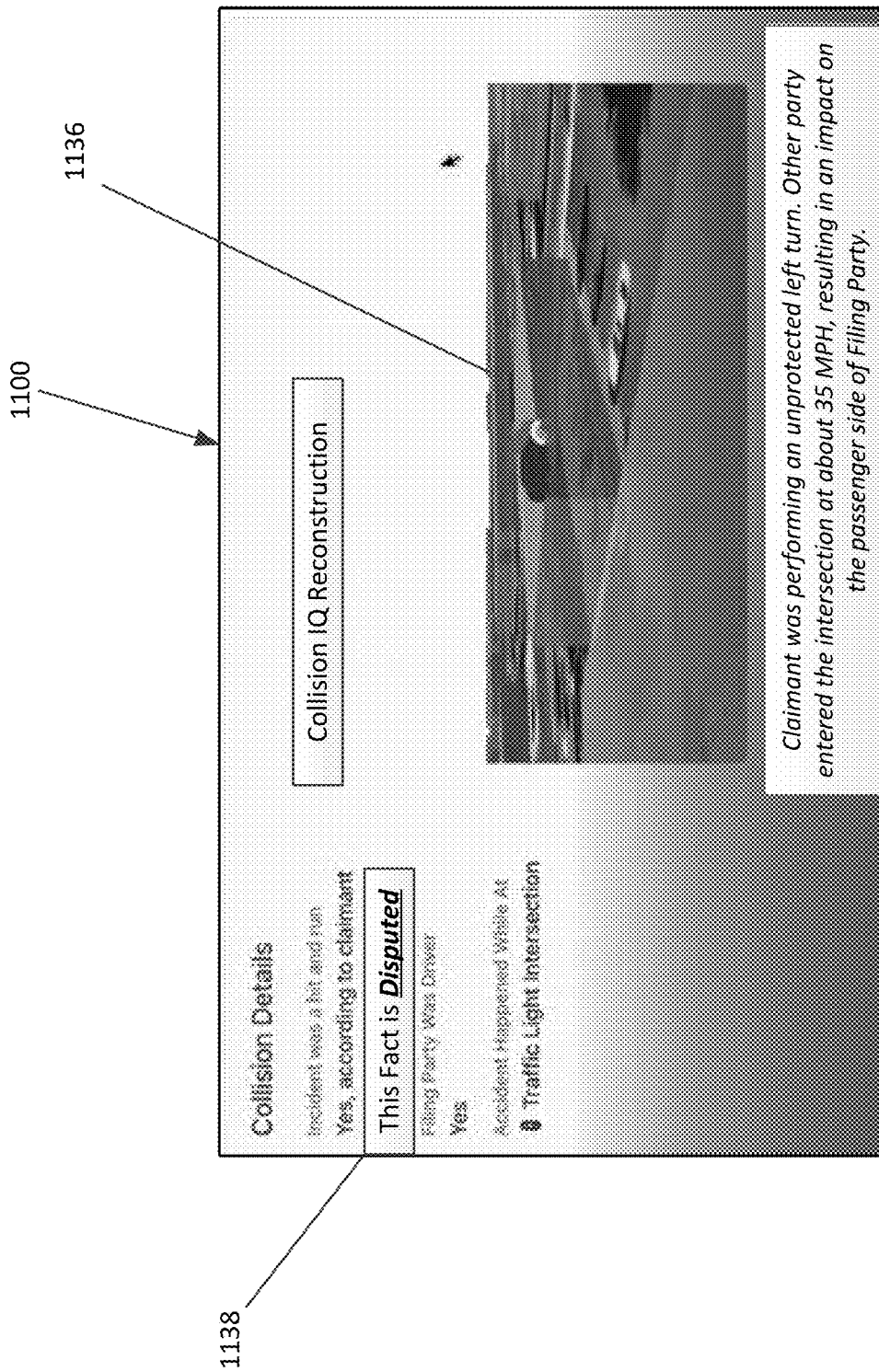

FIG. 11D illustrates use of an example of the claim interface 1100 identifying determinations 1138 of inconsistent, consistent, and/or disputed facts which may be obtained through one or multiple information gathering processes. The determinations 1138 can be displayed in prominence, as well as in context of the incident. For example, determinations 1138 about inconsistent, consistent, and/or disputed facts can be rendered adjacent to a dynamic simulation 1136 of the vehicle incident. The determinations 1138 can be labeled and/or colored to enable the policy holder to evaluate the information in connection with the dynamic simulation. In examples, the determinations 1138 can be determined by comparing information provided by two or more parties (e.g., driver/claimant user and rider). For example, the parties may each interact with content flows as described with FIG. 9A through FIG. 9X to provide information about an incident, and the information provided can be compared (e.g., comparison of relative speed of each vehicle) to determine where the facts provided by each party were consistent, inconsistent, or disputed. As an addition or variation, the determinations 1138 can be based on a comparison of information provided by one party (e.g., the claimant user) interacting with content flows (as described with FIG. 9A through FIG. 9X) to information obtained from sources independent of the computing system 100 (e.g., statement from other party, weather report from third-party source, etc.). Still further, the determinations 1138 can be based on a comparison of the information the claimant user 197 provides through interaction with the content flows of FIG. 9A through FIG. 9X, against results generated by the simulation engine 150. In the latter case, the simulation engine 150 can determine whether, for example, the impulse determination supports the damage to the claimant's vehicle, or the injuries to one or more parties to the incident.

Figure 11E:
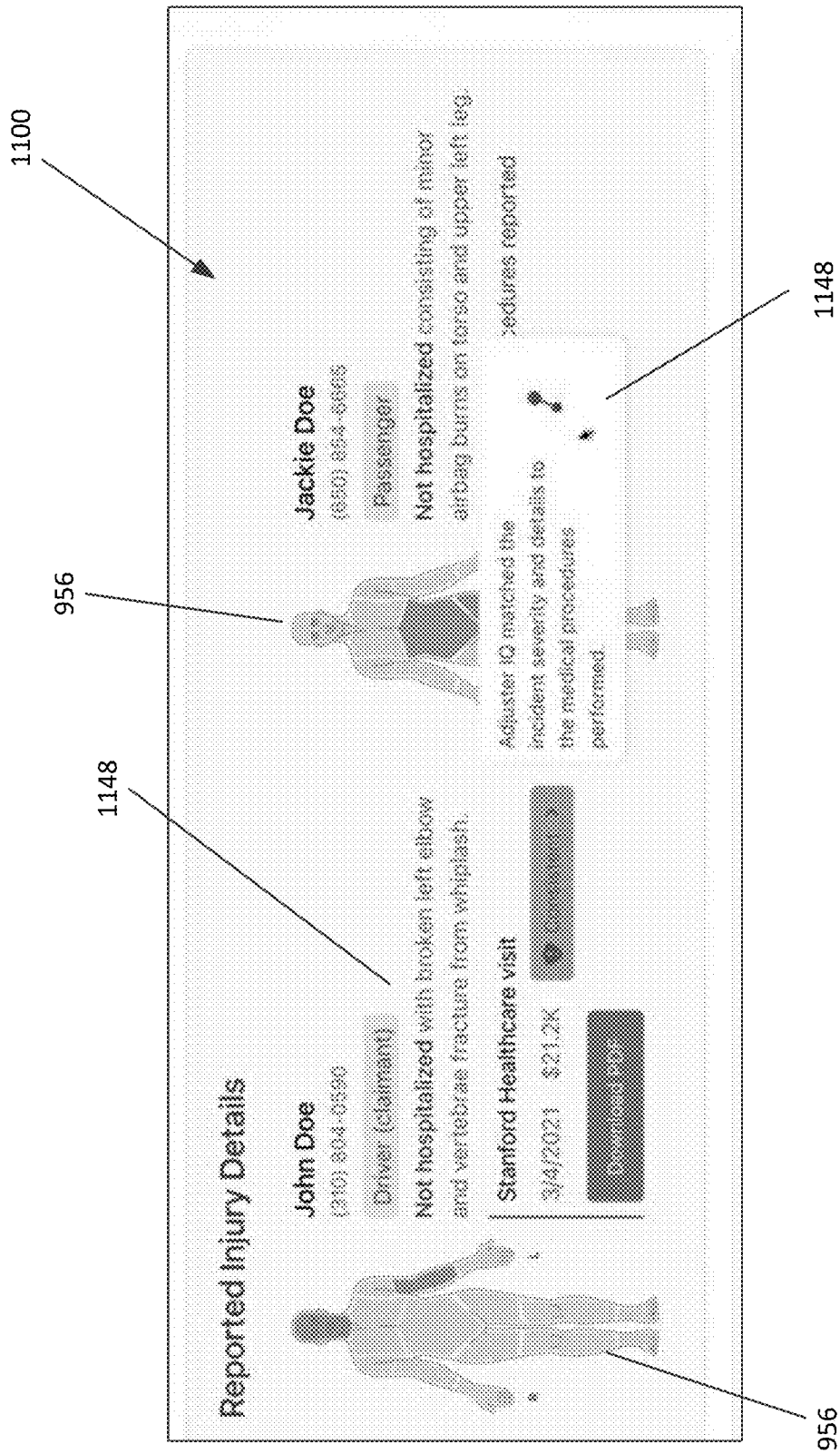

FIG. 11E illustrates use of an example of the claim view 1100 identifying inconsistent, consistent, and/or disputed facts for information provided through injury assessment interfaces (e.g., see FIG. 9O through FIG. 9Q). For example, the type, severity, and extent of injuries can be evaluated against information provided by the claimant user 197, as well as other parties. In some variations, the information provided through the injury assessment interfaces can be rendered on the human representation 956, and subject to an evaluation process that compares the provided information to the determinations of the simulation engine 150 and respective physics engine. For example, a determination can be made as to whether the amount of kinetic energy transferred in the collision could realistically cause broken bones for a passenger or driver. Based on the evaluation of the simulation engine 150, the computing system 100 can make determinations 1148 as to whether an injury sustained by a given party to the incident was consistent or inconsistent with respect to the nature of the accident. In the example shown, the determination 1148 can be provided adjacent to the human representations 956 of each of the driver (and claimant user 197) and passenger. Additionally, the determination 1148 can be iconic and/or selectable to provide additional details.

Methodology

Figure 12:
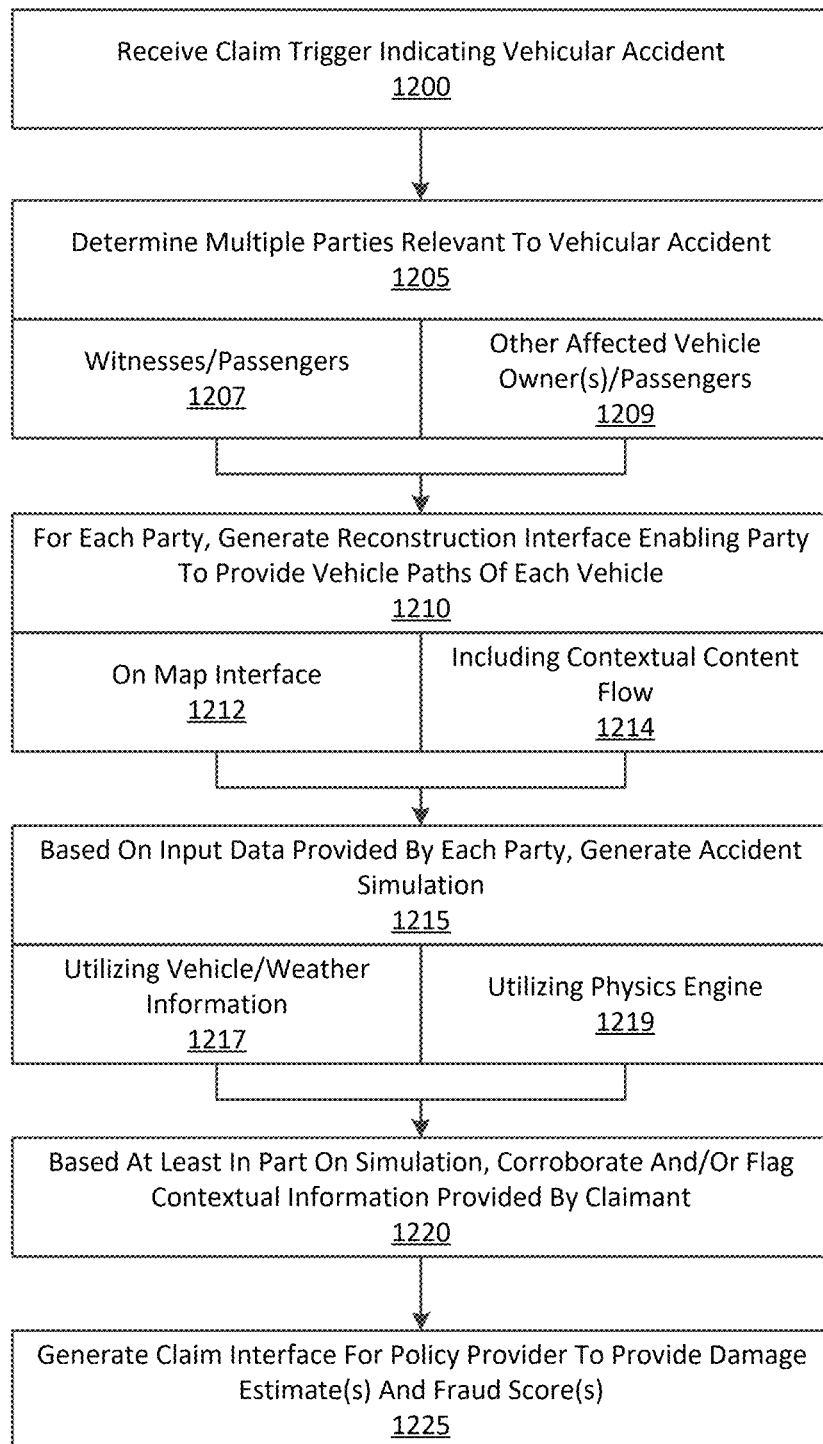
FIG. 12 is a flow chart describing an example method of executing an incident simulation based on party inputs, in accordance with examples described herein.

FIG. 12 is a flow chart describing an example method of executing an incident simulation based on party inputs, in accordance with examples described herein. Referring to FIG. 12, the computing system 100 can receive a claim trigger corresponding to a claimant user 197 initiating a claim for a vehicle accident (1200). In various examples, the computing system 100 determines multiple parties relevant to the vehicle accident (1205), such as witnesses to the accident (1207), passengers in the user's vehicle, passengers in another vehicle involved in the accident, drivers of other vehicles involved (1209), family members of parties involved in the accident, and the like. As described herein, the computing system 100 can determine these additional parties by querying the claimant user 197, performing an automated lookup of an incident report (e.g., in a police record database, media resource, DMV record database, etc.), querying other parties involved in the accident, etc.

For each relevant party, the computing system 100 can generate an accident reconstruction interface that enables the party to provide inputs to indicate vehicle paths of each vehicle involved in the accident (1210). In one example, the computing system 100 generates an interactive map interface of the accident location that enables the party to physically draw the trajectories of each vehicle (1212). In further examples, the computing system 100 provides the party with a contextual content flow to receive additional contextual information regarding the accident, such as estimated vehicle speeds, any illegal actions by drivers, traffic light state information (e.g., whether a driver ran a red light), right of way information, etc. (1214).

Based on the input data provided by each party (e.g., via the accident reconstruction interface and contextual content flows), the computing system 100 can generate a simulation of the vehicle accident (1215). In scenarios where inconsistent information is provided by one or more parties, the computing system 100 can prioritize corroborated information from unrelated and/or uninvolved parties (e.g., witnesses) and corroborated information from adverse parties to the accident (e.g., a passenger from each vehicle). Accordingly, the computing system 100 automatically prioritizes information that is deemed to be most reliable, and in certain scenarios, deprioritizes information provided by an interested party (e.g., an unreliable driver involved in the accident with a history of vehicular accidents and/or a criminal history).

In various implementations, the computing system 100 can generate the simulation using vehicle information of the vehicle(s) involved in the accident and the weather conditions at the time of the accident (1217). For example, the computing system 100 can look up the vehicle's mass, safety features, tire information (e.g., whether a blown tire was involved, or if the tires of the vehicle had low tread), turning radii of the vehicles, vehicle height, width, and shape, whether the roads were wet or icy, whether it was raining or snowing at the time of the accident (and a severity of the rain or snow), whether conditions were foggy (and a density of the fog), the type of road surface (e.g., asphalt, concrete, dirt, etc.), the condition of the road surface (e.g., strewn with potholes, gravelly, freshly chip-sealed, etc.), and the like. Based on all the reliable information provided, the computing system 100 can generate the simulation using a physics engine that accurately tunes the physical parameters of the accident, such as vehicle masses, tire grip, vehicle trajectories, etc. based on the road conditions (1219).

Based at least in part on the generated simulation, the computing system 100 can corroborate and/or flag the various pieces of contextual information, or each information item in a set of information items provided by the claimant user 197 for potential fraud (1220). It is contemplated that uncertainty may be inherent in various judgements concerning fraudulent information provided by the claimant user 197. Accordingly, the computing system 100 can generate fraud scores (e.g., on a scale from one to one hundred) for each piece of information or solely for flagged information provided by the claimant user 197 and/or other parties relevant to the vehicle accident. Upon determining the fraud score(s), the computing system 100 can generate a claim interface for a policy provider 185 of the claimant user 197 to provide damage repair or loss estimates for the user's vehicle, the fraud score(s), and/or a recommendation to pay out the claim, pay a portion of the claim, deny the claim, and/or conduct further investigation (1225).

Hardware Diagram

Figure 13:
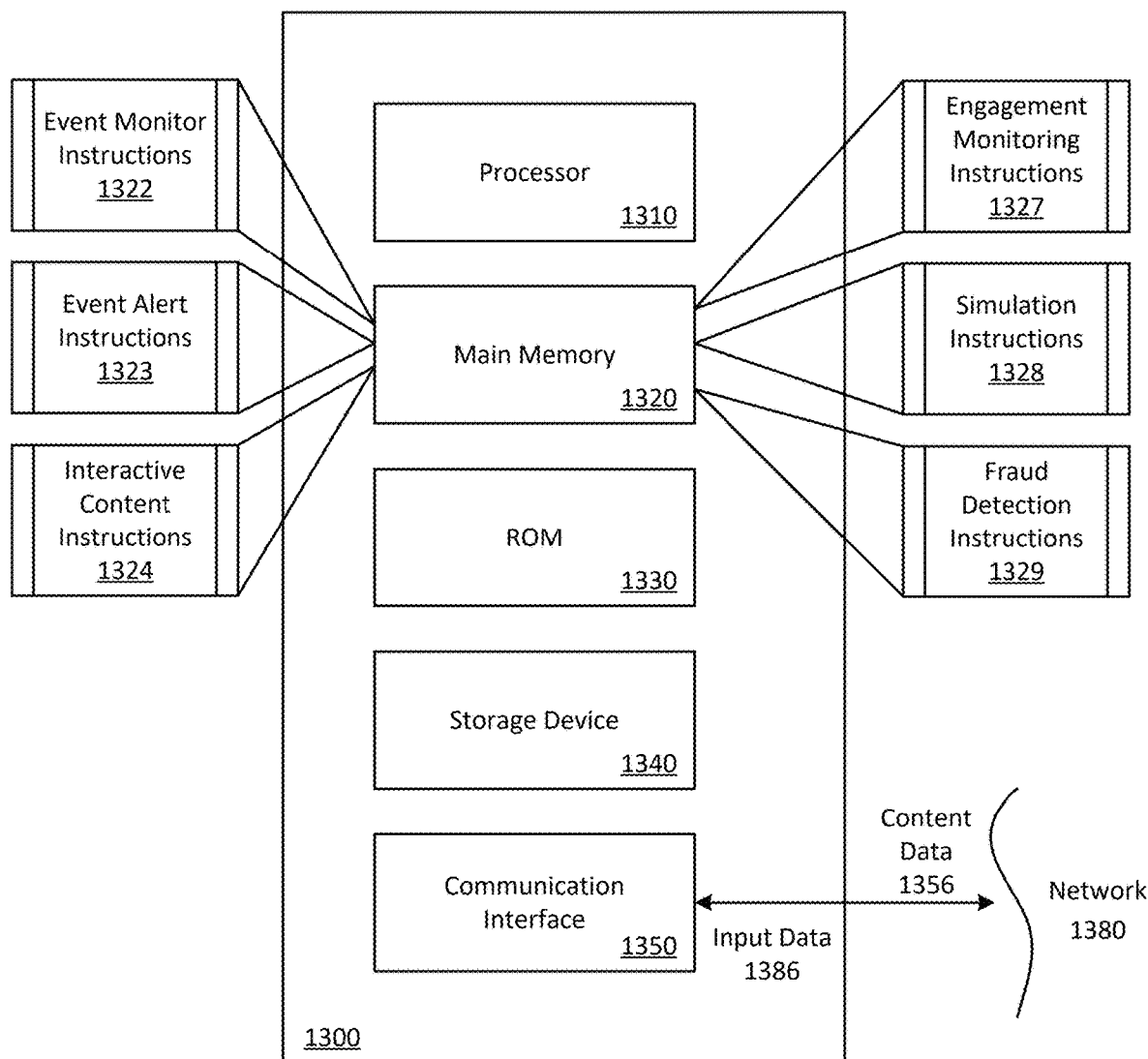
FIG. 13 is a block diagram that illustrates a computer system upon which examples described herein may be implemented.

FIG. 13 is a block diagram that illustrates a computer system upon which examples described herein may be implemented. A computer system 1300 can be implemented on, for example, a server or combination of servers. For example, the computer system 1300 may be implemented as part of a network service, such as described in connection with FIGS. 1 through 12. In the context of FIG. 1, the computer system 100 may be implemented using a computer system 1300 described in connection with FIG. 13. The computing system 100 may also be implemented using a combination of multiple computer systems as described in connection with FIG. 13.

In one implementation, the computer system 1300 includes processing resources 1310, a main memory 1320, a read-only memory (ROM) 1330, a storage device 1340, and a communication interface 1350. The computer system 1300 includes at least one processor 1310 for processing information stored in the main memory 1320, such as provided by a random-access memory (RAM) or other dynamic storage device that stores information and instructions which are executable by the processor 1310. The main memory 1320 also may be used for storing temporary variables or other intermediate information during execution of instructions to be executed by the processor 1310. The computer system 1300 may also include the ROM 1330 or other static storage device for storing static information and instructions for the processor 1310. A storage device 1340, such as a magnetic disk or optical disk, is provided for storing information and instructions.

The communication interface 1350 enables the computer system 1300 to communicate via one or more networks 1380 (e.g., cellular network) through use of the network link (wireless or wired). Using the network link, the computer system 1300 can communicate with one or more computing devices, one or more servers, and/or one or more databases. In accordance with examples described throughout the present disclosure, the computer system 1300 stores executable instructions stored in the memory 1330, which can include event monitoring instructions 1322, event alert instructions 1323, interactive content generating instructions 1324, engagement monitoring instructions 1327, simulation instructions 1328, and fraud detection instructions 1329.

By way of example, the instructions and data stored in the memory 1320 can be executed by the processor 1310 to implement the functions of an example computing system 100 of FIG. 1. In various examples, the processor 1310 can execute the event monitoring instructions 1322 to receive monitoring data from event monitoring resources and predict event occurrences in certain areas that may cause damage or loss to property, as described herein. The processor 1310 can further execute the event alert instructions 1324 to generate severity heat maps of events, determine the locations of users and their homes within the severity heat maps, and provide an alert regarding an upcoming event, according to examples described herein.

The processor 1310 can further execute the interactive content generating instructions 1324 to generate content data 1356 corresponding to adaptive and customized content flows for users with respect to event preparedness, loss or damage mitigation, real-time event updates, contextual content flows for FNOL information gathering, and claim interfaces for policy providers, as described herein. The processor 1310 can further execute engagement monitoring instructions 1327 to monitor input data 1386 corresponding to user engagement with the user's computing device and/or the content flows to dynamically adjust the content flows in order to provoke increased user engagement and maximize information gathering in connection with a claim.

As further provided herein, the processor 1310 can further execute simulation instructions 1328 to receive input data 1386 from relevant parties to a vehicle incident via an accident reconstruction interface and generate a simulation of the incident accordingly. The processor 1310 can execute fraud detection instructions 1329 to process all relevant information provided by a claimant user, any relevant parties to a claim event, third-party resources, event monitoring resources, etc. to determine whether a claimant user may be attempting to file a fraudulent claim.

Examples described herein are related to the use of the computer system 1300 for implementing the techniques described herein. According to one example, the techniques are performed by the computer system 1300 in response to the processor 1310 executing one or more sequences of one or more instructions contained in the main memory 1320. Such instructions may be read into the main memory 1320 from another machine-readable medium, such as the storage device 1340. Execution of the sequences of instructions contained in the main memory 1320 causes the processor 1310 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system implementing a targeted event alert service, comprising:
a network communication interface to communicate, over one or more networks, with (i) computing devices of users of the targeted event alert service, and (ii) computing systems of one or more policy providers;
one or more processors; and
a memory storing instructions that, when executed by the one or more processors, cause the computing system to:
determine a subset of the users that are to be affected by a predicted event;
for each respective user of the subset of users, perform a lookup that identifies unique property characteristics of the respective user;
based on the unique property characteristics of the respective user, transmit, over the one or more networks, interactive content data to a computing device of the respective user, the interactive content data causing the computing device of the respective user to generate an individualized graphical user interface for the respective user, the individualized graphical user interface presenting interactive mitigation content comprising a customized set of tasks to perform, based on the unique property characteristics of the respective user, to mitigate and/or prevent loss resulting from the predicted event;
during each of one or more interactive sessions in which the respective user engages with the interactive mitigation content via the individualized graphical user interface, initiate a live engagement monitor implementing machine learning to (i) receive, over the one or more networks, engagement data from the computing device of the respective user, the engagement data indicating interactions by the respective user with the interactive mitigation content displayed on the computing device of the respective user, and (ii) based on the engagement data from the computing device of the respective user, dynamically adapt the interactive mitigation content to induce or increase user engagement by the respective user with the interactive mitigation content and encourage performance of the customized set of tasks;
receive, over the one or more networks, feedback data from the computing device of the respective user, the feedback data indicating whether the respective user has performed one or more of the customized set of tasks prior to the predicted event;
access historical loss data corresponding to a set of similar events as compared to the predicted event;
based on (i) the historical loss data, (ii) the predicted event that will occur in a given area, (iii) policy data for the users predicted to be affected in the given area, and (iv) the feedback data received from each respective user predicted to be affected by the predicted event, generate an exposure risk set for each respective policy provider of the one or more policy providers; and
transmit, over the one or more network, the exposure risk set generated for the respective policy provider to a computing system of the respective policy provider.

2. The computing system of claim 1, where the unique property characteristics comprise at least one of a number of bedrooms, a number of bathrooms, one or more climate control system types, a water heater type, a roof type, a square footage, one or more power system types, a landscape type, a build type, a home value, or internal assets of the home of the respective user.

3. The computing system of claim 1, wherein the interactive mitigation content comprises an item checklist that includes the customized set of tasks for the respective user.

4. The computing system of claim 1, wherein the predicted event comprises a catastrophic weather event.

5. The computing system of claim 4, wherein the catastrophic weather event comprises at least one of a storm event, a flooding event, a power outage event, a wildfire event, a drought event, an earthquake event, or a disaster event.

6. The computing system of claim 1, wherein the executed instructions cause the computing system to determine the unique property characteristics of the respective user by performing a lookup in one or more third-party databases.

7. The computing system of claim 6, wherein the one or more third-party databases comprise an insurance provider database, and wherein the executed instructions cause the computing system to determine the unique property characteristics of the respective user by performing a lookup of one or more insurance coverage policies of the respective user.

8. The computing system of claim 6, wherein the one or more third-party databases comprise at least one of a census database, a tax database, a real estate database, or a social media database.

9. The computing system of claim 1, wherein the exposure risk set comprises a predicted cumulative loss resulting from the event for the respective policy provider.

10. A non-transitory computer readable medium storing instructions that, when executed by one or more processors, cause the one or more processors to:
communicate, over one or more networks, with (i) computing devices of users of a targeted event alert service, and (ii) computing systems of one or more policy providers;
determine a subset of the users that are to be affected by a predicted event;
for each respective user of the subset of users, perform a lookup that identifies unique property characteristics of the respective user;
based on the unique property characteristics of the respective user, transmit, over the one or more networks, interactive content data to a computing device of the respective user, the interactive content data causing the computing device of the respective user to generate an individualized graphical user interface for the respective user, the individualized graphical user interface presenting interactive mitigation content comprising a customized set of tasks to perform, based on the unique property characteristics of the respective user, to mitigate and/or prevent loss resulting from the predicted event;
during each of one or more interactive sessions in which the respective user engages with the interactive mitigation content via the individualized graphical user interface, initiate a live engagement monitor implementing machine learning to (i) receive, over the one or more networks, engagement data from the computing device of the respective user, the engagement data indicating interactions by the respective user with the interactive mitigation content displayed on the computing device of the respective user, and (ii) based on the engagement data from the computing device of the respective user, dynamically adapt the interactive mitigation content to induce or increase user engagement by the respective user with the interactive mitigation content and encourage performance of the customized set of tasks;

receive, over the one or more networks, feedback data from the computing device of the respective user, the feedback data indicating whether the respective user has performed one or more of the customized set of tasks prior to the predicted event;

access historical loss data corresponding to a set of similar events as compared to the predicted event;

based on (i) the historical loss data, (ii) the predicted event that will occur in a given area, (iii) policy data for the users predicted to be affected in the given area, and (iv) the feedback data received from each respective user predicted to be affected by the predicted event, generate an exposure risk set for each respective policy provider of the one or more policy providers; and transmit, over the one or more network, the exposure risk set generated for the respective policy provider to a computing system of the respective policy provider.

11. The non-transitory computer readable medium of claim 10, where the unique property characteristics comprise at least one of a number of bedrooms, a number of bathrooms, one or more climate control system types, a water heater type, a roof type, a square footage, one or more power system types, a landscape type, a build type, a home value, or internal assets of the home of the respective user.

12. The non-transitory computer readable medium of claim 10, wherein the interactive mitigation content comprises an item checklist that includes the customized set of tasks for the respective user.

13. The non-transitory computer readable medium of claim 10, wherein the predicted event comprises a catastrophic weather event.

14. The non-transitory computer readable medium of claim 13, wherein the catastrophic weather event comprises at least one of a storm event, a flooding event, a power outage event, a wildfire event, a drought event, an earthquake event, or a disaster event.

15. The non-transitory computer readable medium of claim 10, wherein the executed instructions cause the one or more processors to determine the unique property characteristics of the respective user by performing a lookup in one or more third-party databases.

16. The non-transitory computer readable medium of claim 15, wherein the one or more third-party databases comprise an insurance provider database, and wherein the executed instructions cause the one or more processors to determine the unique property characteristics of the respective user by performing a lookup of one or more insurance coverage policies of the respective user.

17. A computer-implemented method of facilitating event preparedness, the method being performed by one or more processors and comprising:

communicating, over one or more networks, with (i) computing devices of users of a targeted event alert service, and (ii) computing systems of one or more policy providers;

determining a subset of the users that are to be affected by a predicted event;

for each respective user of the subset of users, performing a lookup that identifies unique property characteristics of the respective user;

based on the unique property characteristics of the respective user, transmitting, over the one or more networks, interactive content data to a computing device of the respective user, the interactive content data causing the computing device of the respective user to generate an individualized graphical user interface for the respective user, the individualized graphical user interface presenting interactive mitigation content comprising a customized set of tasks to perform, based on the unique property characteristics of the respective user, to mitigate and/or prevent loss resulting from the predicted event;

during each of one or more interactive sessions in which the respective user engages with the interactive mitigation content via the individualized graphical user interface, initiating a live engagement monitor implementing machine learning to (i) receive, over the one or more networks, engagement data from the computing device of the respective user, the engagement data indicating interactions by the respective user with the interactive mitigation content displayed on the computing device of the respective user, and (ii) based on the engagement data from the computing device of the respective user, dynamically adapt the interactive mitigation content to induce or increase user engagement by the respective user with the interactive mitigation content and encourage performance of the customized set of tasks;

receiving, over the one or more networks, feedback data from the computing device of the respective user, the feedback data indicating whether the respective user has performed one or more of the customized set of tasks prior to the predicted event;

accessing historical loss data corresponding to a set of similar events as compared to the predicted event;

based on (i) the historical loss data, (ii) the predicted event that will occur in a given area, (iii) policy data for the users predicted to be affected in the given area, and (iv) the feedback data received from each respective user predicted to be affected by the predicted event, generating an exposure risk set for each respective policy provider of the one or more policy providers; and transmitting, over the one or more network, the exposure risk set generated for the respective policy provider to a computing system of the respective policy provider.

* * * * *